(12) United States Patent
Sun

(10) Patent No.: US 12,459,938 B2
(45) Date of Patent: Nov. 4, 2025

(54) ORAI CHANNEL INHIBITORS

(71) Applicant: Beth Israel Deaconess Medical Center, Inc., Boston, MA (US)

(72) Inventor: Lijun Sun, Harvard, MA (US)

(73) Assignee: Beth Israel Deaconess Medical Center, Inc., Boston, MA (US)

( * ) Notice: Subject to any disclaimer, the term of this patent is extended or adjusted under 35 U.S.C. 154(b) by 929 days.

(21) Appl. No.: 17/435,863

(22) PCT Filed: Mar. 3, 2020

(86) PCT No.: PCT/US2020/020812
§ 371 (c)(1),
(2) Date: Sep. 2, 2021

(87) PCT Pub. No.: WO2020/180876
PCT Pub. Date: Sep. 10, 2020

(65) Prior Publication Data
US 2022/0153735 A1     May 19, 2022

Related U.S. Application Data

(60) Provisional application No. 62/813,402, filed on Mar. 4, 2019.

(51) Int. Cl.
| | | |
|---|---|---|
| C07D 471/04 | (2006.01) | |
| C07D 209/24 | (2006.01) | |
| C07D 231/14 | (2006.01) | |
| C07D 231/54 | (2006.01) | |
| C07D 401/12 | (2006.01) | |
| C07D 487/04 | (2006.01) | |

(52) U.S. Cl.
CPC ......... *C07D 471/04* (2013.01); *C07D 209/24* (2013.01); *C07D 231/14* (2013.01); *C07D 231/54* (2013.01); *C07D 401/12* (2013.01); *C07D 487/04* (2013.01)

(58) Field of Classification Search
CPC .. C07D 471/04; C07D 209/24; C07D 231/14; C07D 231/54; C07D 401/12; C07D 487/04
See application file for complete search history.

(56) References Cited

U.S. PATENT DOCUMENTS

| | | | |
|---|---|---|---|
| 4,940,703 A | 7/1990 | Baker et al. | |
| 6,852,726 B2 | 2/2005 | Greenhouse et al. | |
| 7,419,987 B2 | 9/2008 | Hofgen et al. | |
| 8,148,413 B2 * | 4/2012 | Lau ...................... | C07D 417/12 514/371 |

OTHER PUBLICATIONS

PCT International Preliminary Report on Patentability in International Appln. No. PCT/US2020/020812, dated Aug. 25, 2021, 8 pages.
CAS Registry No. 1948943-45-0, "1H-Pyrazole-3-carboxamide, 1-(1cyclopropylethyl)-N-(3-fluoro-4-pyridinyl)-5-methyl," Jul. 10, 2016, 1 page.
CAS Registry No. 1958320-24-5,"IH-Pyrazole-3-carboxamide, 1-(1-cyclopropylethyl)-N-[2-fluoro-6-(1-pyrrolidinyl)phenyl]-5-methyl," Jul. 24, 2016, 1 page.
CAS Registry No. 2094354-18-2, "IH-Pyrazole-3-carboxamide, N-(2-chloro-4-fluorophenyl)-1-(1-cyclopropylethyl)-5-methyl," May 2, 2017, 1 page.
CAS Registry No. 2188496-68-4, "1H-Pyrazole-3-carboxamide, N-(5-cyano-2-fluorophenyl)-1-(1-cyclopropylethyl)-5-methyl," Mar. 11, 2018, 1 page.
CAS Registry No. 2188543-65-7, "1H-Pyrazole-3-carboxamide, N-(3-bromo-S-methyl-4-pyridinyl)-1-(1-cyclopropylethyl)-5-methyl," Mar. 11, 2018, 1 page.
PCT International Search Report and Written Opinion in International Appln. No. PCT/US2020/020812, dated Jul. 2, 2020, 11 pages.
PubChem CID 11086288, "1-Butyl-3-phenyl-4,5,6,7-tetrahydro-1H-indole," Oct. 26, 2006, 8 pages.

(Continued)

*Primary Examiner* — Clinton A Brooks
*Assistant Examiner* — Josmalen M. Ramos-Lewis
(74) *Attorney, Agent, or Firm* — Fish & Richardson P.C.

(57) ABSTRACT

The present application in one embodiment provides a compound of Formula (I)

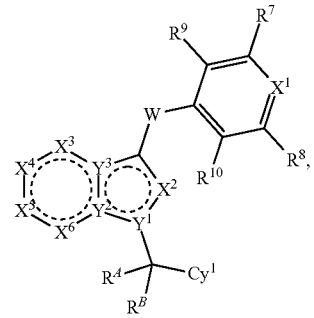

or a pharmaceutically acceptable salt thereof, wherein $X^1$, $X_2$, $X_3$, $X_4$, $X^5$, $X^6$, $Y^1$, $Y^2$, $Y^3$, $R^7$, $R^8$, $R^9$, $R^{10}$, $R^A$, $R^B$, W and $Cy^1$ are as described herein. Pharmaceutical compositions containing these compounds, and methods of using these compounds for treating cancer, autoimmune diseases, and inflammatory diseases are also provided.

19 Claims, 3 Drawing Sheets

(56) References Cited

OTHER PUBLICATIONS

Zhelay et al., "Initial Characterization of the Indole-3-Carboxamide Bic-154 as a Fast Onset and Reversible ORAI Channel Blocker," Biophysical Journal, Mar. 2019, 116(3), 249a, p. 1.

* cited by examiner

ORAI CHANNEL INHIBITORS

CLAIM OF PRIORITY

This application is a § 371 National Stage Application of PCT/US2020/020812, filed Mar. 3, 2020, which claims priority to U.S. Provisional Patent Application Ser. No. 62/813,402, filed on Mar. 4, 2019, the entire contents of which are hereby incorporated by reference.

TECHNICAL FIELD

This invention relates to heterocyclic organic compounds, and in particular to compounds that are capable of blocking a calcium release-activated calcium (ion) channel protein (ORAI).

BACKGROUND

There are numerous deadly diseases affecting current human population. Autoimmune and inflammatory conditions affect a significant segment of population. These disorders affect approximately 44 million people worldwide with an estimated socioeconomic burden of more than $200 billion. Likewise, cancer is one of the leading causes of death in contemporary society. The numbers of new cancer cases and deaths is increasing each year. Currently, cancer incidence is 454.8 cases of cancer per 100,000 men and women per year, while cancer mortality is 71.2 cancer deaths per 100,000 men and women per year. Currently, there is no cure for any of these debilitating diseases, and new treatments are needed to combat them. The compounds and methods of the present disclosure help meet this need.

SUMMARY

The present disclosure provides compounds that are blockers of ORAI Ca$^{2+}$ channel protein. As such, the compounds are useful in treating a wide array of diseases and conditions, including autoimmune diseases and cancer. The compounds advantageously inhibit the ion channel in a reversible manner. The compounds are also hydrophilic, water soluble, and are advantageously suitable for oral administration to patients. Certain embodiments of these compounds and methods of their use are described herein.

In one general aspect, the present disclosure provides a compound of Formula (I):

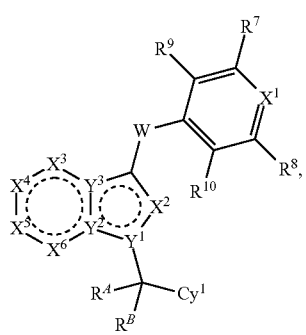

(I)

or a pharmaceutically acceptable salt thereof, wherein $X^1$, $X^2$, $X^3$, $X^4$, $X^5$, $X^6$, $Y^1$, $Y^2$, $Y^3$, $R^7$, $R^8$, $R^9$, $R^{10}$, $R^A$, $R^B$, W and Cy$^1$ are as described herein.

In another general aspect, the present disclosure provides a compound of Formula (II):

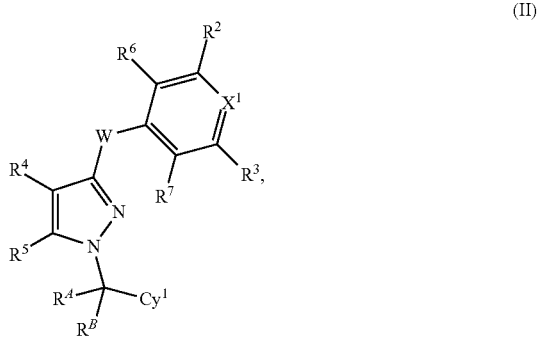

(II)

or a pharmaceutically acceptable salt thereof, wherein $X^1$, $R^2$, $R^3$, $R^4$, $R^4$, $R^5$, $R^6$, $R^7$, $R^A$, $R^B$, W, and Cy$^1$ are as described herein.

In yet another general aspect, the present disclosure provides a pharmaceutical composition comprising a compound of Formula (I) or Formula (II), or a pharmaceutically acceptable salt thereof, and a pharmaceutically acceptable carrier.

In yet another general aspect, the present disclosure provides a method selected from:
  inhibiting ORAI ion channel protein in a cell;
  inhibiting production of inflammatory cytokines; and
  inhibiting T-cell proliferation;
  the method comprising contacting the cell with an effective amount of a compound of Formula (I) or Formula (II), or a pharmaceutically acceptable salt thereof, or a pharmaceutical composition comprising same.

In yet another general aspect, the present disclosure provides a method of treating or preventing a disease or condition selected from: an autoimmune disease, an inflammatory disease, a cardiovascular disease, and a cancer, the method comprising administering to a subject in need thereof a therapeutically effective amount of a compound of Formula (I) or Formula (II), or a pharmaceutically acceptable salt thereof, or a pharmaceutical composition comprising same.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and figures, and from the claims.

DETAILED DESCRIPTION

Therapeutic Compounds

Figure 1:
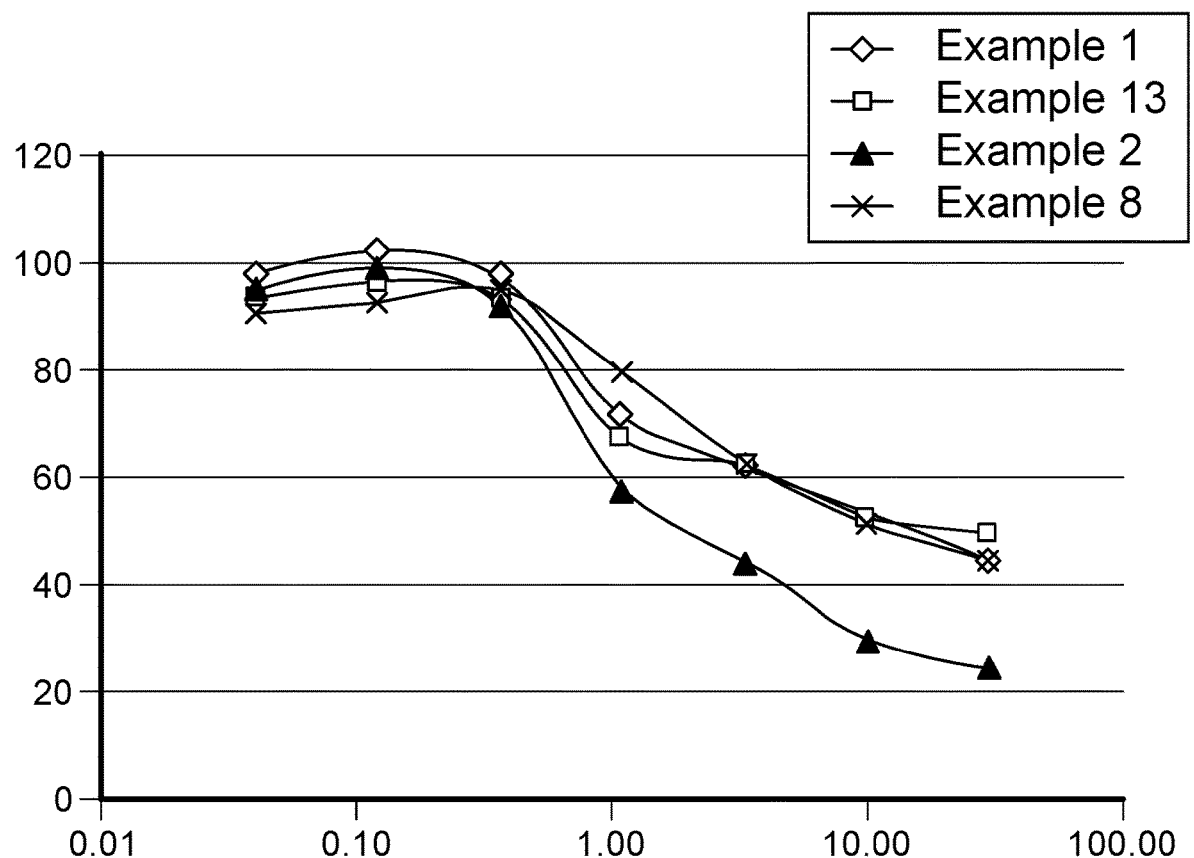
FIG. 1 contains line plots showing inhibition of TNFα by the compounds of Examples 1, 2, 8, and 13.
Figure 2:
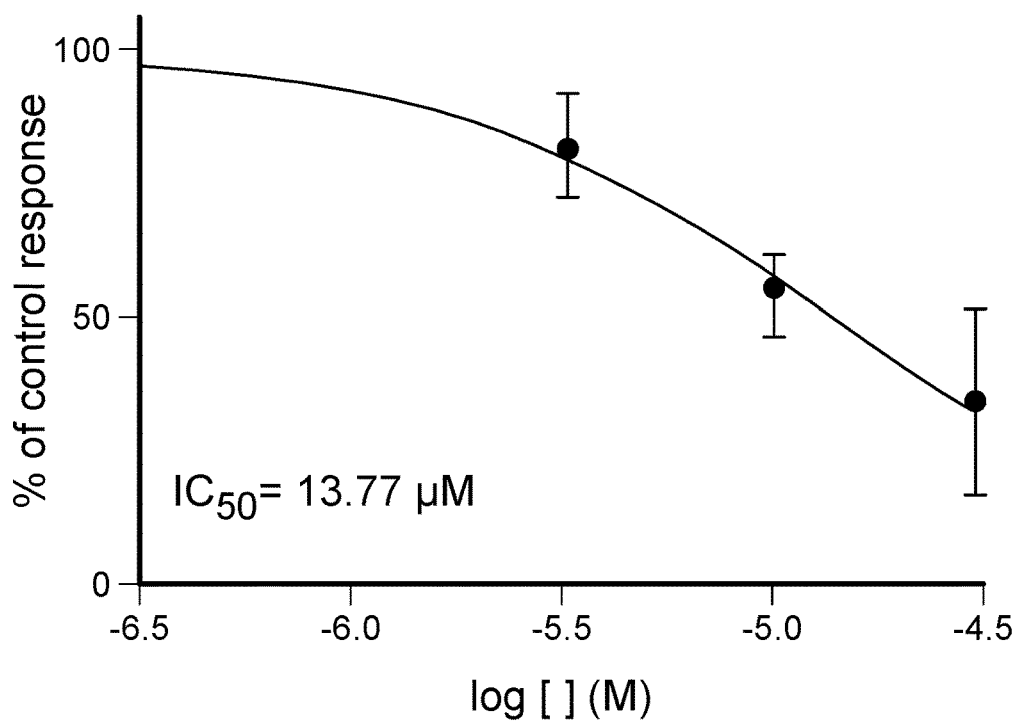
FIG. 2 contains a line plot showing inhibition of ORAI by the compound of Example 2.
Figure 3:
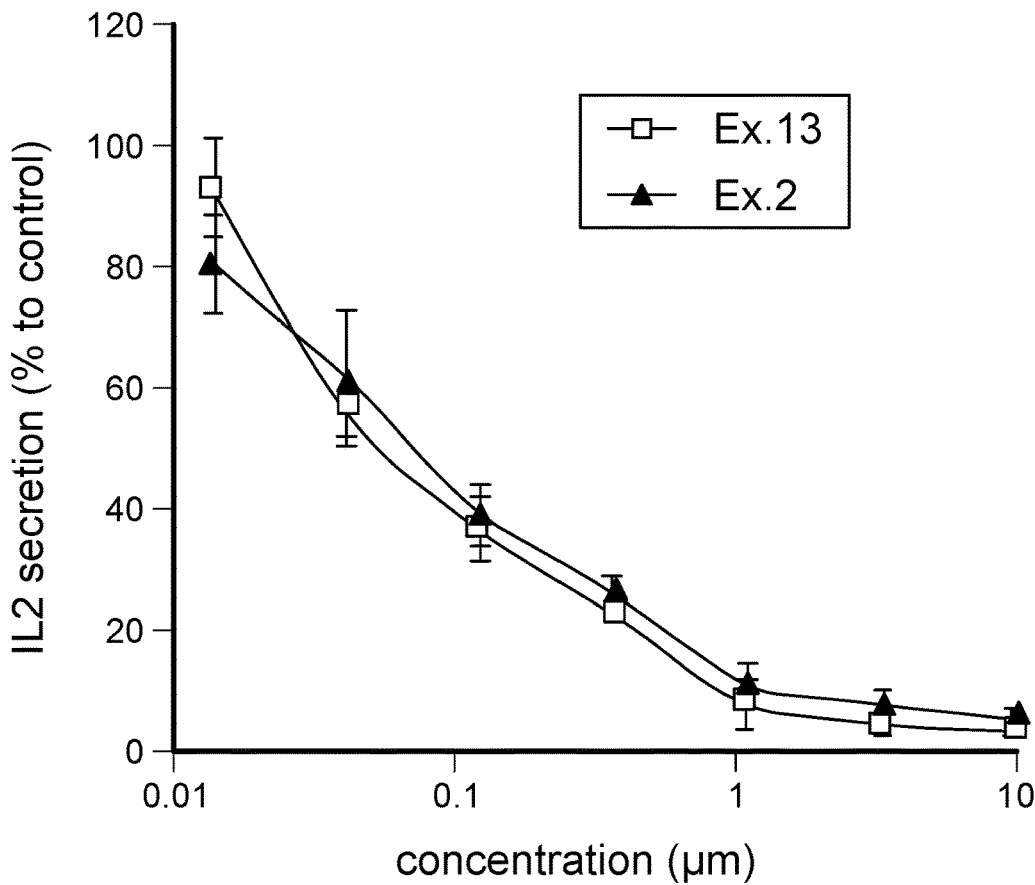
FIG. 3 contains line plots showing inhibition of IL-2 by the compounds of Examples 2 and 13.

In some embodiments, the present application provides a compound of Formula (I):

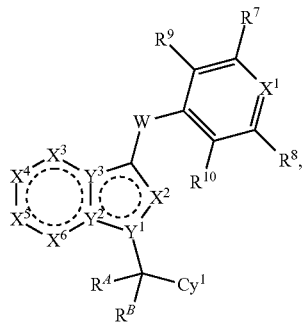

(I)

or a pharmaceutically acceptable salt thereof, wherein:

represents that the ring is saturated, partially unsaturated, or aromatic;

represents that the ring is aromatic;

W is selected from $-C(=O)NR^{11}-$, $-NR^{11}C(=O)-$, $-CH_2NR^{11}-$, and $-NR^{11}CH_2-$;

$X^1$ is selected from N and $CR^1$;

$X^2$ is selected from N and $CR^2$;

$X^3$ is selected from N, $NR^{N3}$, O, S, $CR^3$, and $C(R^3)_2$;

$X^4$ is selected from N, $NR^{N4}$, O, S, $CR^4$, and $C(R^4)_2$;

$X^5$ is selected from N, $NR^{N5}$, O, S, $CR^5$, and $C(R^5)_2$;

$X^6$ is selected from N, $NR^{N6}$, O, S, $CR^6$, and $C(R^6)_2$;

$Y^1$, $Y^2$, and $Y^3$ are each independently selected from C and N; provided that at least one of $Y^1$, $Y^2$, and $Y^3$ is N;

$Cy^1$ is selected from $C_{3-6}$ cycloalkyl; 4-7 membered heterocycloalkyl comprising at least 2 heteroatoms selected from O, S, and N; and 3-4 membered heterocycloalkyl comprising 1 heteroatom selected from O, S, and N; wherein said $C_{3-6}$ cycloalkyl, 4-7 membered heterocycloalkyl, and 3-4 membered heterocycloalkyl are each optionally substituted with 1, 2, 3, 4, or 5 substituents independently selected from $R^{Cy1}$;

$R^1$, $R^2$, $R^3$, $R^4$, $R^5$, $R^6$, $R^7$, and $R^8$ are each independently selected from H, $C_{1-6}$ alkyl, $C_{2-6}$ alkenyl, $C_{2-6}$ alkynyl, $C_{1-4}$ haloalkyl, halo, CN, $NO_2$, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}S(O)_2R^{b1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^2$, halo, CN, $NO_2$, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}S(O)_2R^{b1}$, $S(O)_2R^{b1}$, and $S(O)_2NR^{c1}R^{d1}$;

$R^{N3}$, $R^{N4}$, $R^{N5}$, and $R^{N6}$ are each independently selected from H, $C_{1-6}$ alkyl, $C_{2-6}$ alkenyl, $C_{2-6}$ alkynyl, $C_{1-6}$ haloalkyl, $C(O)R^{b2}$, $C(O)NR^{c2}R^{d2}$, $C(O)OR^{a2}$, $S(O)_2R^{b2}$, and $S(O)_2NR^{c2}R^{d2}$; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^2$, halo, CN, $NO_2$, $OR^{a2}$, $C(O)R^{b2}$, $C(O)NR^{c2}R^{d2}$, $C(O)OR^{a2}$, $NR^{c2}R^{d2}$, $NR^{c2}C(O)R^{b2}$, $NR^{c2}S(O)_2R^{b2}$, $S(O)_2R^{b2}$, and $S(O)_2NR^{c2}R^{d2}$;

$R^9$ and $R^{10}$ are each independently selected from H, $C_{1-3}$ alkyl, and halo, provided that at least one of $R^9$ and $R^{10}$ is $C_{1-3}$ alkyl or halo;

$R^{11}$ is selected from H and $C_{1-3}$ alkyl;

$R^A$ and $R^B$ are each independently selected from H, $C_{1-3}$ alkyl, wherein said $C_{1-3}$ alkyl is optionally substituted with 1, 2, or 3 substituents independently selected from $C_{1-3}$ alkoxy, $C_{1-4}$ haloalkyl, $C_{1-4}$ haloalkoxy, halo, CN, $NO_2$, OH, $NH_2$, $C_{1-3}$ alkylamino, and di($C_{1-3}$ alkyl)amino;

$R^{a1}$, $R^{a2}$, $R^{c1}$, $R^{c2}$, $R^{d1}$, and $R^{d2}$ are each independently selected from H, $C_{1-6}$ alkyl, $C_{2-6}$ alkenyl, $C_{2-6}$ alkynyl, $C_{1-4}$ haloalkyl, $C(O)R^{b3}$, $C(O)NR^{c3}R^{d3}$, $C(O)OR^{a3}$, $S(O)_2R^{b3}$, $S(O)_2NR^{c3}R^{d3}$; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^3$, halo, CN, $NO_2$, $OR^{a3}$, $C(O)R^{b3}$, $C(O)NR^{c3}R^{d3}$, $C(O)OR^{a3}$, $NR^{c3}R^{d3}$, $NR^{c3}C(O)R^{b3}$, $NR^{c3}S(O)_2R^{b3}$, $NR^{c3}S(O)_2NR^{c3}R^{d3}$, $S(O)_2R^{b3}$ and $S(O)_2NR^{c3}R^{d3}$;

$R^{b1}$ and $R^{b2}$ are each independently selected from $C_{1-6}$ alkyl, $C_{2-6}$ alkenyl, $C_{2-6}$ alkynyl, and $C_{1-4}$ haloalkyl; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^3$, halo, CN, $NO_2$, $OR^{a3}$, $C(O)R^{b3}$, $C(O)NR^{c3}R^{d3}$, $C(O)OR^{a3}$, $NR^{c3}R^{d3}$, $NR^{c3}$ $S(O)_2R^{b3}$, $NR^{c3}S(O)_2NR^{c3}R^{d3}$, $S(O)_2R^{b3}$, and $S(O)_2NR^{c3}R^{d3}$;

each $Cy^2$ is independently selected from $C_{6-10}$ aryl, $C_{3-10}$ cycloalkyl, 5-10 membered heteroaryl, and 4-12 membered heterocycloalkyl, each of which is optionally substituted with 1, 2, 3, 4, or 5 substituents independently selected from $R^{Cy2}$;

each $Cy^3$ is independently selected from $C_{6-10}$ aryl, $C_{3-10}$ cycloalkyl, 5-10 membered heteroaryl, and 4-12 membered heterocycloalkyl, each of which is optionally substituted with 1, 2, 3, 4, or 5 substituents independently selected from $R^{Cy3}$;

$R^{a3}$, $R^{c3}$, and $R^{d3}$ are each independently selected from H, $C_{1-6}$ alkyl, $C_{1-4}$ haloalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene, $C(O)R^{b4}$, $C(O)$ $NR^{c4}R^{d4}$, $C(O)OR^{a4}$, $S(O)_2R^{b4}$, and $S(O)_2NR^{c4}R^{d4}$; wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene are each optionally substituted with 1, 2, 3, 4, or 5 substituents independently selected from $C_{1-6}$ alkyl, $C_{1-4}$ haloalkyl, $C_{1-4}$ hydroxyalkyl, $C_{1-6}$ cyanoalkyl, halo, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}S(O)_2R^{b4}$, $S(O)_2R^{b4}$, and $S(O)_2NR^{c4}R^{d4}$;

$R^{b3}$ is selected from $C_{1-6}$ alkyl, $C_{2-6}$ alkenyl, $C_{2-6}$ alkynyl, $C_{1-4}$ haloalkyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene are each optionally substituted with 1, 2, 3, 4, or 5 substituents independently selected from $C_{1-6}$ alkyl, $C_{1-4}$ haloalkyl, $C_{1-4}$ hydroxyalkyl, $C_{1-6}$ cyanoalkyl, halo, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}C(O)OR^{a4}$, $NR^{c4}S(O)_2R^{b4}$, $NR^{c4}S(O)_2NR^{c4}R^{d4}$, $S(O)_2R^{b4}$, and $S(O)_2NR^{c4}R^{d4}$;

$R^{Cy1}$, $R^{Cy2}$, and $R^{Cy3}$ are each independently selected from halo, $C_{1-4}$ alkyl, $C_{1-4}$ haloalkyl, $C_{2-6}$ alkenyl, $C_{2-6}$ alkynyl, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}C(O)OR^{a4}$, $NR^{c4}S(O)_2R^{b4}$, $NR^{c4}S(O)_2NR^{c4}R^{d4}$, $S(O)_2R^{b4}$, and $S(O)_2NR^{c4}R^{d4}$, wherein said $C_{1-4}$ alkyl, $C_{2-6}$ alkenyl, and $C_{2-6}$ alkynyl are each optionally substituted by 1, 2, 3, 4, or 5 substituents independently selected from halo, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}C(O)OR^{a4}$, $NR^{c4}S(O)_2R^{b4}$, $NR^{c4}S(O)_2NR^{c4}R^{d4}$, $S(O)_2R^{b4}$, and $S(O)_2NR^{c4}R^{d4}$;

$R^{a4}$, $R^{c4}$, and $R^{d4}$ are each independently selected from H, $C_{1-6}$ alkyl, $C_{1-4}$ haloalkyl, $C_{1-4}$ hydroxyalkyl, $C_{1-4}$ cyanoalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene and $R^g$, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene are each optionally substituted with 1, 2, 3, 4, or 5 substituents independently selected from $R^g$;

each $R^{b4}$ is independently selected from $C_{1-6}$ alkyl, $C_{1-4}$ haloalkyl, $C_{1-4}$ hydroxyalkyl, $C_{1-4}$ cyanoalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene and $R^g$, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene is optionally substituted with 1, 2, 3, 4, or 5 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$;

or any $R^{c3}$ and $R^{d3}$ together with the N atom to which they are attached form a 4-, 5-, 6-, or 7-membered heterocycloalkyl group optionally substituted with 1, 2, or 3 substituents independently selected from $R^g$;

or any $R^{c4}$ and $R^{d4}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, $C_{6-10}$ aryl, $C_{6-10}$ aryloxy, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments,

represents that the ring is saturated.

In some embodiments,

represents that the ring is partially unsaturated.

In some embodiments,

represents that the ring is aromatic.

In some embodiments, W is $C(=O)NR^{11}$.
In some embodiments, W is $NR^{11}C(=O)$.
In some embodiments, W is $CH_2NR^{11}$.
In some embodiments, W is $NR^{11}CH_2$.
In some embodiments, W is selected from —$C(=O)NR^{11}$— and —$NR^{11}C(=O)$—.
In some embodiments, W is selected from —$CH_2R^{11}$— and —$NR^{11}CH_2$—.
In some embodiments, W is selected from —$C(=O)NR^{11}$— and —$CH_2NR^{11}$—.
In some embodiments, $X^1$ is N. In some embodiments, $X^1$ is $CR^1$.
In some embodiments, $X^2$ is N. In some embodiments, $X^2$ is $CR^2$.
In some embodiments, $X^3$ is N. In some embodiments, $X^3$ is $NR^{N3}$. In some embodiments, $X^3$ is O. In some embodiments, $X^3$ is S. In some embodiments, $X^3$ is $CR^3$. In some embodiments, $X^3$ is $C(R^3)_2$.
In some embodiments, $X^4$ is N. In some embodiments, $X^4$ is $NR^{N4}$. In some embodiments, $X^4$ is O. In some embodiments, $X^4$ is S. In some embodiments, $X^4$ is $CR^4$. In some embodiments, $X^4$ is $C(R^4)_2$.

In some embodiments, $X^5$ is N. In some embodiments, $X^5$ is $NR^{N5}$. In some embodiments, $X^5$ is O. In some embodiments, $X^5$ is S. In some embodiments, $X^5$ is $CR^5$. In some embodiments, $X^5$ is $C(R^5)_2$.

In some embodiments, $X^6$ is N. In some embodiments, $X^6$ is $NR^{N6}$. In some embodiments, $X^6$ is O. In some embodiments, $X^6$ is S. In some embodiments, $X^6$ is $CR^6$. In some embodiments, $X^6$ is $C(R^6)_2$.

In some embodiments, $Cy^t$ is $C_{3-6}$ cycloalkyl (e.g., cyclopropyl or cyclobutyl), optionally substituted with 1, 2, or 3 substituents independently selected from $R^{Cy1}$.

In some embodiments, $Cy^1$ is 4-7 membered heterocycloalkyl comprising at least 2 heteroatoms selected from O, S, and N (e.g., tetrahydrofuranyl, 1,3-dioxolanyl, or oxazolidine), optionally substituted with 1, 2, or 3 substituents independently selected from $R^{Cy1}$.

In some embodiments, $Y^1$ and $Y^2$ are each C and $Y^3$ is N.

In some embodiments, $Y^1$ and $Y^3$ are each C and $Y^2$ is N.

In some embodiments, $Y^2$ and $Y^3$ are each C and $Y^1$ is N.

In some embodiments, $Cy^1$ is 3-4 membered heterocycloalkyl comprising 1 heteroatom selected from O, S, and N (e.g., oxetane or oxirane), optionally substituted with 1, 2, or 3 substituents independently selected from $R^{Cy1}$.

In some embodiments, $R^1$, $R^2$, $R^3$, $R^4$, $R^5$, $R^6$, $R^7$, and $R^8$ are each independently selected from H, $C_{1-6}$ alkyl, $C_{1-4}$ haloalkyl, halo, CN, $NO_2$, $C_{1-6}$ alkoxy, $C_{1-4}$ haloalkoxy; wherein said $C_{1-6}$ alkyl is optionally substituted with $Cy^t$, halo, CN, $NO_2$, OH, $C_{1-6}$ alkoxy, or $C_{1-4}$ haloalkoxy.

In some embodiments, $R^1$, $R^2$, $R^3$, $R^4$, $R^5$, $R^6$, $R^7$, and $R^8$ are each independently selected from H, $C_{1-6}$ alkyl, and halo.

In some embodiments, $R^{N3}$, $R^{N4}$, $R^{N5}$, and $R^{N6}$ are each independently selected from H and $C_{1-6}$ alkyl.

In some embodiments, $R^9$ is $C_{1-3}$ alkyl.

In some embodiments, $R^9$ is halo.

In some embodiments, $R^{10}$ is $C_{1-3}$ alkyl.

In some embodiments, $R^{10}$ is halo.

In some embodiments, $R^9$ is $C_{1-3}$ alkyl and $R^{10}$ is halo.

In some embodiments, $R^9$ is halo and $R^{10}$ is $C_{1-3}$ alkyl.

In some embodiments, $R^9$ is H and $R^{10}$ is halo.

In some embodiments, $R^9$ is H and $R^{10}$ is $C_{1-3}$ alkyl.

In some embodiments, $R^9$ is halo and $R^{10}$ is halo.

In some embodiments, $R^9$ is halo and $R^{10}$ is H.

In some embodiments, $R^9$ is $C_{1-3}$ alkyl and $R^{10}$ is $C_{1-3}$ alkyl.

In some embodiments, $R^9$ is $C_{1-3}$ alkyl and $R^{10}$ is H.

In some embodiments, $R^A$ and $R^B$ are each H.

In some embodiments, $R^A$ is $C_{1-3}$ alkyl and $R^B$ is H.

In some embodiments, $R^A$ is $C_{1-3}$ alkyl and $R^B$ is $C_{1-3}$ alkyl.

In some embodiments, $R^A$ is H and $R^B$ is $C_{1-3}$ alkyl.

In some embodiments, $R^{Cy1}$ is selected from halo, $C_{1-4}$ alkyl, and $C_{1-4}$ haloalkyl. In some embodiments, $R^{Cy1}$ is $C_{1-4}$ alkyl. In some embodiments, $R^{Cy1}$ is halo.

In some embodiments, the compound of Formula (I) is not:

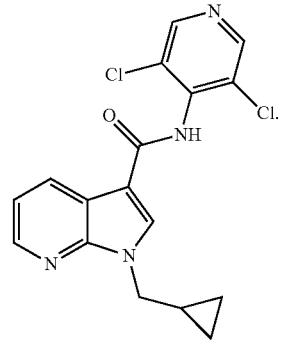 [SMILES: O=C(Nc1c(Cl)cncc1Cl)c1cn(CC2CC2)c2ncccc12]

In some embodiments, the compound of Formula (I) has formula:

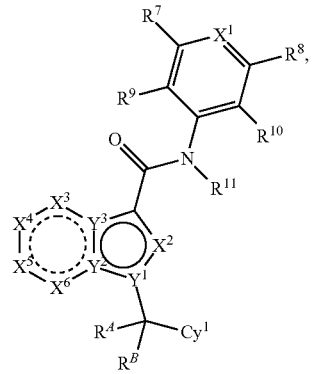

or a pharmaceutically acceptable salt thereof.

In some embodiments, the compound of Formula (I) has formula:

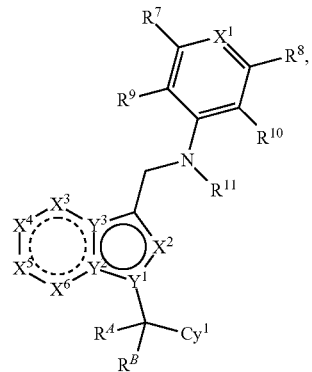

or a pharmaceutically acceptable salt thereof.

In some embodiments, the compound of Formula (I) has formula:

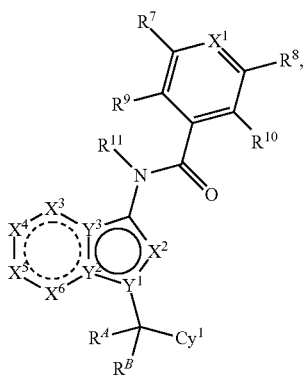

or a pharmaceutically acceptable salt thereof.

In some embodiments, the compound of Formula (I) has formula:

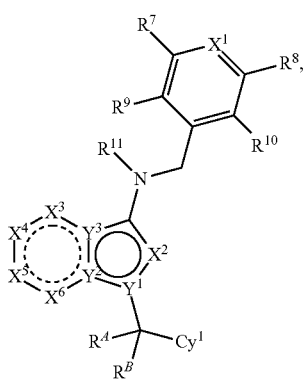

or a pharmaceutically acceptable salt thereof.

In some embodiments, the compound of Formula (I) has formula:

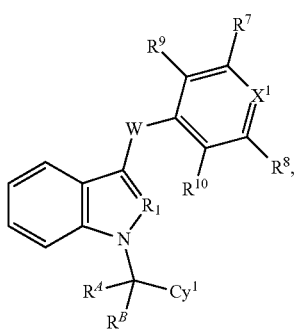

or a pharmaceutically acceptable salt thereof.

In some embodiments, the compound of Formula (I) has formula:

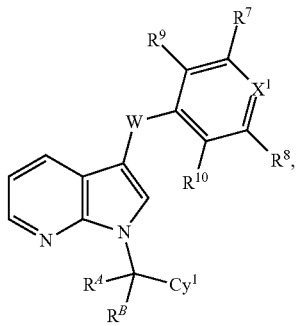

or a pharmaceutically acceptable salt thereof.

In some embodiments, the compound of Formula (I) has formula:

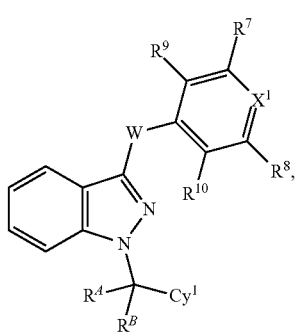

or a pharmaceutically acceptable salt thereof.

In some embodiments, the compound of Formula (I) has formula:

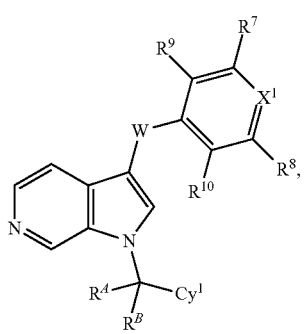

or a pharmaceutically acceptable salt thereof.

In some embodiments, the compound of Formula (I) has formula:

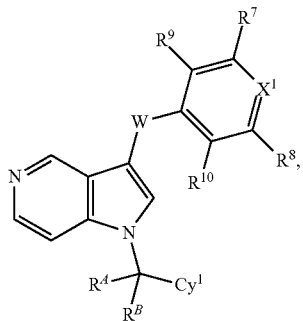

or a pharmaceutically acceptable salt thereof.

In some embodiments, the compound of Formula (I) has formula:

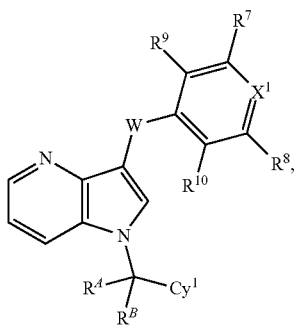

or a pharmaceutically acceptable salt thereof.

In some embodiments, the compound of Formula (I) has formula:

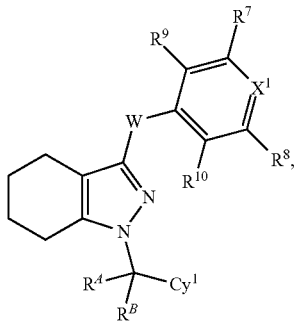

or a pharmaceutically acceptable salt thereof.

In some embodiments, the compound of Formula (I) has formula:

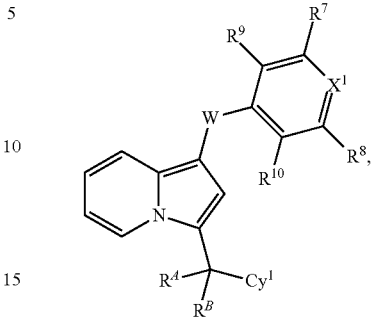

or a pharmaceutically acceptable salt thereof.

In some embodiments, the compound of Formula (I) has formula:

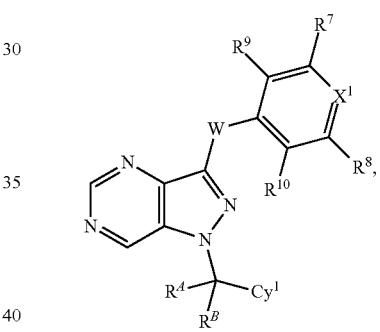

or a pharmaceutically acceptable salt thereof.

In some embodiments, the compound of Formula (I) has formula:

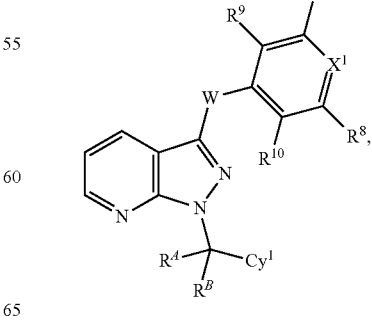

or a pharmaceutically acceptable salt thereof.

In some embodiments, the compound of Formula (I) has formula:

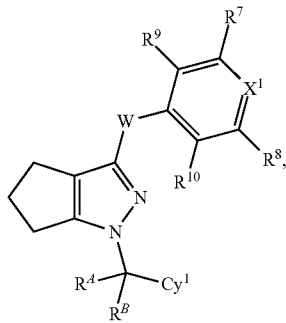

or a pharmaceutically acceptable salt thereof.

In some embodiments, the present application provides a compound of Formula (II):

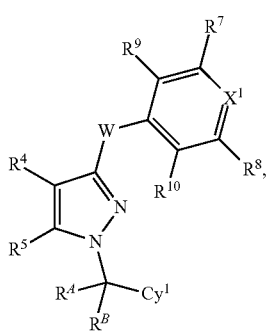

or a pharmaceutically acceptable salt thereof, wherein:

W is selected from C(=O)NR$^8$, NR$^8$C(=O), CH$_2$NR$^8$, and NR$^8$CH$_2$;

X$^1$ is selected from N and CR$^1$;

R$^1$, R$^2$, R$^3$, R$^4$, and R$^5$ are each independently selected from H, C$_{1-6}$ alkyl, C$_{2-6}$ alkenyl, C$_{2-6}$ alkynyl, C$_{1-4}$ haloalkyl, halo, CN, NO$_2$, OR$^{a1}$, C(O)R$^{b1}$, C(O)NR$^{c1}$R$^{d1}$, C(O)OR$^{a1}$, NR$^{c1}$R$^{d1}$, NR$^{c1}$C(O)R$^{b1}$, S(O)$_2$R$^{b1}$, S(O)$_2$R$^{b1}$, and S(O)$_2$NR$^{c1}$R$^{d1}$; wherein said C$_{1-6}$ alkyl, C$_{2-6}$ alkenyl, and C$_{2-6}$ alkynyl are each optionally substituted with 1, 2, 3, 4, or 5 substituents independently selected from Cy$^2$, halo, CN, NO$_2$, OR$^{a1}$, C(O)R$^{b1}$, C(O)NR$^{c1}$R$^{d1}$, C(O)OR$^{a1}$, NR$^{c1}$R$^{d1}$, NR$^{c1}$C(O)R$^{b1}$, NR$^{c1}$S(O)$_2$R$^{b1}$, S(O)$_2$R$^{b1}$, and S(O)$_2$NR$^{c1}$R$^{d1}$;

R$^6$ and R$^7$ are each independently selected from H, C$_{1-3}$ alkyl, and halo, provided that at least one of R$^6$ and R$^7$ is C$_{1-3}$ alkyl or halo; R$^8$ is selected from H and C$_{1-3}$ alkyl;

Cy$^1$ is selected from C$_{3-6}$ cycloalkyl and 4-7 membered heterocycloalkyl; wherein said C$_{3-6}$ cycloalkyl and 4-7 membered heterocycloalkyl are each optionally substituted with 1, 2, 3, 4, or 5 substituents independently selected from R$^{Cy1}$;

R$^{a1}$, R$^{c1}$, and R$^{d1}$ are each independently selected from H, C$_{1-6}$ alkyl, C$_{2-6}$ alkenyl, C$_{2-6}$ alkynyl, C$_{1-4}$ haloalkyl, C(O)R$^{b3}$, C(O)NR$^{c3}$R$^{d3}$; C(O)OR$^{a3}$, S(O)$_2$R$^{b3}$, S(O)$_2$NR$^{c3}$R$^{d3}$; wherein said C$_{1-6}$ alkyl, C$_{2-6}$ alkenyl, and C$_{2-6}$ alkynyl are each optionally substituted with 1, 2, 3, 4, or 5 substituents independently selected from Cy$^3$, halo, CN, NO$_2$, OR$^{a3}$, C(O)R$^{b3}$, C(O)NR$^{c3}$R$^{d3}$, C(O)OR$^{a3}$, NR$^{c3}$R$^{d3}$, NR$^{c3}$C(O)R$^{b3}$, NR$^{c3}$S(O)$_2$R$^{b3}$, NR$^{c3}$S(O)$_2$NR$^{c3}$R$^{d3}$, S(O)$_2$R$^{b3}$R$^{d3}$, S(O)$_2$NR$^{c3}$R$^{d3}$;

each R$^{b1}$ is independently selected from C$_{1-6}$ alkyl, C$_{2-6}$ alkenyl, C$_{2-6}$ alkynyl, and C$_{1-4}$ haloalkyl; wherein said C$_{1-6}$ alkyl, C$_{2-6}$ alkenyl, and C$_{2-6}$ alkynyl are each optionally substituted with 1, 2, 3, 4, or 5 substituents independently selected from Cy$^3$, halo, CN, NO$_2$, OR$^{a3}$, C(O)R$^{b3}$, C(O)NR$^{c3}$R$^{d3}$, C(O)OR$^{a3}$, NR$^{c3}$R$^{d3}$, NR$^{c3}$S(O)$_2$R$^{b3}$, NR$^{c3}$S(O)$_2$NR$^{c3}$R$^{d3}$, S(O)$_2$R$^{b3}$, and S(O)$_2$NR$^{c3}$R$^{d3}$;

each Cy$^2$ is independently selected from C$_{6-10}$ aryl, C$_{3-10}$ cycloalkyl, 5-10 membered heteroaryl, and 4-12 membered heterocycloalkyl, each of which is optionally substituted with 1, 2, 3, 4, or 5 substituents independently selected from R$^{Cy2}$;

each Cy$^3$ is independently selected from C$_{6-10}$ aryl, C$_{3-10}$ cycloalkyl, 5-10 membered heteroaryl, and 4-12 membered heterocycloalkyl, each of which is optionally substituted with 1, 2, 3, 4, or 5 substituents independently selected from R$^{Cy3}$;

R$^{a3}$, R$^{c3}$, and R$^{d3}$ are each independently selected from H, C$_{1-6}$ alkyl, C$_{1-4}$ haloalkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, (4-12 membered heterocycloalkyl)-C$_{1-4}$ alkylene C(O)R$^{b4}$, C(O)NR$^{c4}$R$^{d4}$, C(O)OR$^{a4}$, S(O)$_2$R$^{b4}$, and S(O)$_2$NR$^{c4}$R$^{d4}$; wherein said C$_{1-6}$ alkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene are each optionally substituted with 1, 2, 3, 4, or 5 substituents independently selected from C$_{1-6}$ alkyl, C$_{1-4}$haloalkyl, C$_{1-4}$ hydroxyalkyl, C$_{1-6}$ cyanoalkyl, halo, CN, NO$_2$, OR$^{a4}$, C(O)R$^{b4}$, C(O)NR$^{c4}$R$^{d4}$, C(O)OR$^{a4}$, NR$^{c4}$R$^{d4}$, NR$^{c4}$C(O)R$^{b4}$, NR$^{c4}$S(O)$_2$R$^{b4}$, S(O)$_2$R$^{b4}$, and S(O)$_2$NR$^{c4}$R$^{d4}$;

R$^{b3}$ is selected from C$_{1-6}$ alkyl, C$_{2-6}$ alkenyl, C$_{2-6}$ alkynyl, C$_{1-4}$ haloalkyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene, wherein said C$_{1-6}$ alkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene are each optionally substituted with 1, 2, 3, 4, or 5 substituents independently selected from C$_{1-6}$ alkyl, C$_{1-4}$ haloalkyl, C$_{1-4}$ hydroxyalkyl, C$_{1-6}$ cyanoalkyl, halo, CN, NO$_2$, OR$^{a4}$, C(O)R$^{b4}$, C(O)NR$^{c4}$R$^{d4}$, C(O)OR$^{a4}$, NR$^{c4}$R$^{d4}$, NR$^{c4}$C(O)R$^{b4}$, NR$^{c4}$C(O)R$^{a4}$, NR$^{c4}$S(O)$_2$R$^{b4}$, NR$^{c4}$S(O)$_2$NR$^{c4}$R$^{d4}$, S(O)$_2$R$^{b4}$, and S(O)$_2$NR$^{c4}$R$^{d4}$;

R$^{Cy1}$, R$^{Cy2}$, and R$^{Cy3}$ are each independently selected from halo, C$_{1-4}$ alkyl, C$_{1-4}$ haloalkyl, C$_{2-6}$ alkenyl, C$_{2-6}$ alkynyl, CN, NO$_2$, OR$^{a4}$, C(O)R$^{b4}$, C(O)NR$^{c4}$R$^{d4}$, C(O)OR$^{a4}$, NR$^{c4}$R$^{d4}$, NR$^{c4}$C(O)R$^{b4}$, NR$^{c4}$C(O)OR$^{a4}$, NR$^{c4}$S(O)$_2$R$^{b4}$, NR$^{c4}$S(O)$_2$NR$^{c4}$R$^{d4}$, S(O)$_2$R$^{b4}$, and S(O)$_2$NR$^{c4}$R$^{d4}$, wherein said C$_{1-4}$ alkyl, C$_{2-6}$ alkenyl, and C$_{2-6}$ alkynyl are each optionally substituted by 1, 2, 3, 4, or 5 substituents independently selected from halo, CN, NO$_2$, OR$^{a4}$, C(O)R$^{b4}$, C(O)NR$^{c4}$R$^{d4}$, C(O)OR$^{a4}$, NR$^{c4}$R$^{d4}$, NR$^{c4}$C(O)R$^{b4}$, NR$^{c4}$C(O)OR$^{a4}$, NR$^{c4}$S(O)$_2$R$^{b4}$, NR$^{c4}$S(O)$_2$NR$^{c4}$R$^{d4}$, S(O)$_2$R$^{b4}$, and S(O)$_2$NR$^{c4}$R$^{d4}$;

R$^{a4}$, R$^{c4}$, and R$^{d4}$ are each independently selected from H, C$_{1-6}$ alkyl, C$_{1-4}$ haloalkyl, C$_{1-4}$ hydroxyalkyl, C$_{1-4}$ cyanoalkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, (4-12 membered heterocycloalkyl)-C$_{1-4}$ alkylene and R$^g$, wherein said C$_{1-6}$ alkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene are each optionally substituted with 1, 2, 3, 4, or 5 substituents independently selected from R$^g$;

each R$^{b4}$ is independently selected from C$_{1-6}$ alkyl, C$_{1-4}$ haloalkyl, C$_{1-4}$ hydroxyalkyl, C$_{1-4}$ cyanoalkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, (4-12 membered heterocycloalkyl)-C$_{1-4}$ alkylene and R$^g$, wherein said C$_{1-6}$ alkyl; C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene is optionally substituted with 1, 2, 3, 4, or 5 substituents independently selected from R$^g$;

or any R$^{c1}$ and R$^{d1}$ together with the N atom to which they are attached form a 4-, 5-, 6-, or 7-membered heterocycloalkyl group optionally substituted with 1, 2, or 3 substituents independently selected from R$^g$;

or any R$^{c2}$ and R$^{d2}$ together with the N atom to which they are attached form a 4-, 5-, 6-, or 7-membered heterocycloalkyl group optionally substituted with 1, 2, or 3 substituents independently selected from R$^g$;

or any R$^{c3}$ and R$^{d3}$ together with the N atom to which they are attached form a 4-, 5-, 6-, or 7-membered heterocycloalkyl group optionally substituted with 1, 2, or 3 substituents independently selected from R$^g$;

or any R$^{c4}$ and R$^{d4}$ together with the N atom to which they are attached form a 4-, 5-, 6-, or 7-membered heterocycloalkyl group optionally substituted with 1, 2, or 3 substituents independently selected from R$^g$; and each R$^g$ is independently selected from OH, NO$_2$, CN, halo, C$_{1-6}$ alkyl, C$_{2-6}$ alkenyl, C$_{2-6}$ alkynyl, haloalkyl, C$_{1-6}$ alkoxy, C$_{1-6}$ haloalkoxy, cyano-C$_{1-3}$ alkylene, HO—C$_{1-3}$ alkylene, C$_{6-10}$ aryl, C$_{6-10}$ aryloxy, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, (4-12 membered heterocycloalkyl)-C$_{1-4}$ alkylene, amino, C$_{1-6}$ alkylamino, di(C$_{1-6}$ alkyl)amino, thio, C$_{1-6}$ alkylthio, C$_{1-6}$ alkylsulfinyl, C$_{1-6}$ alkylsulfonyl, carbamyl. C$_{1-6}$ alkylcarbamyl, di(C$_{1-6}$ alkyl)carbamyl, carboxy, C$_{1-6}$ alkylcarbonyl, C$_{1-6}$ alkoxycarbonyl, C$_{1-6}$ alkylcarbonylamino, C$_{1-6}$ alkylsulfonylamino, aminosulfonyl, C$_{1-6}$ alkylaminosulfonyl, di(C$_{1-6}$ alkyl)aminosulfonyl, aminosulfonylamino, C$_{1-6}$ alkylaminosulfonylamino, di(C$_{1-6}$ alkyl)aminosulfonylamino, aminocarbonylamino, C$_{1-6}$ alkylaminocarbonylamino, and di(C$_{1-6}$ alkyl)aminocarbonylamino.

In some embodiments, the compound of Formula (II) is not any one of the compounds selected from:

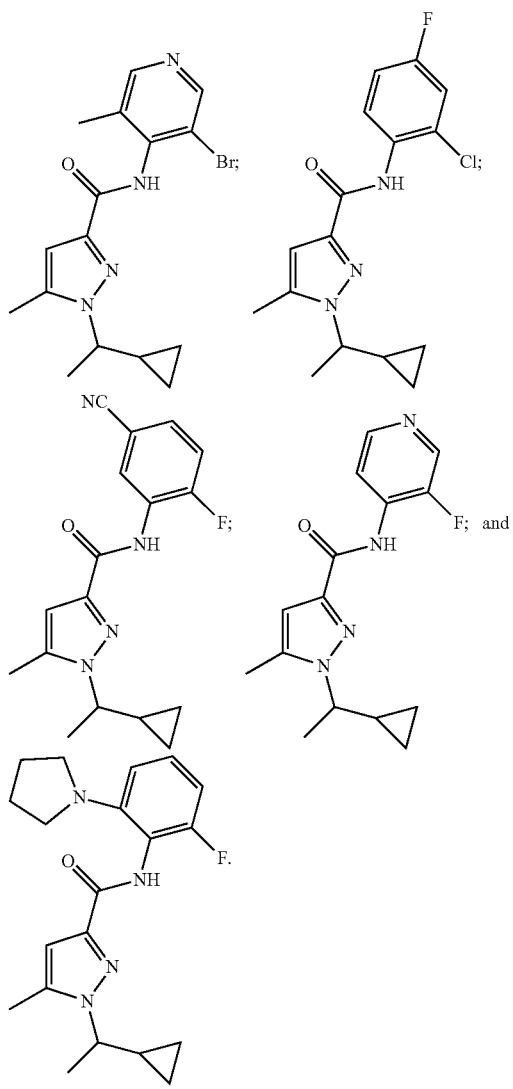

In some embodiments, the compound of Formula (II) has formula:

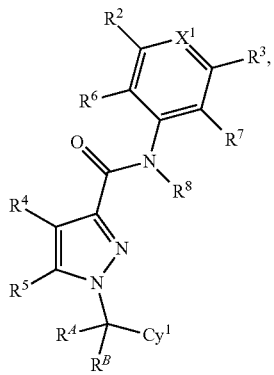

or a pharmaceutically acceptable salt thereof.

In some embodiments, the compound of Formula (II) has formula:

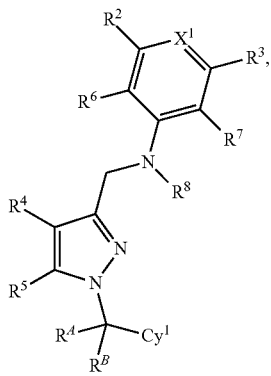

or a pharmaceutically acceptable salt thereof.

In some embodiments, the compound of Formula (II) has formula:

or a pharmaceutically acceptable salt thereof.

In some embodiments, the compound of Formula (II) has formula:

or a pharmaceutically acceptable salt thereof.

In some embodiments, the compound of Formula (I) or Formula (II) selected from any one of the compounds listed in Table A, or a pharmaceutically acceptable salt thereof.

TABLE A

| No. | Structure |
| --- | --- |
| 1 | |
| 2 | |
| 3 | |
| 4 | |

TABLE A-continued

| No. | Structure |
|---|---|
| 5 | 1-(cyclopropylmethyl)-N-(3-fluoropyridin-4-yl)-1H-pyrrolo[2,3-b]pyridine-3-carboxamide |
| 6 | 1-(cyclopropylmethyl)-N-(3-methylpyridin-4-yl)-1H-indazole-3-carboxamide |
| 7 | 1-(cyclobutylmethyl)-N-(3,5-difluoropyridin-4-yl)-1H-indole-3-carboxamide |
| 8 | 1-(cyclobutylmethyl)-N-(3-fluoropyridin-4-yl)-1H-indole-3-carboxamide |
| 9 | 1-(cyclobutylmethyl)-N-(3-methylpyridin-4-yl)-1H-indole-3-carboxamide |
| 10 | 1-(cyclobutylmethyl)-N-(3-fluoropyridin-4-yl)-1H-indazole-3-carboxamide |
| 11 | 1-(cyclobutylmethyl)-N-(3-methylpyridin-4-yl)-1H-indazole-3-carboxamide |
| 12 | N-(3-fluoropyridin-4-yl)-1-(oxetan-3-ylmethyl)-1H-indole-3-carboxamide |

(Note: structures shown as drawings in the original; names are illustrative placeholders for the depicted compounds.)

TABLE A-continued

| No. | Structure |
|---|---|
| 13 | (N-(3-fluoropyridin-4-yl)-1-(cyclopropylmethyl)-1H-indole-3-carboxamide) |
| 14 | (N-(3-fluoropyridin-4-yl)-N-methyl-1-(cyclopropylmethyl)-1H-indole-3-carboxamide) |
| 15 | (N-((1-(cyclopropylmethyl)-1H-indol-3-yl)methyl)-3-fluoropyridin-4-amine) |
| 16 | (N-(3-fluoropyridin-4-yl)-1-(cyclopropylmethyl)-1H-pyrrolo[2,3-c]pyridine-3-carboxamide) |
| 17 | (N-(3-fluoropyridin-4-yl)-1-(cyclopropylmethyl)-1H-pyrrolo[3,2-c]pyridine-3-carboxamide) |
| 18 | (N-(3-fluoropyridin-4-yl)-1-(cyclopropylmethyl)-1H-pyrrolo[3,2-b]pyridine-3-carboxamide) |
| 19 | (N-(3-methylpyridin-4-yl)-1-(cyclopropylmethyl)-1H-pyrazole-3-carboxamide) |
| 20 | (N-(3-fluoropyridin-4-yl)-1-(cyclopropylmethyl)-1H-pyrazole-3-carboxamide) |

TABLE A-continued
| No. | Structure |
|---|---|
| 21 | 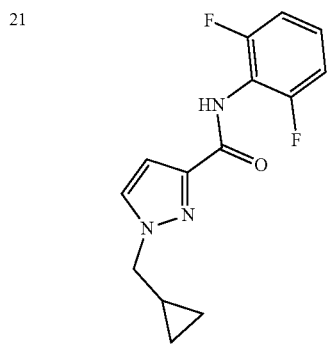 |
| 22 | 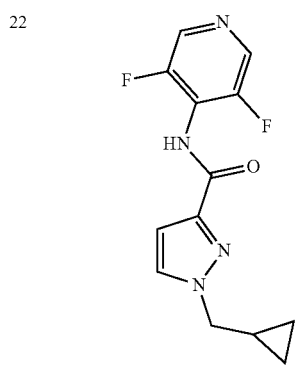 |
| 23 | 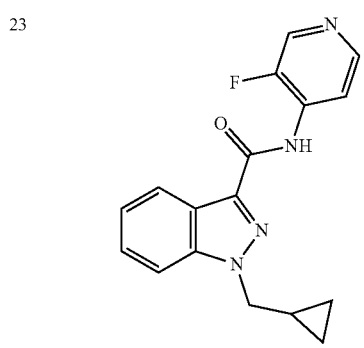 |
| 24 | 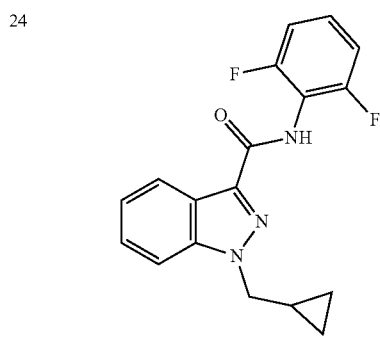 |
| 25 | 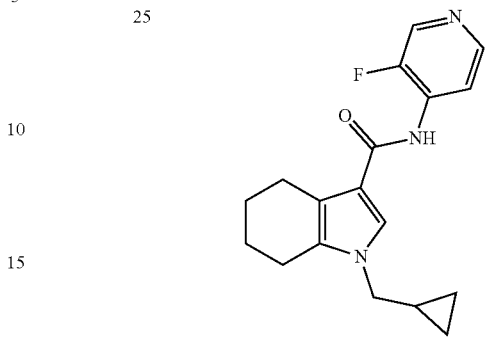 |
| 26 | 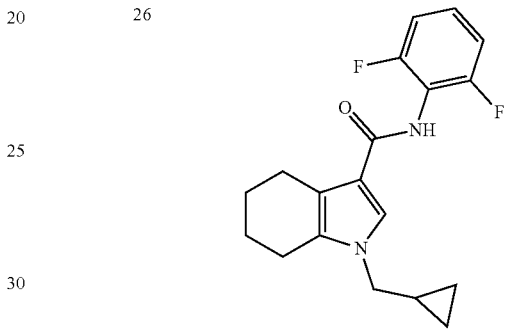 |
| 27 | 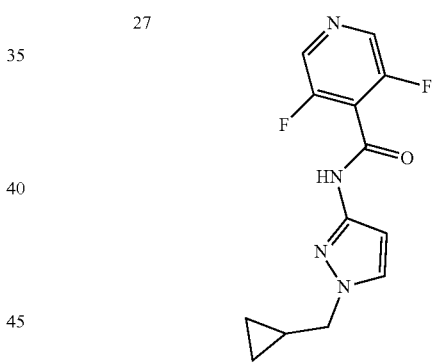 |
| 28 | 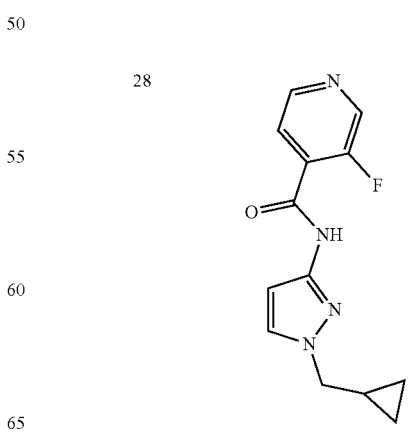 |

TABLE A-continued
| No. | Structure |
|---|---|
| 29 | 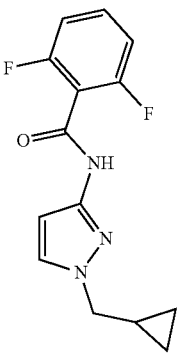 |
| 30 | 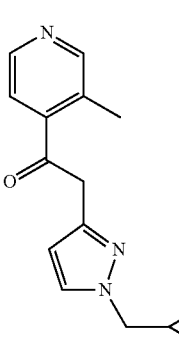 |
In some embodiments, the compound of Formula (I) or Formula (II) is selected from any one of the compounds listed in Table B, or a pharmaceutically acceptable salt thereof.
TABLE B
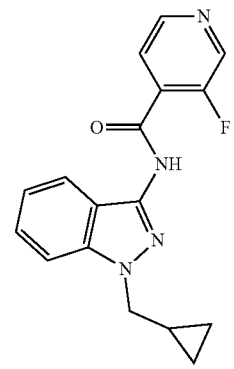 [SMILES: O=C(Nc1nn(CC2CC2)c2ccccc12)c1ccncc1F]
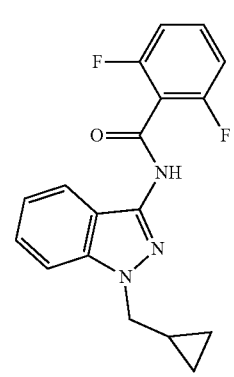 [SMILES: O=C(Nc1nn(CC2CC2)c2ccccc12)c1c(F)cccc1F]
TABLE B-continued
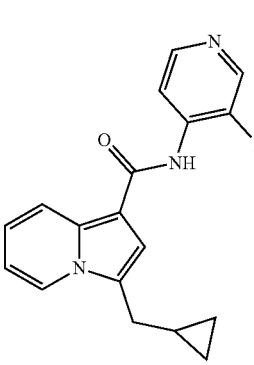
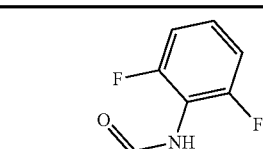
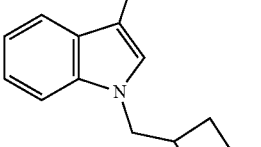
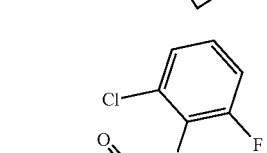

TABLE B-continued
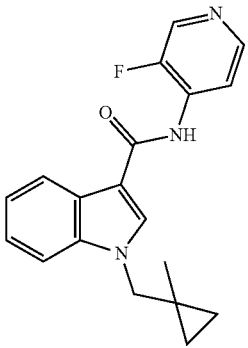 [SMILES: CC1(Cn2cc(C(=O)Nc3ccncc3F)c3ccccc32)CC1]
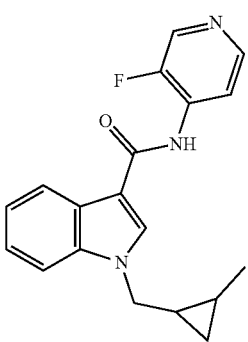 [SMILES: CC1CC1Cn1cc(C(=O)Nc2ccncc2F)c2ccccc21]
In some embodiments, the compound of Formula (I) or Formula (II) is selected from any one of the compounds listed in Table C, or a pharmaceutically acceptable salt thereof.
TABLE C
| No | Structure |
| --- | --- |
| 31 | |
TABLE C-continued
| No | Structure |
| --- | --- |
| 32 | |
| 33 | |
| 34 | |
| 35 | |

TABLE C-continued
| No | Structure |
|----|-----------|
| 36 | 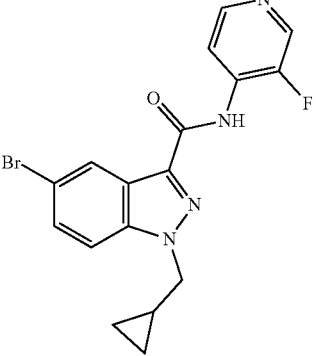 |
| 37 | 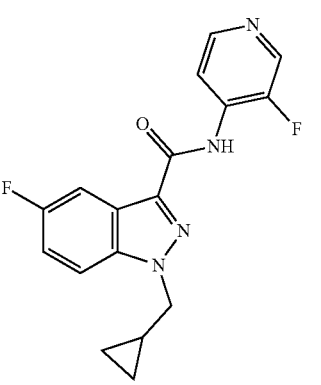 [SMILES: O=C(Nc1ccncc1F)c1nn(CC2CC2)c2ccc(F)cc12] |
| 38 | 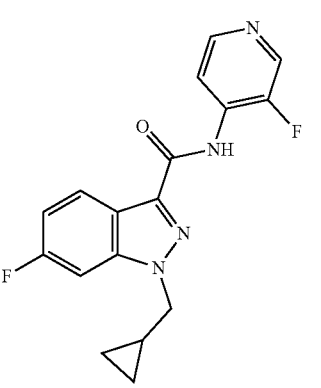 [SMILES: O=C(Nc1ccncc1F)c1nn(CC2CC2)c2cc(F)ccc12] |
| 39 | 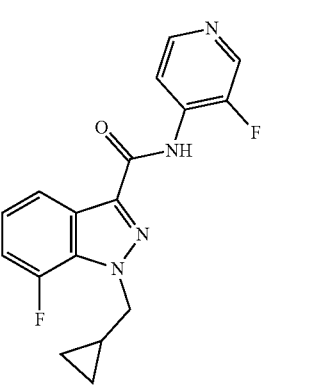 [SMILES: O=C(Nc1ccncc1F)c1nn(CC2CC2)c2c(F)cccc12] |
| 40 | 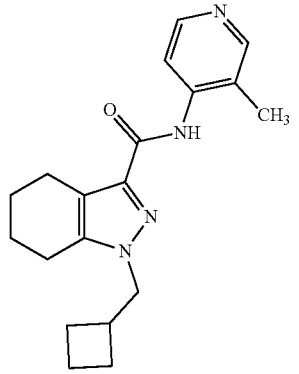 [SMILES: Cc1cnccc1NC(=O)c1nn(CC2CCC2)c2c1CCCC2] |
| 41 | 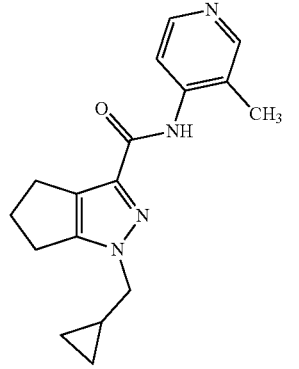 [SMILES: Cc1cnccc1NC(=O)c1nn(CC2CC2)c2c1CCC2] |
| 42 | 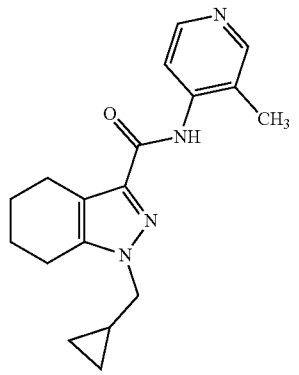 [SMILES: Cc1cnccc1NC(=O)c1nn(CC2CC2)c2c1CCCC2] |
| 43 | 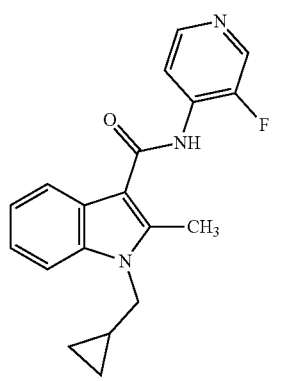 [SMILES: Cc1c(C(=O)Nc2ccncc2F)c2ccccc2n1CC1CC1] |
In some embodiments, a salt of a compound of Formula (I) or Formula (II) disclosed herein, or any other compound disclosed herein, is formed between an acid and a basic group of the compound, such as an amino functional group, or a base and an acidic group of the compound, such as a carboxyl functional group. According to another embodiment, the compound is a pharmaceutically acceptable acid addition salt.

In some embodiments, acids commonly employed to form pharmaceutically acceptable salts of the compound as set forth in Formula (I) or Formula (II) disclosed herein include inorganic acids such as hydrogen bisulfide, hydrochloric acid, hydrobromic acid, hydroiodic acid, sulfuric acid and phosphoric acid, as well as organic acids such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, dinitrobenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts. In one embodiment, pharmaceutically acceptable acid addition salts include those formed with mineral acids such as hydrochloric acid and hydrobromic acid, and those formed with organic acids such as maleic acid.

In some embodiments, bases commonly employed to form pharmaceutically acceptable salts of the compound as set forth in Formula (I) or Formula (II) include hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or tri-alkylamines, dicyclohexylamine; tributyl amine; pyridine; N-methyl, N-ethylamine; diethylamine; triethylamine; mono-, bis-, or tris-(2-OH—($C_1$-$C_6$)-alkylamine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like.

In some embodiments, the compound as set forth in Formula (I) or Formula (II) disclosed herein, or pharmaceutically acceptable salts thereof, are substantially isolated.

Methods of Use

Figure 4:
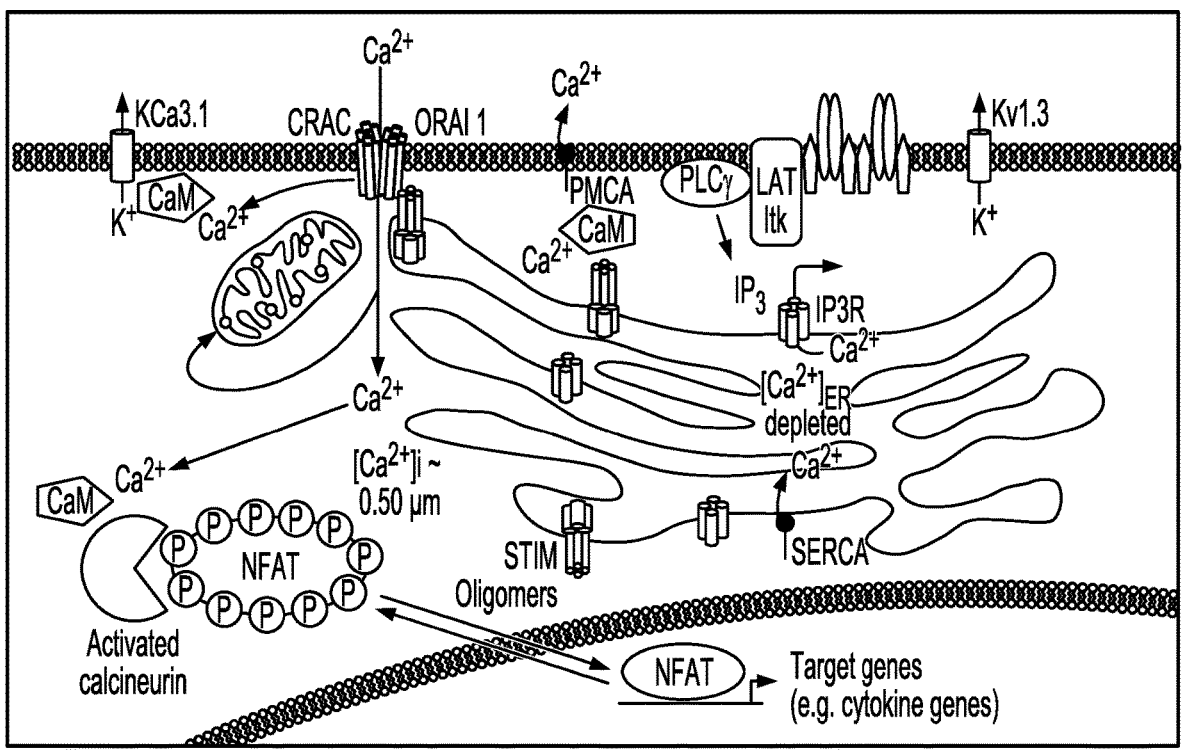
FIG. 4 contains a schematic summary of CRAC channel in T cell function. Ca2+ influx through the OARI CRAC channel is indispensable for the NFAT nuclear translocation and target gene transcription.

Calcium elevations are required for T lymphocyte proliferation in response to antigen recognition. Specifically, it is believed that calcium influx into the cytoplasm are necessary for efficient T cell proliferation. Research over the past two decades has identifying the plasma membrane calcium channels responsible for governing $Ca^{2+}$ influx in lymphocytes and Orai and STIM proteins were shown to be crucial for persistent calcium mobilization. Pharmacologic or genetic suppression of calcium influx gives rise to lymphoproliferative defects. The calcium ($Ca^{2+}$) release activated $Ca^{2+}$ (CRAC) channel selectively controls the effector function of CD4+ and CD8+ T lymphocytes, but spares the function of regulatory T cells. The CRAC channel is composed of the pore-forming transmembrane Orai protein and is gated by the intracellular $Ca^{2+}$ senor STIM protein (FIG. 4). ORAI channel protein is typically expressed on mast cells and/or T cells. Human genetics have provided the strongest validation of Orai as a drug target for treating autoimmune diseases, as inactivation mutation of Orai is the underline cause of the life threatening severe combined immune deficiency (SCID) that is characterized by uncontrollable infection. The validity of therapeutic targeting of Orai is further corroborated by findings from Orai knockout (KO) mice that are defined by deficient effector T cell functions and resistance to induction of autoimmune disorders (e.g. EAE).

Accordingly, in some embodiments, the present disclosure provides a method of inhibiting an ORAI ion channel protein in a cell, comprising contacting the cell with a compound of Formula (I) or Formula (II) described herein, or a pharmaceutically acceptable salt thereof. The cell may be contacted in vitro, in vivo (e.g., in a subject), or ex vivo. In some embodiments, the cell is a T cell or a mast cell.

In some embodiments, the present disclosure provides a method of inhibiting a production of inflammatory cytokines in a cell, comprising contacting the cell with a compound of Formula (I) or Formula (II) described herein, or a pharmaceutically acceptable salt thereof. The cell may be contacted in vitro, in vivo (e.g., in a subject), or ex vivo. In some embodiments, the cell is a T cell or a mast cell.

In some embodiments, the present disclosure provides a method of inhibiting a T-cell proliferation, comprising contacting the T-cell with a compound of Formula (I) or Formula (II) described herein, or a pharmaceutically acceptable salt thereof. The cell may be contacted in vitro, in vivo (e.g., in a subject), or ex vivo.

In some embodiments, the compounds of the present disclosure inhibit ORAI ion channel protein reversibly. Irreversible inhibition leads to unrecoverable channel function after inhibitor washout. The irreversible inhibition is a major safety concern in the setting of chronic inflammatory diseases. The compound of this application inhibit the Orai current and $Ca^{2+}$ influx reversibly and instantaneously without any preincubation (FIG. 5). Furthermore, most reported ORAI channel blockers are highly hydrophobic compounds and require long term preincubation to exert inhibition of channel activity, which has costed doubts on their mechanism of action. The compounds described herein possess reduced lipophilicity and increased water solubility, and demonstrate potent inhibition of ORAI channel activity and inhibition of the release of inflammatory cytokines. Due to their hydrophilic nature, the compounds are advantageously suitable for oral administration.

Accordingly, in some embodiments, the present disclosure provides a method for treating or preventing a disease or condition selected from: an autoimmune disease, an inflammatory disease, a cardiovascular disease, and a cancer, the method comprising administering to the subject a therapeutically effective amount of a compound of Formula (I) or Formula (II), or a pharmaceutically acceptable salt thereof, or a pharmaceutical composition comprising same.

Suitable examples of autoimmune diseases include severe combined immune deficiency (SCID), rheumatoid arthritis, inflammatory bowel disease (IBD), type 1 diabetes mellitus, multiple sclerosis (MS), chronic inflammatory demyelinating polyneuropathy, Guillain-Barre syndrome, psoriasis, Graves' disease, Hashimoto's, thyroiditis, my asthenia gravis, and vasculitis.

Suitable examples of inflammatory diseases include chronic obstructive pulmonary disease (COPD), atherosclerosis, vein graft failure, rheumatoid arthritis, psoriasis, multiple sclerosis, rheumatoid arthritis, psoriasis, psoriatic arthritis, osteoarthritis, degenerative arthritis, polymyalgia rheumatic, ankylosing spondylitis, reactive arthritis, gout, pseudogout, inflammatory joint disease, lupus, systemic lupus erythematosus, polymyositis, and fibromyalgia. Additional types of inflammatory disease or conditions include achilles tendinitis, achondroplasia, acromegalic arthropathy, adhesive capsulitis, adult onset Still's disease, anserine bursitis, avascular necrosis, Behcet's syndrome, bicipital tendinitis, Blount's disease, brucellar spondylitis, bursitis, calcaneal bursitis, calcium pyrophosphate dihydrate deposition disease (CPPD), crystal deposition disease, Caplan's syndrome, carpal tunnel syndrome, chondrocalcinosis, chondromalacia patellae, chronic synovitis, chronic recurrent multifocal osteomyelitis, Churg-Strauss syndrome, Cogan's syndrome, corticosteroid-induced osteoporosis, costosternal syndrome, CREST syndrome, cryoglobulinemia, degenerative joint disease, dermatomyositis, diabetic finger sclerosis, diffuse idiopathic skeletal hyperostosis (DISH), discitis, discoid lupus erythematosus, drug-induced lupus, Duchenne's muscular dystrophy, Dupuytren's contracture, Ehlers-Danlos syndrome, enteropathic arthritis, epicondylitis, erosive inflammatory osteoarthritis, exercise-induced compartment syndrome, Fabry's disease, familial Mediterranean fever, Farber's lipogranulomatosis, Felty's syndrome, Fifth's disease, flat feet, foreign body synovitis, Freiberg's disease, fungal arthritis, Gaucher's disease, giant cell arteritis, gonococcal arthritis, Goodpasture's syndrome, granulomatous arteritis, hemarthrosis, hemochromatosis, Henoch-Schonlein purpura, Hepatitis B surface antigen disease, hip dysplasia, Hurler syndrome, hypermobility syndrome, hypersensitivity vasculitis, hypertrophic osteoarthropathy, immune complex disease, impingement syndrome, Jaccoud's arthropathy, juvenile ankylosing spondylitis, juvenile dermatomyositis, juvenile rheumatoid arthritis, Kawasaki disease, Kienbock's disease, Legg-Calve-Perthes disease, Lesch-Nyhan syndrome, linear scleroderma, lipoid dermatoarthritis, Lofgren's syndrome, Lyme disease, malignant synoviома, Marfan's syndrome, medial plica syndrome, metastatic carcinomatous arthritis, mixed connective tissue disease (MCTD), mixed cryoglobulinemia, mucopolysaccharidosis, multicentric reticulohistiocytosis, multiple epiphyseal dysplasia, mycoplasmal arthritis, myofascial pain syndrome, neonatal lupus, neuropathic arthropathy, nodular panniculitis, ochronosis, olecranon bursitis, Osgood-Schlatter's disease, osteoarthritis, osteochondromatosis, osteogenesis imperfecta, osteomalacia, osteomyelitis, osteonecrosis, osteoporosis, overlap syndrome, pachydermoperiostosis, Paget's disease of bone, palindromic rheumatism, patellofemoral pain syndrome, Pellegrini-Stieda syndrome, pigmented villonodular synovitis, piriformis syndrome, plantar fasciitis, polyarteritis nodos, polymyalgia rheumatica, polymyositis, popliteal cysts, posterior tibial tendinitis, Pott's disease, prepatellar bursitis, prosthetic joint infection, pseudoxanthoma elasticum, psoriatic arthritis, Raynaud's phenomenon, reactive arthritis/Reiter's syndrome, reflex sympathetic dystrophy syndrome, relapsing polychondritis, reperfusion injury, retrocalcaneal bursitis, rheumatic fever, rheumatoid vasculitis, rotator cuff tendinitis, sacroiliitis, *Salmonella* osteomyelitis, sarcoidosis, saturnine gout, Scheuermann's osteochondritis, scleroderma, septic arthritis, seronegative arthritis, *Shigella* arthritis, shoulder-hand syndrome, sickle cell arthropathy, Sjogren's syndrome, slipped capital femoral epiphysis, spinal stenosis, spondylolysis, *Staphylococcus* arthritis, Stickler syndrome, subacute cutaneous lupus, Sweet's syndrome, Sydenham's chorea, syphilitic arthritis, systemic lupus erythematosus (SLE), Takayasu's arteritis, tarsal tunnel syndrome, tennis elbow, Tietse's syndrome, transient osteoporosis, traumatic arthritis, trochanteric bursitis, tuberculosis arthritis, ulcerative colitis, undifferentiated connective tissue syndrome (UCTS), urticarial vasculitis, viral arthritis, Wegener's granulomatosis, Whipple's disease, Wilson's disease, and yersinial arthritis.

Suitable examples of cardiovascular diseases include hypertension, atherosclerosis, thrombosis, deep vein thrombosis, pulmonary embolism, coronary artery disease (CAD), ischemialreperfusion injury, ischemia, cerebral ischemia, heart attack, stroke, myocardial infarction, angina, heart failure, hypertensive heart disease, rheumatic heart disease, cardiomyopathy, celiac disease, cardiac arrest, high blood pressure, arrhythmia, congenital heart disease, peripheral artery disease, restenosis, ischemic stroke, and bronchial asthma.

Suitable examples of cancer include bladder cancer, brain cancer, breast cancer, colorectal cancer, cervical cancer, gastrointestinal cancer, genitourinary cancer, head and neck cancer, lung cancer, ovarian cancer, pancreatic cancer, prostate cancer, renal cancer, skin cancer, and testicular cancer. In some embodiments, the cancer is prostate cancer. In some embodiments, cancer is selected from sarcoma, angiosarcoma, fibrosarcoma, rhabdomyosarcoma, liposarcoma, myxoma, rhabdomyoma, fibroma, lipoma, teratoma, lung cancer, bronchogenic carcinoma squamous cell, undifferentiated small cell, undifferentiated large cell, adenocarcinoma, alveolar bronchiolar carcinoma, bronchial adenoma, sarcoma, lymphoma, chondromatous hamartoma, mesothelioma, gastrointestinal cancer, cancer of the esophagus, squamous cell carcinoma, adenocarcinoma, leiomyosarcoma, lymphoma, cancer of the stomach, carcinoma, lymphoma, leiomyosarcoma, cancer of the pancreas, ductal adenocarcinoma, insulinoma, glucagonoma, gastrinoma, carcinoid tumor, vipoma, cancer of the small bowel, adenocarcinoma, lymphoma, carcinoid tumors, Kaposi's sarcoma, leiomyoma, hemangioma, lipoma, neurofibroma, fibroma; cancer of the large bowel or colon, tubular adenoma, villous adenoma, hamartoma, leiomyoma, genitourinary tract cancer, cancer of the kidney adenocarcinoma, Wilm's tumor (nephroblastoma), lymphoma, leukemia, cancer of the bladder, cancer of the urethra, squamous cell carcinoma, transitional cell carcinoma, cancer of the prostate, cancer of the testis, seminoma, teratoma, embryonal carcinoma, teratocarcinoma, choriocarcinoma, sarcoma, interstitial cell carcinoma, fibroma, fibroadenoma, adenomatoid tumors, lipoma, liver cancer, hepatoma hepatocellular carcinoma, cholangiocarcinoma, hepatoblastoma, angiosarcoma, hepatocellular adenoma, hemangioma, bone cancer, osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor, chordoma, osteochrondroma (osteocartilaginous exostoses), benign chondroma, chondroblastoma, chondromyxofibroma, osteoid osteoma giant cell tumor, nervous system cancer, cancer of the skull, osteoma, hemangioma, granuloma, xanthoma, osteitis deformans, cancer of the meninges meningioma, meningiosarcoma, gliomatosis, cancer of the brain, astrocytoma, medulloblastoma, glioma, ependymoma, germinoma (pinealoma), glioblastoma multiforme, oligodendroglioma, schwannoma, retinoblastoma, congenital tumors, cancer of the spinal cord, neurofibroma, meningioma, glioma, sarcoma, gynecological cancer, cancer of the uterus, endometrial carcinoma, cancer of the cervix, cervical carcinoma, pre tumor cervical dysplasia, cancer of the ovaries, ovarian carcinoma, serous cystadenocarcinoma, mucinous cystadenocarcinoma, unclassified carcinoma, granulosa-theca cell tumor, Sertoli Leydig cell tumor, dysgerminoma, malignant teratoma, cancer of the vulva, squamous cell carcinoma, intraepithelial carcinoma, adenocarcinoma, fibrosarcoma, melanoma, cancer of the vagina, clear cell carcinoma, squamous cell carcinoma, botryoid sarcoma, embryonal rhabdomyosarcoma, cancer of the fallopian tubes, hematologic cancer, cancer of the blood, acute myeloid leukemia (AML), chronic myeloid leukemia (CML), acute lymphoblastic leukemia (ALL), chronic lymphoblastic leukemia, chronic lymphocytic leukemia, myeloproliferative diseases, multiple myeloma, myelodysplastic syndrome, Hodgkin's lymphoma, non-Hodgkin's lymphoma (malignant lymphoma), Waldenstrom's macroglobulinemia, skin cancer, malignant melanoma, basal cell carcinoma, squamous cell carcinoma, Kaposi's sarcoma, moles dysplastic nevi, lipoma, angioma, dermatofibroma, keloids, psoriasis, adrenal gland cancer, and neuroblastoma.

Pharmaceutical Compositions

This document also provides pharmaceutical compositions comprising an effective amount of a compound or Formula (I) or Formula (II) disclosed herein, or a pharmaceutically acceptable salt thereof, and a pharmaceutically acceptable carrier. The pharmaceutical composition also can comprise any one of the additional therapeutic agents and/or therapeutic molecules described herein. The carrier(s) are "acceptable" in the sense of being compatible with the other ingredients of the formulation and, in the case of a pharmaceutically acceptable carrier, not deleterious to the recipient thereof in an amount used in the medicament.

Pharmaceutically acceptable carriers, adjuvants, and vehicles that can be used in the pharmaceutical compositions provided herein include, without limitation, ion exchangers, alumina, aluminum stearate, lecithin, serum proteins (e.g., human serum albumin), buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol, and wool fat.

The compositions or dosage forms can contain any one or more of the compounds or therapeutic agents described herein in the range of 0.005 percent to 100 percent with the balance made up from the suitable pharmaceutically acceptable carriers or excipients. The contemplated compositions can contain from about 0.001 percent to about 100 percent (e.g., from about 0.1 percent to about 95 percent, from about 75 percent to about 85 percent, or from about 20 percent to about 80 percent) of any one or more of the compounds or therapeutic agents provided herein, wherein the balance can be made up of any pharmaceutically acceptable carrier or excipient described herein, or any combination of these carriers or excipients.

Routes of Administration and Dosage Forms

The therapeutic compounds and/or pharmaceutical compositions provided herein (e.g., a composition containing one or more compounds of or Formula (I) or Formula (II), or a pharmaceutically acceptable salt thereof) can include those suitable for any acceptable route of administration. Acceptable routes of administration include, without limitation, buccal, cutaneous, endocervical, endosinusial, endotracheal, enteral, epidural, interstitial, intra-abdominal, intra-arterial, intrabronchial, intrabursal, intracerebral, intracisternal, intracoronary, intradermal, intracranial, intraductal, intraduodenal, intradural, intraepidermal, intraesophageal, intragastric, intragingival, intraileal, intralymphatic, intramedullary, intrameningeal, intramuscular, intranasal, intraovarian, intraperitoneal, intraprostatic, intrapulmonary, intrasinal, intraspinal, intrasynovial, intratesticular, intrathecal; intratubular, intratumoral, intrauterine, intravascular, intravenous, nasal, nasogastric, oral, parenteral, percutaneous, peridural, rectal, respiratory (inhalation), subcutaneous, sublingual, submucosal, topical, transdermal, transmucosal, transtracheal, ureteral, urethral, vaginal, intravitreal, subretinal or other intraocular routes of administrations.

Compositions and formulations described herein can conveniently be presented in a unit dosage form, e.g., tablets, sustained release capsules, and in liposomes, and can be prepared by any methods well known in the art of pharmacy. See, for example, Remington: The Science and Practice of Pharmacy, Lippincott Williams & Wilkins, Baltimore, MD (20th ed. 2000). Such preparative methods include, without limitation, the step of bringing into association with the molecule to be administered ingredients such as a carrier that constitutes one or more accessory ingredients. In general, the compositions can be prepared by uniformly and intimately bringing into association the active ingredients with liquid carriers, liposomes, or finely divided solid carriers, or both, and then, if necessary, shaping the product.

In some embodiments, any one or more of the compounds or therapeutic agents described herein can be administered orally. Compositions described herein that are suitable for oral administration can be presented as discrete units such as capsules, sachets, granules, or tablets each containing a predetermined amount (e.g., effective amount) of the active ingredient(s); a powder or granules; a solution or a suspension in an aqueous liquid or a non-aqueous liquid; an oil-in-water liquid emulsion; a water-in-oil liquid emulsion; packed in liposomes; or as a bolus. Soft gelatin capsules can be useful for containing such suspensions, which can beneficially increase the rate of compound absorption. In the case of tablets for oral use, carriers that are commonly used include, without limitation, lactose, sucrose, glucose, mannitol, silicic acid, and starches. Other acceptable excipients can include, without limitation, (a) fillers or extenders such as starches, lactose, sucrose, glucose, mannitol, and silicic acid, (b) binders such as carboxymethylcellulose, alginates, gelatin, polyvinylpyrrolidone, sucrose, and acacia, (c) humectants such as glycerol, (d) disintegrating agents such as agar-agar, calcium carbonate, potato or tapioca starch, alginic acid, certain silicates, and sodium carbonate, (e) solution retarding agents such as paraffin, (f) absorption accelerators such as quaternary ammonium compounds; (g) wetting agents such as cetyl alcohol and glycerol monostearate, (h) absorbents such as kaolin and bentonite clay, and (i) lubricants such as talc, calcium stearate, magnesium stearate, solid polyethylene glycols, sodium lauryl sulfate, and mixtures thereof. For oral administration in a capsule form, useful diluents include, without limitation, lactose and dried cornstarch. When aqueous suspensions are administered orally, the active ingredient(s) can be combined with emulsifying and suspending agents. If desired, certain sweetening and/or flavoring and/or coloring agents can be added. Compositions suitable for oral administration include, without limitation, lozenges comprising ingredients in a flavored basis, usually sucrose and acacia or tragacanth; and pastilles comprising the active ingredient(s) in an inert basis such as gelatin and glycerin, or sucrose and acacia.

Compositions suitable for parenteral administration include, without limitation, aqueous and non-aqueous sterile injection solutions or infusion solutions that may contain antioxidants, buffers, bacteriostats, and solutes that render the formulation isotonic with the blood of the intended recipient; and aqueous and non-aqueous sterile suspensions that may include suspending agents and thickening agents. The formulations can be presented in unit-dose or multi-dose containers, for example, sealed ampules and vials, and may be stored in a freeze dried (lyophilized) condition requiring only the addition of the sterile liquid carrier, for example water, for injections, saline (e.g., 0.9% saline solution), or 5% dextrose solution, immediately prior to use. Extemporaneous injection solutions and suspensions can be prepared from sterile powders, granules, and tablets. The injection solutions can be in the form of, for example, a sterile injectable aqueous or oleaginous suspension. This suspension can be formulated according to techniques known in the art using suitable dispersing or wetting agents and suspending agents. A sterile injectable preparation also can be a sterile injectable solution or suspension in a non-toxic parenterally-acceptable diluent or solvent, for example, as a solution in 1,3-butanediol. Among the acceptable vehicles and solvents that can be employed are mannitol, water, Ringer's solution, and isotonic sodium chloride solution. In addition, sterile, fixed oils can be used as a solvent or suspending medium. For this purpose, any bland fixed oil can be used including, without limitation, synthetic mono- or diglycerides. Fatty acids such as oleic acid and its glyceride derivatives can be used to prepare injectables. In some cases, natural pharmaceutically acceptable oils such as olive oil or castor oil, especially in their polyoxyethylated versions, can be used to prepare injectables. These oil solutions or suspensions also can contain a long-chain alcohol diluent or dispersant.

In some cases, a therapeutic compound and/or pharmaceutical composition provided herein can be administered in the form of suppository for rectal administration. These compositions can be prepared by mixing a compound described herein (e.g., a compound of or Formula (I) or Formula (II), or a pharmaceutically acceptable salt thereof) with a suitable non-irritating excipient that is solid at room temperature but liquid at the rectal temperature and therefore will melt in the rectum to release the active component(s). Such materials include, without limitation, cocoa butter, beeswax, and polyethylene glycols.

In some cases, a therapeutic compounds and/or pharmaceutical composition provided herein can be administered by nasal aerosol or inhalation. Such compositions can be prepared according to techniques well known in the art of pharmaceutical formulation and can be prepared as solutions in saline, employing benzyl alcohol or other suitable preservatives, absorption promoters to enhance bioavailability, fluorocarbons, and/or other solubilizing or dispersing agents known in the art. See, for example, U.S. Pat. No. 6,803,031. Additional formulations and methods for intranasal administration are found in Ilium, L., *J. Pharm. Pharmacol.*, 56:3-17 (2004); and Ilium, L., *Eur. J. Pharm. Sci.*, 11:1-18 (2000).

In some cases, a therapeutic compounds and/or pharmaceutical composition provided herein can be prepared as a topical composition and used in the form of an aerosol spray, cream, emulsion, solid, liquid, dispersion, foam, oil, gel, hydrogel, lotion, mousse, ointment, powder, patch, pomade, solution, pump spray, stick, towelette, soap, or other forms commonly employed in the art of topical administration and/or cosmetic and skin care formulation. The topical compositions can be in an emulsion form. Topical administration of a therapeutic compounds and/or pharmaceutical composition provided herein can be useful when the desired treatment involves areas or organs readily accessible by topical application. In some cases, a topical composition can include a combination of any one or more of the compounds or therapeutic agents described herein (e.g., a compound of or Formula (I) or Formula (II), or a pharmaceutically acceptable salt thereof), and one or more additional ingredients, carriers, excipients, or diluents including, without limitation, absorbents, anti-irritants, anti-acne agents, preservatives, antioxidants, coloring agents/pigments, emollients (moisturizers), emulsifiers, film-forming/holding agents, fragrances, leave-on exfoliants, prescription drugs, preservatives, scrub agents, silicones, skin-identical/repairing agents, slip agents, sunscreen actives, surfactants/detergent cleansing agents, penetration enhancers, and thickeners.

In some cases, one or more compounds or therapeutic agent described herein (e.g., a compound of or Formula (I) or Formula (II), or a pharmaceutically acceptable salt thereof) can be incorporated into a composition for coating an implantable medical device such as a prosthesis, artificial valve, vascular graft, stent, or catheter. Suitable coatings and the general preparation of coated implantable devices are known in the art and are exemplified in U.S. Pat. Nos. 6,099,562; 5,886,026; and 5,304,121. The coatings can be biocompatible polymeric materials such as a hydrogel polymer, polymethyldisiloxane, polycaprolactone, polyethylene glycol, polylactic acid, ethylene vinyl acetate, or mixture thereof. In some cases, the coating can optionally be further covered by a suitable topcoat of fluorosilicone, polysaccharides, polyethylene glycol, phospholipids or combinations thereof to impart controlled release characteristics in the composition.

In some cases, this document provides an implantable drug release device impregnated with or containing one or more compounds or therapeutic agents described herein (e.g., a compound of or Formula (I) or Formula (II), or a pharmaceutically acceptable salt thereof) such that the compound(s) or therapeutic agent(s) are released from the device and are therapeutically active.

Dosages and Regimens

A composition (e.g., pharmaceutical compositions provided herein) containing a compound provided herein (e.g., a compound of or Formula (I) or Formula (II), or a pharmaceutically acceptable salt thereof) can include that compound in an effective amount (e.g., a therapeutically effective amount).

Effective doses can vary, depending on the disease, disorder, or condition being treated (or prevented), the severity of the disease, disorder, or condition, the route of administration, the sex, age and general health condition of the subject, excipient usage, the possibility of co-usage with other therapeutic treatments such as use of other agents, and the judgment of the treating physician.

In some embodiments, an effective amount of a compound of or Formula (I) or Formula (II), or a pharmaceutically acceptable salt thereof, can range, for example, from about 0.1 mg to about 1000 mg. In some cases, the effective amount can be from about 0.5 mg to about 500 mg of a compound disclosed herein, or any amount in between these two values, for example, one of about 0.5 mg, about 1 mg, about 2 mg, about 5 mg, about 10 mg, about 20 mg, about 50 mg, about 100 mg, about 200 mg, about 250 mg, about 300 mg, about 400 mg, or about 500 mg. The effective amount can be an amount sufficient to alleviate or reduce one or more of the symptoms associated with a disease, disorder, or condition being treated (or prevented) as described herein.

In some cases, an effective amount of a compound of or Formula (I) or Formula (II), or a pharmaceutically acceptable salt thereof, can range, for example, from about 0.001 mg/kg to about 500 mg/kg (e.g., from about 0.001 mg/kg to about 200 mg/kg; from about 0.01 mg/kg to about 200 mg/kg; from about 0.01 mg/kg to about 150 mg/kg; from about 0.01 mg/kg to about 100 mg/kg; from about 0.01 mg/kg to about 50 mg/kg; from about 0.01 mg/kg to about 10 mg/kg; from about 0.01 mg/kg to about 5 mg/kg; from about 0.01 mg/kg to about 1 mg/kg; from about 0.01 mg/kg to about 0.5 mg/kg; from about 0.01 mg/kg to about 0.1 mg/kg; from about 0.1 mg/kg to about 200 mg/kg; from about 0.1 mg/kg to about 150 mg/kg; from about 0.1 mg/kg to about 100 mg/kg; from about 0.1 mg/kg to about 50 mg/kg; from about 0.1 mg/kg to about 10 mg/kg; from about 0.1 mg/kg to about 5 mg/kg; from about 0.1 mg/kg to about 2 mg/kg; from about 0.1 mg/kg to about 1 mg/kg; from about 0.1 mg/kg to about 0.5 mg/kg, or from about 0.5 mg/kg to about 500 mg/kg).

In some cases, an effective amount of a compound of or Formula (I) or Formula (II), or a pharmaceutically acceptable salt thereof, can be about 0.1 mg/kg, about 0.5 mg/kg, about 1 mg/kg, about 2 mg/kg, or about 5 mg/kg.

The foregoing dosages can be administered on a daily basis (e.g., as a single dose or as two or more divided doses, e.g., once daily, twice daily, thrice daily) or on a non-daily basis (e.g., every other day, every two days, every three days, once weekly, twice weekly, once every two weeks, or once a month). In some cases, the dosages can be administered every 4 hours, 6 hours, 8 hours, 12 hours, or 24 hours.

Kits

This document also provides pharmaceutical kits useful, for example, to inhibit ORAI ion channel. In some cases, this document provides pharmaceutical kits useful, for example, to treat or prevent a disease, disorder, or condition referred to herein. Such pharmaceutical kits can include one or more containers containing a pharmaceutical composition that includes a therapeutically effective amount of a compound provided herein (e.g., a compound of or Formula (I) or Formula (II), or a pharmaceutically acceptable salt thereof). In some cases, such kits can further include, if desired, one or more of various conventional pharmaceutical kit components such as containers with one or more pharmaceutically acceptable carriers. Instructions, either as inserts or as labels, indicating quantities of the components to be administered, guidelines for administration, and/or guidelines for mixing the components also can be included in a kit provided herein. In some embodiments, the kit comprising at least one additional therapeutic agent as described herein, or a pharmaceutically acceptable salt thereof, or a pharmaceutical composition comprising same.

Combination Therapies

In some cases, one or more compounds provided herein (e.g., a compound set forth in or Formula (I) or Formula (II), or a pharmaceutically acceptable salt thereof) can be combined with one or more additional therapeutic molecules. Examples of therapeutic molecules that can be used in combination with one or more compounds provided herein (e.g., a compound set forth in or Formula (I) or Formula (II), or a pharmaceutically acceptable salt thereof) include, without limitation, an anti-cancer drug, an anti-inflammatory drug, and a drug that treats or prevents a cardiovascular condition. Other classes of therapeutic agents may also be used in combination with the compounds of the present disclosure.

Suitable examples of additional therapeutic agents include anti-cancer agents such as antimetabolites (including, without limitation, folic acid antagonists, pyrimidine analogs, purine analogs and adenosine deaminase inhibitors) such as methotrexate, 5-fluorouracil, floxuridine, cytarabine, 6-mercaptopurine, 6-thioguanine, fludarabine phosphate, pentostatine, and gemcitabine. Other examples of anti-cancer agents include alkylating agents (including, without limitation, nitrogen mustards, ethylenimine derivatives, alkyl sulfonates, nitrosoureas and triazenes) such as uracil mustard, chlormethine, cyclophosphamide, ifosfamide, melphalan, chlorambucil, pipobroman, triethylene-melamine, triethylenethiophosphoramine, busulfan, carmustine, lomustine, streptozocin, dacarbazine, and temozolomide. Other examples of anti-cancer agents include kinase inhibitors such as imatinib, sorafenib, sunitinib, and vemurafenib. Other examples of anti-cancer agents include cancer immunotherapy such as ipilimumab, pembrolizumab, nivolumab, atezolizumab, bevacizumab, trastuzumab, and cetuximab. In some embodiments, the compound of the present disclosure can be combined with a surgical cancer treatment or a radiotherapy.

Yet other suitable examples of additional therapeutic agents include cardiac medications, such as rivaroxaban, dabigatran, apixaban, heparin, warfarin, aspirin, clopidogrel, dipyridamole, prasugrel, ticagrelor, benazepril, captopril, enalapril, fosinopril, lisinopril, moexipril, perindopril, quinapril, ramipril, trandolapril, candesartan, eprosartan, irbesartan, losartan, telmisartan, valsartan, acebutolol, atenolol, betaxolol, bisoprolol/hydrochlorothiazide, bisoprolol, metoprolol, nadolol, propranolol, sotalol, amlodipine, diltiazem, felodipine, nifedipine, nimodipine, nisoldipine, verapamil), amiloride, bumetanide, chlorothiazide, chlorthalidone, furosemide, hydro-chlorothiazide, indapamide, spironolactone, isosorbidedinitrate, nesiritide, hydralazine, nitrates, or minoxidil.

Additional examples of therapeutic molecules that can be used in combination with one or more compounds provided herein (e.g., a compound set forth in or Formula (I) or Formula (II), or a pharmaceutically acceptable salt thereof) include, without limitation, anti-inflammatory agents (e.g., NSAIDs, steroids and antibodies against IL-6 or TNF-alpha, corticosteroids such as prednisone or prednisolone, methotrexate or leflunomide, gold compounds, sulfasalazine, azathioprine, cyclophosphamide, JAK inhibitor (e.g. ruxolitinib, oclacitinib), S1P antagonist (e.g. fingolimod), antimalarials, D-penicillamine, or cyclosporine) and antimicrobial agents (e.g., antibiotics, anti-mycobacterial drugs, and anti-viral agents).

One or more compounds provided herein (e.g., a compound set forth in Formula (I) or Formula (II), or a pharmaceutically acceptable salt thereof) and the one or more therapeutic molecules can be administered in any order or simultaneously. If simultaneously administered, they can be provided in a single, unified, form or in multiple forms (e.g., either as a single pill or as two separate pills). One of the items can be given in multiple doses, or both can be given as multiple doses. If not simultaneous, the timing between the multiple doses can vary from more than zero weeks to less than four weeks.

Definitions

As used herein, the term "about" means "approximately" (e.g., plus or minus approximately 10% of the indicated value).

At various places in the present specification, substituents of compounds of the invention are disclosed in groups or in ranges. It is specifically intended that the invention include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

At various places in the present specification various aryl, heteroaryl, cycloalkyl, and heterocycloalkyl rings are described. Unless otherwise specified, these rings can be attached to the rest of the molecule at any ring member as permitted by valency. For example, the term "a pyridine ring" or "pyridinyl" may refer to a pyridin-2-yl, pyridin-3-yl, or pyridin-4-yl ring.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

The term "aromatic" refers to a carbocycle or heterocycle having one or more polyunsaturated rings having aromatic character (i.e., having (4n+2) delocalized π (pi) electrons where n is an integer).

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. The substituents are independently selected, and substitution may be at any chemically accessible position. As used herein, the term "substituted" means that a hydrogen atom is removed and replaced by a substituent. A single divalent substituent, e.g., oxo, can replace two hydrogen atoms. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include, but are not limited to, methoxy, ethoxy, propoxy (e.g., n-propoxy and isopropoxy), butoxy (e.g., n-butoxy and tert-butoxy), and the like. In some embodiments, the alkyl group has 1 to 6, 1 to 4, or 1 to 3 carbon atoms.

As used herein, "$C_{n-m}$ haloalkoxy" refers to a group of formula O-haloalkyl having n to m carbon atoms. An example haloalkoxy group is $OCF_3$. In some embodiments, the haloalkoxy group is fluorinated only. In some embodiments, the alkyl group has 1 to 6, 1 to 4, or 1 to 3 carbon atoms.

As used herein, the term "amino" refers to a group of formula $NH_2$.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (e.g., N-(n-propyl)amino and N-isopropylamino), N-butylamino (e.g., N-(n-butyl)amino and N-(tert-butyeamino), and the like.

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "$C_{n-m}$ alkoxycarbonyl" refers to a group of formula —C(O)O-alkyl, wherein the alkyl group has n to m carbon atoms. In some embodiments, the alkyl group has 1 to 6, 1 to 4, or 1 to 3 carbon atoms. Examples of alkoxycarbonyl groups include, but are not limited to, methoxycarbonyl, ethoxycarbonyl, propoxycarbonyl (e.g., n-propoxycarbonyl and isopropoxycarbonyl), butoxycarbonyl (e.g., n-butoxycarbonyl and tert-butoxycarbonyl), and the like.

As used herein, the term "$C_{n-m}$ alkylcarbonyl" refers to a group of formula —C(O)-alkyl, wherein the alkyl group has n to m carbon atoms. In some embodiments, the alkyl group has 1 to 6, 1 to 4, or 1 to 3 carbon atoms. Examples of alkylcarbonyl groups include, but are not limited to, methylcarbonyl, ethylcarbonyl, propylcarbonyl (e.g., n-propylcarbonyl and isopropylcarbonyl), butylcarbonyl (e.g., n-butylcarbonyl and tert-butylcarbonyl), and the like.

As used herein, the term "$C_{n-m}$ alkylcarbonylamino" refers to a group of formula —NHC(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonylamino" refers to a group of formula —NHS(O)$_2$-alkyl, wherein the alkyl group has n to m carbon atoms. In some embodiments, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n-m}$ alkylaminosulfonyl" refers to a group of formula —S(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonyl" refers to a group of formula —S(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n-m}$ alkylaminosulfonylamino" refers to a group of formula —NHS(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonylamino" refers to a group of formula —NHS(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminocarbonylamino", employed alone or in combination with other terms, refers to a group of formula —NHC(O)NH$_2$.

As used herein, the term "$C_{n-m}$ alkylaminocarbonylamino" refers to a group of formula —NHC(O)NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "carbamyl" to a group of formula C(O)NH$_2$.

As used herein, the term "$C_{n-m}$ alkylcarbamyl" refers to a group of formula —C(O)—NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$-alkyl)carbamyl" refers to a group of formula C(O)N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "thio" refers to a group of formula —SH.

As used herein, the term "$C_{n-m}$ alkylthio" refers to a group of formula —S-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfinyl" refers to a group of formula —S(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonyl" refers to a group of formula —S(O)$_2$-alkyl, wherein the alkyl group has n to m carbon atoms. In some embodiments, the alkyl group has 1 to 6, 1 to 4, or 1 to 3 carbon atoms.

As used herein, the term "carbonyl", employed alone or in combination with other terms, refers to a —C(═O)— group, which may also be written as C(O).

As used herein, the term "carboxy" refers to a —C(O)OH group.

As used herein, the term "cyano-$C_{1-3}$ alkyl" refers to a group of formula —($C_{1-3}$ alkylene)-CN.

As used herein, the term "HO—$C_{1-3}$ alkyl" refers to a group of formula —($C_{1-3}$ alkylene)-OH.

As used herein, "halo" refers to F, Cl, Br, or I. In some embodiments, a halo is F, Cl, or Br.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to 10 carbon atoms. In some embodiments, the aryl group is phenyl or naphthyl.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Ring-forming carbon atoms of a cycloalkyl group can be optionally substituted by 1 or 2 independently selected oxo or sulfide groups (e.g., C(O) or C(S)). Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring. Cycloalkyl groups can have 3, 4, 5, 6, 7, 8, 9, or 10 ring-forming carbons ($C_{3-10}$). In some embodiments, the cycloalkyl is a $C_{3-10}$ monocyclic or bicyclic cycloalkyl. In some embodiments, the cycloalkyl is a $C_{3-7}$ monocyclic cycloalkyl. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl, and the like. In some embodiments, cycloalkyl is cyclopropyl, cyclobutyl, cyclopentyl, or cyclohexyl.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl is a 5-10 membered monocyclic or bicyclic heteroaryl having 1, 2, 3 or 4 heteroatom ring members independently selected from nitrogen, sulfur and oxygen. In some embodiments, the heteroaryl is a 5-6 monocyclic heteroaryl having 1 or 2 heteroatom ring members independently selected from nitrogen, sulfur and oxygen. In some embodiments, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, 7-, 8-, 9- or 10-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropyran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by 1 or 2 independently selected oxo or sulfido groups (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl is a monocyclic 4-6 membered heterocycloalkyl having 1 or 2 heteroatoms independently selected from nitrogen, oxygen, or sulfur and having one or more oxidized ring members. In some embodiments, the heterocycloalkyl is a monocyclic or bicyclic 4-10 membered heterocycloalkyl having 1, 2, 3, or 4 heteroatoms independently selected from nitrogen, oxygen, or sulfur and having one or more oxidized ring members.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

As used herein, the term "oxo" refers to an oxygen atom as a divalent substituent, forming a carbonyl group when attached to a carbon (e.g., C=O), or attached to a heteroatom forming a sulfoxide or sulfone group.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

The compounds described herein can be asymmetric (e.g., having one or more stereocenters). All stereoisomers, such as enantiomers and diastereomers, are intended unless otherwise indicated. Compounds of the present invention that contain asymmetrically substituted carbon atoms can be isolated in optically active or racemic forms. Methods on how to prepare optically active forms from optically inactive starting materials are known in the art, such as by resolution of racemic mixtures or by stereoselective synthesis. Many geometric isomers of olefins, C=N double bonds, N=N double bonds, and the like can also be present in the compounds described herein, and all such stable isomers are contemplated in the present invention. Cis and trans geometric isomers of the compounds of the present invention are described and may be isolated as a mixture of isomers or as separated isomeric forms. In some embodiments, the compound has the (R)-configuration. In some embodiments, the compound has the (S)-configuration.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam lactim pairs, enamine imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal.

As used herein, the term "contacting" refers to the bringing together of indicated moieties in an in vitro system or an in vivo system. For example, "contacting" the ORAI with a compound of the invention includes the administration of a compound of the present invention to an individual or patient, such as a human, having ORAI, as well as, for example, introducing a compound of the invention into a sample containing a cellular or purified preparation containing the ORAI.

As used herein, the term "individual", "patient", or "subject" used interchangeably, refers to any animal, including mammals, preferably mice, rats, other rodents, rabbits, dogs, cats, swine, cattle, sheep, horses, or primates, and most preferably humans.

As used herein, the phrase "effective amount" or "therapeutically effective amount" refers to the amount of active compound or pharmaceutical agent that elicits the biological or medicinal response in a tissue, system, animal, individual or human that is being sought by a researcher, veterinarian, medical doctor or other clinician.

As used herein the term "treating" or "treatment" refers to 1) inhibiting the disease; for example, inhibiting a disease, condition or disorder in an individual who is experiencing or displaying the pathology or symptomatology of the disease, condition or disorder (i.e., arresting further development of the pathology and/or symptomatology), or 2) ameliorating the disease; for example, ameliorating a disease, condition or disorder in an individual who is experiencing or displaying the pathology or symptomatology of the disease, condition or disorder (i.e., reversing the pathology and/or symptomatology).

As used herein, the term "preventing" or "prevention" of a disease, condition or disorder refers to decreasing the risk of occurrence of the disease, condition or disorder in a subject or group of subjects (e.g., a subject or group of subjects predisposed to or susceptible to the disease, condition or disorder). In some embodiments, preventing a disease, condition or disorder refers to decreasing the possibility of acquiring the disease, condition or disorder and/or its associated symptoms. In some embodiments, preventing a disease, condition or disorder refers to completely or almost completely stopping the disease, condition or disorder from occurring.

EXAMPLES

General Scheme for the Synthesis of Examples 1-15

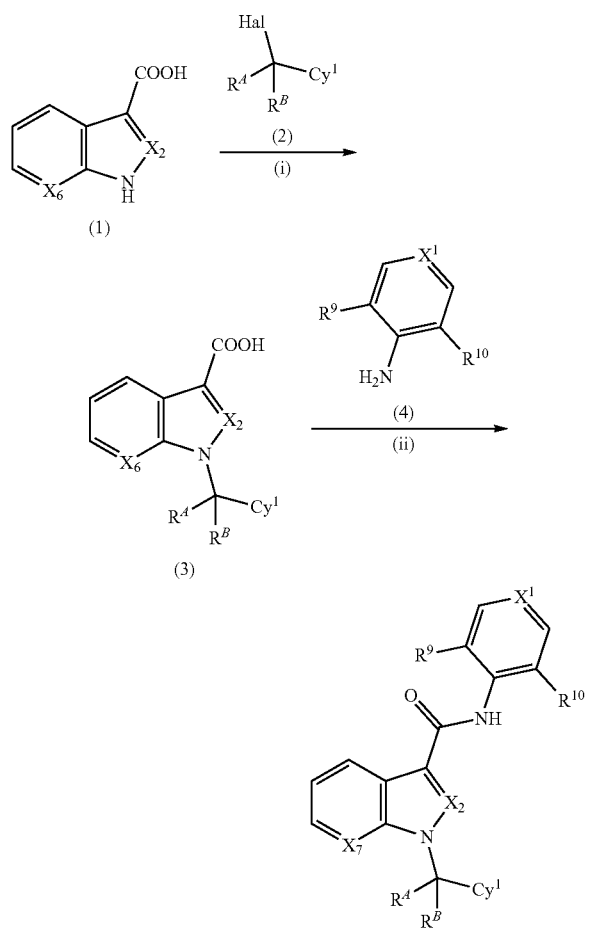

General Procedure (i) for the Alkylation of Carboxylic Acids (1) to Obtain Intermediates (3)

To a stirred solution of the carboxylic acid (1) (1.86 mmol) in dry DMF (3.0 mL), NaH (4.09 mmol) was added portion wise at 0° C. The reaction was allowed to reach room temperature and stirred for 1 hour. Then, it was cooled to 0° C., and the bromide/iodide (2) (2.23 mmol) was slowly added. After 24 h, the excess of hydride was quenched with ice, the solution was acidified to pH 4.0 with HCl 6.0 M and extracted twice with ethyl acetate (2×10 mL). The organic layers were washed with brine and dried over $Na_2SO_4$. The solvent was eliminated to give a pale yellow solid (3).

1-(cyclopropylmethyl)-1H-indole-3-carboxylic acid
3a

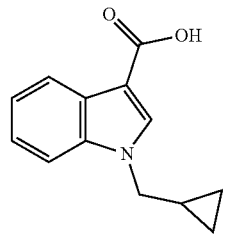 [SMILES: O=C(O)c1cn(CC2CC2)c2ccccc12]

General procedure (i) was applied to the starting materials indole-3-carboxylic acid (1.86 mmol) and (bromomethyl)cyclopropane (2.23 mmol), to give 3a as a pale yellow solid (1.62 mmol), which was used for the next step without further purification. Yield: 87%. $^1$H-NMR (400 MHz, DMSO-$d_6$): δ 0.40-0.44 (m, 2H), 0.51-0.56 (m, 2H), 1.26-1.33 (m, 1H), 4.10 (d, J=7.1 Hz, 2H), 7.16-7.25 (m, 2H), 7.60 (d, J=8.2 Hz, 1H), 8.02 (d, J=7.8 Hz, 1H), 8.11 (s, 1H), 11.94 (bs, 1H).

1-(cyclopropylmethyl)-1H-pyrrolo[2,3-b]pyridine-3-carboxylic acid 3b

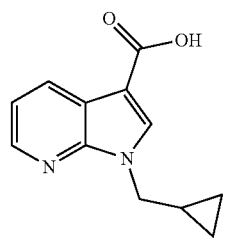 [SMILES: O=C(O)c1cn(CC2CC2)c2ncccc12]

General procedure (i) was applied to the starting materials 7-azaindole-3-carboxylic acid (1) (1.85 mmol) and (bromomethyl)cyclopropane (2) (2.22 mmol), to give 3b as a yellow solid (1.46 mmol), which was used without further purification. Yield: 79%. $^1$H-NMR (400 MHz, DMSO-$d_6$): δ 0.42-0.53 (m, 4H), 1.29-1.39 (m, 1H), 4.17 (d, J=7.2 Hz, 2H), 7.26 (dd, J=4.7 Hz, 7.8 Hz, 1H), 8.31-8.35 (m, 3H), 12.24 (bs, 1H).

1-(cyclopropylmethyl)-1H-indazole-3-carboxylic acid 3c

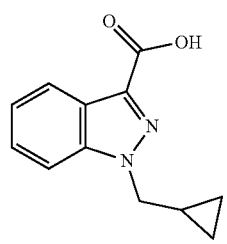 [SMILES: O=C(O)c1nn(CC2CC2)c2ccccc12]

General procedure (1) was applied to the starting materials indazole-3-carboxylic acid (1) (1.86 mmol) and (bromomethyl)cyclopropane (2) (2.23 mmol), to give 3c as a pale yellow solid (1.62 mmol), which was used for the next step without further purification. Yield: 87%. ¹H-NMR (400 MHz, DMSO-d₆): δ 0.41-0.53 (m, 4H), 1.30-1.36 (m, 1H), 4.40 (d, J=7.0 Hz, 2H), 7.31 (t, J=7.5 Hz, 1H), 7.46 (t, J=7.7 Hz, 1H), 7.83 (d, J=8.5 Hz, 1H), 8.08 (d, J=8.1 Hz, 1H), 12.94 (bs, 1H).

1-(cyclobutylmethyl)-1H-indole-3-carboxylic acid 3d

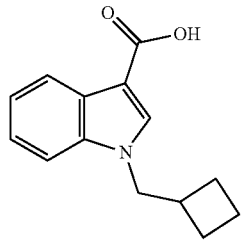 [SMILES: O=C(O)c1cn(CC2CCC2)c2ccccc12]

General procedure (i) was applied to the starting materials indole-3-carboxylic acid (1) (1.86 mmol) and (bromomethyl)cyclobutane (2) (2.23 mmol), to give 3d as a light pink solid (1.76 mmol), which was used without further purification. Yield: 94% ¹H-NMR (400 MHz, DMSO-d₆): δ 1.71-1.99 (m, 6H), 2.80 (p, J=7.5 Hz, 1H), 4.25 (d, J=7.4 Hz, 2H), 7.15-7.24 (m, 2H), 7.56 (d, J=8.2 Hz, 1H), 8.00 (d, J=7.8 Hz, 1H), 8.04 (s, 1H), 11.94 (bs, 1H).

1-(cyclobutylmethyl)-1H-indazole-3-carboxylic acid 3e

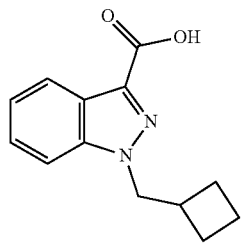 [SMILES: O=C(O)c1nn(CC2CCC2)c2ccccc12]

General procedure (i) was applied to the starting materials indole-3-carboxylic acid (1) (1.86 mmol) and (bromomethyl)cyclobutane (2) (2.23 mmol), to give 3e as a light yellow solid (1.65 mmol), which was used without further purification. Yield: 89%. ¹H-NMR (400 MHz, DMSO-d₆): δ 1.77-1.96 (m, 6H), 2.87 (p, J=7.4 Hz, 1H), 4.53 (d, J=7.2 Hz, 2H), 7.30 (dd, J=6.9 Hz, 8.2 Hz, 1H), 7.46 (m, 1H), 8.30 (d, J=8.5 Hz, 1H), 8.07 (d, J=8.1 Hz, 1H), 12.94 (bs, 1H).

1-(oxetan-3-ylmethyl)-1H-indole-3-carboxylic acid 3f

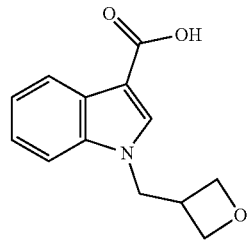 [SMILES: O=C(O)c1cn(CC2COC2)c2ccccc12]

General procedure (i) was applied to the starting materials indole-3-carboxylic acid (1) (0.62 mmol) and 3-(iodomethyl)oxetane (2) (0.68 mmol), to give 3f as a pale yellow solid (0.60 mmol), which was used without further purification. Yield: 97%. ¹H-NMR (400 MHz, DMSO-d₆): δ 3.44-3.55 (m, 1H), 4.41 (t, J=6.1 Hz, 2H), 4.55 (d, J=7.4 Hz, 2H), 4.61 (dd, J=1.6, 6.1 Hz, 2H), 7.17-7.26 (m, 2H), 7.62 (d, J=8.0 Hz, 1H), 8.01 (d, J=7.2 Hz, 1H), 8.14 (s, 1H), 11.98 (bs, 1H).

General Procedure (ii) for the Conversion of Carboxylic Acids (1) into Carboxamides (Exemplified Compounds)

To a stirred solution of the carboxylic acid (3) (0.31 mmol) in CH₂Cl₂ (1.0 mL), oxalyl chloride (0.62 mmol) was slowly added with one drop of dry DMF. The pale yellow solution rapidly turned into red. After 1 hour, the solvent was evaporated and the crude chloride was added to a solution of the corresponding amine (4) (0.62 mmol) in dry CH₂Cl₂ (1.0 mL) and Et₃N (0.62 mmol). The reaction was left stirring for 24 hours, then the solvent was evaporated. The crude was dissolved in ethyl acetate and the organic phase was washed with H₂O, brine and dried over Na₂SO₄. The final product was then purified by flash chromatography or preparative HPLC.

Example 1—1-(cyclopropylmethyl)-N-(2,6-difluorophenyl)-1H-indole-3-carboxamide

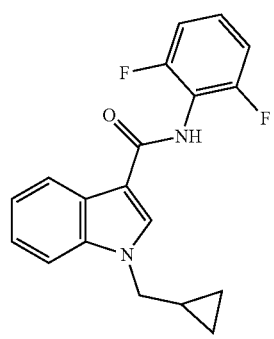 [SMILES: O=C(Nc1c(F)cccc1F)c1cn(CC2CC2)c2ccccc12]

General procedure (ii) was applied to 3a (0.28 mmol) and 2,6-difluoroaniline (0.56 mmol) was used in the second step. The final amide was purified by preparative HPLC to give the title compound as a white solid (0.10 mmol). Yield: 36%. HPLC: 98%, R$_t$=10.87 min. ¹H-NMR (400 MHz, DMSO-d₆): δ 0.44-0.48 (m, 2H), 0.60-0.64 (m, 2H), 1.28-1.35 (m, 1H), 4.13 (d, J=7.1 Hz, 2H), 7.15-7.26 (m, 4H), 7.34-7.41 (m, 1H), 7.62 (d, J=8.1 Hz, 1H), 8.14 (d, J=7.9 Hz, 1H), 8.39 (s, 1H), 9.59 (s, 1H). HRMS: [M+Na]$^+$ found: 349.1124. $C_{19}H_{16}F_2N_2O$ requires 326.1231.

Example 2—N-(2-chloro-6-fluorophenyl)-1-(cyclopropylmethyl)-1H-indole-3-carboxamide

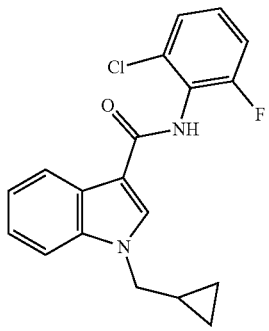 [SMILES: O=C(Nc1c(F)cccc1Cl)c1cn(CC2CC2)c2ccccc12]

General procedure (ii) was applied to intermediate 3a (0.28 mmol) and 2-chloro-6-fluoroaniline (0.56 mmol) was used in the second step. The final product was purified by preparative HPLC to yield the title compound as a white solid (0.15 mmol). Yield: 54%. HPLC: 98%, $R_t$=11.02 min. $^1$H-NMR (400 MHz, DMSO-d$_6$): δ 0.44-0.48 (m, 2H), 0.59-0.64 (m, 2H), 1.28-1.35 (m, 1H), 4.13 (d, J=7.1 Hz, 2H), 7.15-7.19 (m, 1H), 7.22-7.26 (m, 1H), 7.31-7.45 (m, 3H), 7.62 (d, J=8.2 Hz, 1H), 8.14 (d, J=7.9 Hz, 1H), 8.40 (s, 1H), 9.61 (s, 1H).

Example 3—1-(cyclopropylmethyl)-N-(3,5-difluoropyridin-4-yl)-1H-indole-3-carboxamide

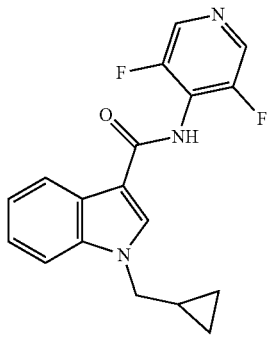 [SMILES: O=C(Nc1c(F)cncc1F)c1cn(CC2CC2)c2ccccc12]

General procedure (ii) was applied to 3a (0.20 mmol) and 4-amino-3,5-difluoropyridine (0.40 mmol) was used in the second step. The final product was purified by preparative HPLC to give the title compound as a white solid (0.10 mmol). Yield: 50%. HPLC: 98%, $R_t$=10.72 min. $^1$H-NMR (400 MHz, DMSO-d$_6$): 0.44-0.48 (m, 2H), 0.59-0.64 (m, 2H), 1.29-1.26 (m, 1H), 4.14 (d, J=7.1 Hz, 2H), 7.18-7.22 (m, 1H), 7.24-7.28 (m, 1H), 7.64 (d, J=8.1 Hz, 1H), 8.13 (d, J=7.9 Hz, 1H), 8.45 (s, 1H), 8.58 (s, 2H), 10.11 (s, 1H). HRMS: [M+Na]$^+$ found: 350.1075. $C_{18}H_{15}F_2N_3O$ requires 327.1183.

Example 4—1-(cyclopropylmethyl)-N-(3-methylpyridin-4-yl)-1H-indole-3-carboxamide

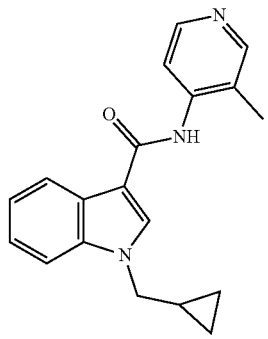 [SMILES: Cc1cnccc1NC(=O)c1cn(CC2CC2)c2ccccc12]

General procedure (ii) was applied to 3a (0.33 mmol) and 3-methylpyridine-4-amine (0.66 mmol) was used in the second step. The product was purified by flash chromatography (Ethyl acetate 100%) to give the title compound as a white solid (0.29 mmol). Yield: 89%. HPLC: 98%, $R_t$=8.86 min. $^1$H-NMR (400 MHz, DMSO-d$_6$): δ 0.44-0.48 (m, 2H), 0.56-0.61 (m, 2H), 1.29-1.37 (m, 1H), 2.32 (s, 3H), 4.14 (d, J=7.1 Hz, 2H), 7.18-7.28 (m, 2H), 7.64 (d, J=8.2 Hz, 1H), 7.77 (d, J=5.4 Hz, 1H), 8.16 (d, J=7.8 Hz, 1H), 8.34 (d, J=5.4 Hz, 1H), 8.39 (s, 1H), 8.41 (s, 1H), 9.23 (s, 1H). HRMS: [M+H]$^+$ found: 306.1605. $C_{19}H_{19}N_3O$ requires 305.1528.

Example 5—1-(cycloproylmethyl)-N-(3-fluoropyridin-4-yl)-1H-pyrrolo[2,3-b]pyridine-3-carboxamide

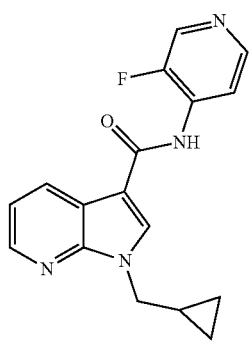 [SMILES: O=C(Nc1ccncc1F)c1cn(CC2CC2)c2ncccc12]

General procedure (ii) was applied to 3b (0.60 mmol) and 3-fluoropyridine-4-amine (1.20 mmol) was used in the second step. The crude was purified by flash chromatography (Hexane:Ethyl Acetate 50:50) to give the title compound as a white solid (0.26 mmol). Yield: 43%. HPLC: 98%, $R_t$=9.88 min. $^1$H-NMR (400 MHz, DMSO-d$_6$): δ 0.46-0.50 (m, 2H), 0.55-0.60 (m, 2H), 1.32-1.40 (m, 1H), 4.21 (d, J=7.2 Hz, 2H), 7.29 (dd, J=4.7 Hz, 7.9 Hz, 1H), 8.09 (dd, J=5.3 Hz, 6.8 Hz, 1H), 8.36 (d, J=5.7 Hz, 1H), 8.38 (dd, J=1.8 Hz, 4.6 Hz, 1H), 8.48 (dd, J=1.7 Hz, 7.8 Hz, 1H), 8.58 (d, J=2.9 Hz, 1H), 8.72 (s, 1H), 10.00 (s, 1H). HRMS: [M+H]$^+$ found: 311.1302. $C_{17}H_{15}FN_4O$ requires 310.1230.

Example 6—1-(cyclopropylmethyl)-N-(3-methylpyridin-4-yl)-1H-indazole-3-carboxamide

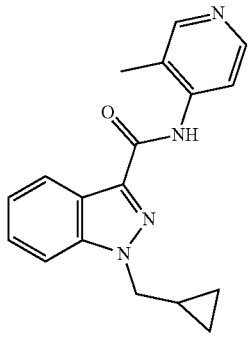 [SMILES: Cc1cnccc1NC(=O)c1nn(CC2CC2)c2ccccc12]

General procedure (ii) was applied to 3c (0.46 mmol) and 3-methylpyridine-4-amine (0.55 mmol) was used in the second step. The product was purified by flash chromatography (CH$_2$Cl$_2$:MeOH 10%) to give the title compound as a white solid (0.30 mmol). Yield: 65%. HPLC: 98%, R$_t$=9.99 min. $^1$H-NMR (400 MHz, DMSO-d$_6$): δ 0.48-0.58 (m, 4H), 1.35-1.43 (m, 1H), 2.34 (s, 3H), 4.46 (d, J=7.1 Hz, 2H), 7.36 (dd, J=6.9 Hz, 8.2 Hz, 1H), 7.52 (dd, J=6.9 Hz, 8.5 Hz, 1H), 7.90 (d, J=8.5 Hz, 1H), 8.00 (d, J=5.4 Hz, 1H), 8.21 (d, J=8.2 Hz, 1H), 8.39 (d, J=5.4 Hz, 1H), 8.43 (s, 1H), 9.62 (s, 1H). HRMS: [M+H]$^+$ found: 307.1555. C$_{18}$H$_{18}$N$_4$O requires 306.1481.

Example 7—1-(cyclobutylmethyl)-N-(3,5-difluoropyridin-4-yl)-1H-indole-3-carboxamide

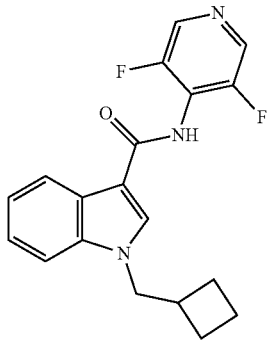 [SMILES: O=C(Nc1c(F)cncc1F)c1cn(CC2CCC2)c2ccccc12]

General procedure (ii) was applied to 3d (0.20 mmol) and 3,5-difluoropyridine-4-amine (0.40 mmol) was used in the second step. The crude was purified by preparative HPLC to give the title compound as a white solid (0.20 mmol). Yield: 50%. HPLC: 98%, R$_t$=10.91 min. $^1$H-NMR (400 MHz, DMSO-d$_6$): δ 1.80-1.92 (m, 4H), 1.99-2.08 (m, 2H), 2.84 (p, J=7.5 Hz, 1H), 4.29 (d, J=7.3 Hz, 1H), 7.17-7.27 (m, 2H), 7.62 (d, J=8.2 Hz, 1H), 8.12 (d, J=7.9 Hz, 1H), 8.34 (s, 1H), 8.56 (s, 2H), 10.09 (s, 1H). HRMS: [M+Na]$^+$ found: 364.1231. C$_{19}$H$_{17}$F$_2$N$_3$O requires 341.1340.

Example 8—1-(cyclobutylmethyl)-N-(3-fluoropyridin-4-yl)-1H-indole-3-carboxamide

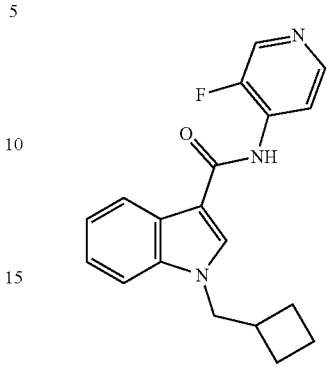

General procedure (ii) was applied to 3d (0.25 mmol) and 3-fluoropyridine-4-amine (0.50 mmol) was used in the second step. The crude was purified by preparative HPLC to give the title compound as a white solid (0.15 mmol). Yield: 60%. HPLC: 98%, R$_t$=10.67 min. $^1$H-NMR (400 MHz, DMSO-d$_6$): δ 1.79-1.92 (m, 4H), 1.98-2.03 (m, 2H), 2.85 (p, J=7.7 Hz, 1H), 4.30 (d, J=7.3 Hz, 1H), 7.20-7.29 (m, 2H), 7.63 (d, J=8.0 Hz, 1H), 8.17 (d, J=7.2 Hz, 1H), 8.31 (dd, J=5.7 Hz, 7.0 Hz, 1H), 8.43 (d, J=5.7 Hz, 1H), 8.51 (s, 1H), 8.72 (d, J=3.6 Hz, 1H), 10.03 (s, 1H). HRMS: [M+Na]$^+$ found: 346.1318. C$_{19}$H$_{18}$FN$_3$O requires 323.1434.

Example 9—1-(cyclobutylmethyl)-N-(3-methylpyridin-4-yl)-1H-indole-3-carboxamide

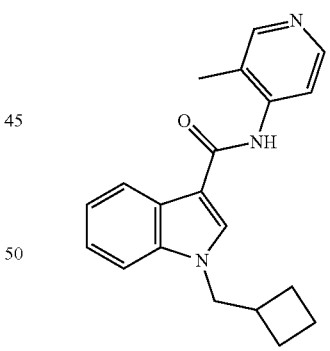

General procedure (ii) was applied to 3d (0.31 mmol) and 3-methylpyridine-4-amine (0.62 mmol) was used in the second step. The crude was purified by flash chromatography (Hexane 1: Ethyl acetate 2) to give the title compound as a white solid (0.23 mmol). Yield: 74%. HPLC: 98%, R$_t$=10.03 min. $^1$H-NMR (400 MHz, DMSO-d$_6$): δ 1.80-1.92 (m, 4H), 1.97-2.04 (m, 2H), 2.32 (s, 3H), 2.85 (p, J=7.6 Hz, 1H), 4.29 (d, J=7.3 Hz, 2H), 7.17-7.27 (m, 2H), 7.62 (d, J=8.2 Hz, 1H), 7.77 (d, J=5.4 Hz, 1H), 8.15 (d, J=7.7 Hz, 1H), 8.34 (d, J=5.1 Hz, 1H), 8.34 (s, 1H), 8.39 (s, 1H), 9.20 (s, 1H). HRMS: [M+H]$^+$ found: 320.1756. C$_{20}$H$_{21}$N$_3$O requires 319.1685.

Example 10—1-(cyclobutylmethyl)-N-(3-fluoropyridin-4-yl)-1H-indazole-3-carboxamide

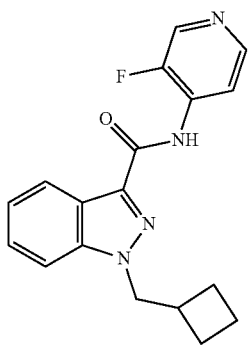 [SMILES: O=C(Nc1ccncc1F)c1nn(CC2CCC2)c2ccccc12]

General procedure (ii) was applied to 3e (0.43 mmol) and 3-fluoropyridine-4-amine (0.52 mmol) was used in the second step. The crude was purified by flash chromatography (CH$_2$Cl$_2$:MeOH 10%, R$_f$=0.41) to give the title compound as a white solid (0.29 mmol). Yield: 68%. HPLC: 98%, R$_t$=11.81 min. 41-NMR (400 MHz, DMSO-d$_6$): δ 1.83-2.01 (m, 6H), 2.94 (p, J=7.6 Hz, 1H), 4.61 (d, J=7.2 Hz, 2H), 7.36 (m, 1H), 7.53 (m, 1H), 7.91 (d, J=8.5 Hz, 1H), 8.20 (m, 2H), 8.41 (d, J=5.3 Hz, 1H), 8.61 (d, J=2.6 Hz, 1H), 9.88 (s, 1H). HRMS: [M+H]+ found: 325.1462. C$_{18}$H$_{17}$FN$_4$O requires 324.1386.

Example 11—1-(cyclobutylmethyl)-N-(3-methylpyridin-4-yl)-1H-indazole-3-carboxamide

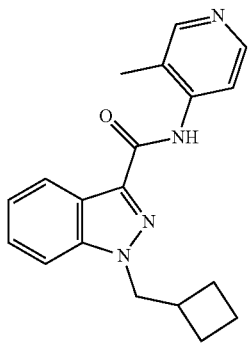 [SMILES: Cc1cnccc1NC(=O)c1nn(CC2CCC2)c2ccccc12]

General procedure (ii) was applied to 3e (0.43 mmol) and 3-fluoropyridine-4-amine (0.52 mmol) was used in the second step. The crude was purified by flash chromatography (CH$_2$Cl$_2$:MeOH 10%, R$_f$=0.45) to give the title compound as a white solid (0.20 mmol). Yield: 46%. HPLC: 98%, R$_t$=10.13 min. $^1$H-NMR (400 MHz, DMSO-d$_6$): δ 1.84-2.04 (m, 6H), 2.34 (s, 3H), 2.94 (p, J=7.4 Hz, 1H), 4.59 (d, J=7.2 Hz, 2H), 7.35 (m, 1H), 7.52 (m, 1H), 7.89 (d, J=8.6 Hz, 1H), 8.01 (d, J=5.4 Hz, 1H), 8.20 (d, J=8.1 Hz, 1H), 8.39 (d, J=5.4 Hz, 1H), 8.43 (s, 1H), 9.56 (s, 1H). HRMS: [M+H]$^+$ found: 321.1711. C$_{19}$H$_{20}$N$_4$O requires 320.3960.

Example 12—N-(3-fluoropyridin-4-yl)-1-(oxetan-3-ylmethyl)-1H-indole-3-carboxamide

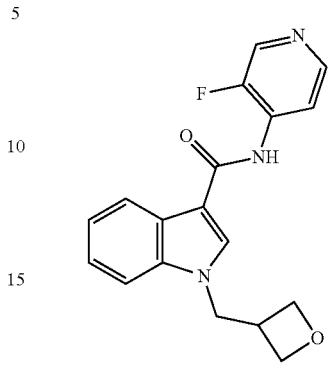

General procedure (ii) was applied to 3d (0.43 mmol) and 3-fluoropyrirne-4-amine (0.86 mmol) was used in the second step. The crude was purified by preparative HPLC to give the title compound as a white solid (0.23 mmol). Yield: 54%. HPLC: 98%, R$_t$=9.96 min. $^1$H-NMR (400 MHz, DMSO-d$_6$): δ 3.47 (t, J=5.7 Hz, 2H), 3.71 (dd, J=1.8 Hz, 5.4 Hz, 2H), 4.33 (d, J=6.9 Hz, 2H), 4.94 (t, J=5.0 Hz, 1H), 7.21-7.31 (m, 2H), 7.62 (d, J=8.2 Hz, 1H), 8.12 (dd, J=5.4 Hz, 6.8 Hz, 1H), 8.18 (d, J=7.9 Hz, 1H), 8.34 (d, J=5.4 Hz, 1H), 8.46 (s, 1H), 8.56 (d, J=3.0 Hz, 1H), 9.85 (s, 1H). HRMS: [M+H]$^+$ found: 326.1309. C$_{18}$H$_{16}$FN$_3$O$_2$ requires 325.1227.

Example 13—1-(cyclopropylmethyl)-N-(3-fluoropyridin-4-yl)-11/-indole-3-carboxamide

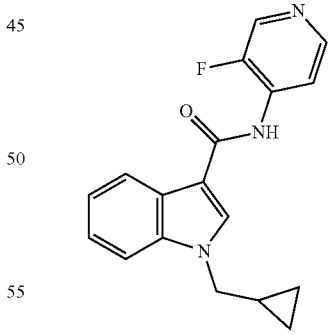

The title compound was prepared according to the methods and procedures similar to those of Example 3.

$^1$H NMR (400 MHz, DMSO-d$^6$) δ 9.81 (s, 1H), 8.55 (d, J=2.9 Hz, 1H), 8.53 (s, 1H), 8.34 (d, J=5.3 Hz, 1H), 8.17 (dd, J=7.2, 1.3 Hz, 1H), 8.11 (dd, J=6.9, 5.4 Hz, 1H), 7.65 (dd, J=7.9, 1.1 Hz, 1H), 7.30-7.18 (m, 2H), 4.14 (d, J=7.1 Hz, 2H), 1.39-1.27 (m, 1H), 0.63-0.55 (m, 2H), 0.50-0.42 (m, 2H); MS (ESI) m/z: [M+H]$^+$ Calcd for C$_{18}$H$_{17}$FN$_3$O 310.1350; Found 310.1343.

Example 14—1-(cyclopropylmethyl)-N-(3-fluoro-pyridin-4-yl)-N-methyl-1H-indole-3-carboxamide

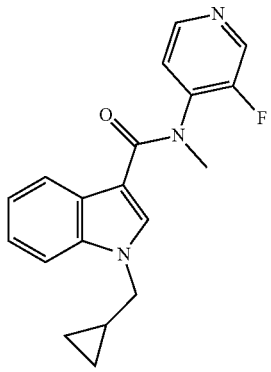 [SMILES: CN(C(=O)c1cn(CC2CC2)c2ccccc12)c1ccncc1F]

Compound of Example 13 (0.16 mmol) was dissolved in dry DMF (1.0 mL), then the reaction was cooled to 0° C. and NaH (0.16 mmol) was slowly added, followed by CH$_3$I (0.16 mmol). The reaction was left stirring for 16 hours. Then water was added to quench the hydride, and the compound was extracted with ethyl acetate (2×5 mL). The organic layers were collected, washed with brine and dried over Na$_2$SO$_4$. The solvent was eliminated under vacuum and the crude was purified by preparative HPLC to give the title compound as a white solid (0.06 mmol). Yield: 39%. HPLC: 98%, R$_t$=10.53 min. $^1$H-NMR (400 MHz, DMSO-d$_6$): δ 0.11-0.15 (m, 2H), 0.35-0.39 (m, 2H), 1.01-1.09 (m, 1H), 3.39 (s, 3H), 3.92 (d, J=7.1 Hz, 2H), 7.12-7.22 (m, 3H), 7.51-7.57 (m, 2H), 7.91 (d, J=7.9 Hz, 1H), 8.42 (d, J=5.2 Hz, 1H), 8.51 (d, J=2.5 Hz, 1H). HRMS: [M+Na]$^+$ found: 346.1331. C$_{19}$H$_{18}$FN$_3$O requires 323.1434.

Example 15—N-((1-(cyclopropylmethyl)-1H-indol-3-yl)methyl)-3-fluoropyridin-4-amine

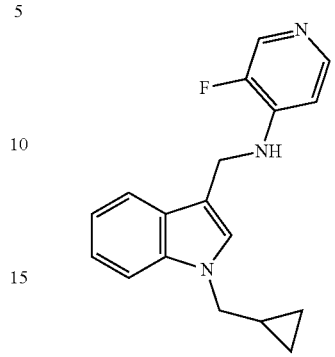

The starting material Example 13 (0.32 mmol) was dissolved in dry THF (2.0 mL) under N$_2$ atmosphere. Then LiAlH$_4$ (0.32 mmol) was slowly added and the reaction was left stirring for 16 hours. After this time, MeOH was added to quench the hydride, the suspension was filtered on celite and the solvents were evaporated. The crude was then dissolved in ethyl acetate and the organic layer washed with water (pH 9.0), brine and dried over Na$_2$SO$_4$. The product was purified by flash chromatography (Hexane:Ethyl acetate, 1:1) to yield the title compound as a yellow oil (0.14 mmol). Yield: 44%. HPLC: 98%, R$_t$=9.49 min. $^1$H-NMR (400 MHz, CDCl$_3$): δ 0.35-0.39 (m, 2H), 0.62-0.67 (m, 2H), 1.23-1.31 (m, 1H), 3.97 (d, J=6.8 Hz, 2H), 4.54 (d, J=4.5 Hz, 2H), 4.63 (bs, 1H), 6.74 (dd, J=5.5 Hz, 7.5 Hz, 1H), 7.15 (td, J=0.9 Hz (d), 7.4 Hz (t), 1H), 7.23 (s, 1H), 7.25-7.28 (m, 1H), 7.39 (d, J=8.2 Hz, 1H), 7.62 (d, J=7.9 Hz, 1H), 8.13 (dd, J=4.4 Hz, 8.5 Hz, 2H). HRMS: [M+H]$^+$ found: 296.1994. C$_{18}$H$_{18}$FN$_3$ requires 295.1485.

General Scheme for the Synthesis of Examples 16-18

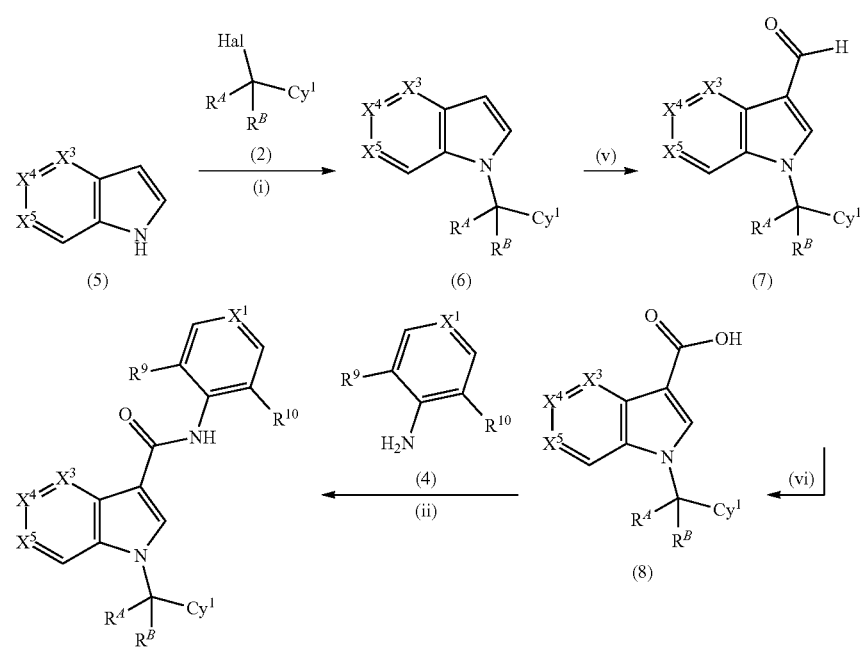

1-(cyclopropylmethyl)-1H-pyrrolo-[2,3-c]-pyridine
6i

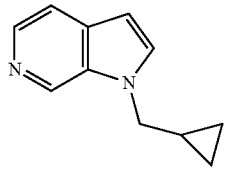 [SMILES: c1cc2ccn(CC3CC3)c2cn1]

General procedure (i) was applied using the starting materials 6-azaindole (5) (3.38 mmol) and (bromomethyl) cyclopropane (2) (4.06 mmol). The product was purified by flash chromatography (CH$_2$Cl$_2$:MeOH 10%), to give the title compound 6i as a yellow oil (3.00 mmol). Yield: 89%. $^1$H-NMR (400 MHz, CDCl$_3$): δ 0.39-0.42 (m, 2H), 0.65-0.70 (m, 2H), 1.24-1.33 (m, 1H), 4.07 (d, J=6.7 Hz, 1H), 6.50 (d, J=3.0 Hz, 1H), 7.35 (d, J=3.0 Hz, 1H), 7.51 (d, J=5.3 Hz, 1H), 8.23 (d, J=5.4 Hz, 1H), 8.80 (s, 1H).

1-(cyclopropylmethyl)-1H-pyrrolo-[3,2-c]-pyridine
6j

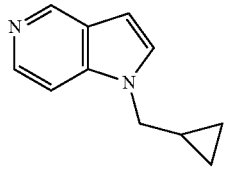 [SMILES: c1cc2c(ccn2CC2CC2)cn1]

General procedure (i) was applied using the starting materials 5-azaindole (5) (3.38 mmol) and (bromomethyl) cyclopropane (2) (4.06 mmol). The product was purified by flash chromatography (CH$_2$Cl$_2$:MeOH 10%), to give 6j as a yellow oil (2.39 mmol). Yield: 71%. $^1$H-NMR (400 MHz, CDCl$_3$): δ 0.35-0.39 (m, 2H), 0.63-0.67 (m, 2H), 1.20-1.30 (m, 1H), 3.98 (d, J=6.9 Hz, 1H), 6.60 (d, J=3.3 Hz, 1H), 7.24 (d, J=3.4 Hz, 2H), 8.31 (d, J=5.8 Hz, 1H), 8.91 (s, 1H).

1-(cyclopropylmethyl)-1H-pyrrolo-[3,2-b]pyridine
6k

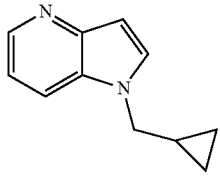 [SMILES: c1cnc2ccn(CC3CC3)c2c1]

General procedure (i) was applied using the starting materials 4-azaindole (5) (1.69 mmol) and (bromomethyl) cyclopropane (2) (2.03 mmol). The product was purified by flash chromatography (Hexane:Ethyl acetate), to give 6k as a pale yellow oil (1.15 mmol). Yield: 68%. $^1$H-NMR (400 MHz, CDCl$_3$): δ 0.35-0.39 (m, 2H), 0.63-0.67 (m, 2H), 1.21-1.29 (m, 1H), 3.97 (d, J=6.7 Hz, 2H), 6.70 (dt, J=0.85 Hz (t), 3.4 Hz (d), 1H), 7.10 (ddd, J=0.8 Hz, 4.7 Hz, 8.3 Hz, 1H), 7.44 (d, J=3.3 Hz, 1H), 7.63-7.66 (m, 1H), 8.45 (dt, J=1.1 Hz (t), 4.7 Hz (d), 1H).

General Procedure (v) for the Synthesis of Intermediates (7)

The starting material (0.58 mmol) was dissolved in DMF (1.74 mmol). The reaction was cooled to −5° C. and POCl$_3$ (1.74 mmol) was added drop wise, then it was allowed to reach room temperature and stir for 30 minutes. The pale yellow color changed into bright orange. Then, the temperature was raised to 60° C. and the reaction was stirred overnight. After this time, the dense reaction was poured into a NaHCO$_3$ saturated aqueous solution, the final pH was changed to 8.0 and the water phase was extracted twice with ethyl acetate (2×10 mL). The organic layers were collected, washed with brine, dried over Na$_2$SO$_4$ and eliminated to give the product as a pale yellow solid, which was used for the next step without need of further purification.

1-(cyclopropylmethyl)-1H-pyrrolo[2,3-c]pyridine-3-carbaldehyde 7i

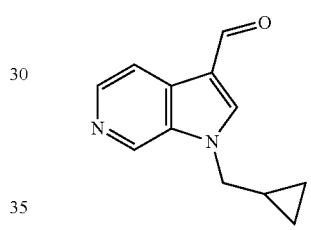

General procedure (v) was applied to the starting material (6i) (1.15 mmol), obtaining the final product 7i (1.10 mmol) as an orange solid in 96% yield. $^1$H-NMR (400 MHz, CDCl$_3$): δ 0.47-0.51 (m, 2H), 0.78-0.83 (m, 2H), 1.33-1.41 (m, 1H), 4.13 (d, J=7.1 Hz, 2H), 8.01 (s, 1H), 8.16 (dd, J=1.1 Hz, 5.4 Hz, 1H), 8.48 (d, J=5.4 Hz, 1H), 8.87 (d, J=1.1 Hz, 1H), 10.08 (s, 1H).

1-(cyclopropylmethyl)-1H-pyrrolo[3,2-c]pyridine-3-carbaldehyde 7j

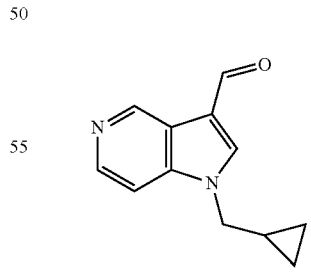

General procedure (v) was applied to the starting material (6j) (0.58 mmol), obtaining the final product 7j (0.50 mmol) as a yellow solid in 86% yield. $^1$H-NMR (400 MHz, CDCl$_3$): δ 0.44-0.48 (m, 2H), 0.75-0.80 (m, 2H), 1.27-1.37 (m, 1H), 4.03 (d, J=7.0 Hz, 2H), 7.31 (d, J=5.8 Hz, 1H), 7.92 (s, 1H), 8.49 (d, J=5.9 Hz, 1H), 9.55 (s, 1H), 10.06 (s, 1H).

1-(cyclopropylmethyl)-1H-pyrrolo[3,2-b]pyridine-3-carbaldehyde 7k

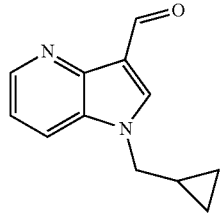 [SMILES: O=Cc1cn(CC2CC2)c2cccnc12]

General procedure (v) was applied to the starting material (6k) (0.43 mmol), obtaining the final product 7k (0.35 mmol) as a yellow oil in 81% yield. $^1$H-NMR (400 MHz, CDCl$_3$): δ 0.42-0.46 (m, 2H), 0.74-0.79 (m, 2H), 1.27-1.34 (m, 1H), 4.03 (d, J=7.0 Hz, 2H), 7.25 (dd, J=4.6 Hz, 8.3 Hz, 1H), 7.72 (dd, J=1.3 Hz, 8.4 Hz, 1H), 8.16 (s, 1H), 8.65 (dd, J=1.3 Hz, 4.7 Hz, 1H), 10.37 (s, 1H).

General Procedure (vi) for the Synthesis of Intermediates (8)

KMnO$_4$ (0.66 mmol) in water (0.62 mL) was added into a solution of the aldehyde (0.33 mmol) in acetone (1.25 mL) and the reaction was left stirring for 5 h at room temperature. After this time, the organic solvent was evaporated, the water phase was filtered and the pH was adjusted to 2.0. The water was evaporated under reduced pressure, giving the carboxylic acid as a yellow/brown solid.

1-(cyclopropylmethyl)-1H-pyrrolo[2,3-c]pyridine-3-carboxylic acid 8i

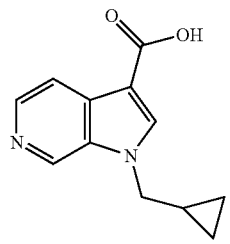 [SMILES: O=C(O)c1cn(CC2CC2)c2cnccc12]

General procedure (vi) was applied to 7i (0.25 mmol), obtaining the final product 8i (0.24 mmol) as a yellow solid. Yield: 96%. $^1$H-NMR (400 MHz, DMSO-d$_6$): δ 0.48-0.59 (m, 4H), 1.38-1.48 (m, 1H), 4.39 (d, J=7.4 Hz, 2H), 8.39 (d, J=6.4 Hz, 1H), 8.48 (d, J=6.4 Hz, 1H), 8.94 (s, 1H), 9.64 (s, 1H), 13.96 (bs, 1H).

1-(cyclopropylmethyl)-1H-pyrrolo[3,2-c]pyridine-3-carboxylic acid 8j

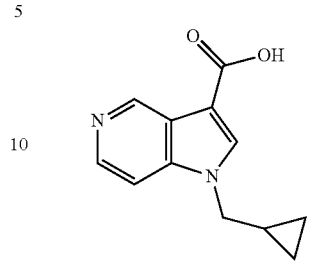

General procedure (vi) was applied to 7j (0.33 mmol), obtaining the product 8j (0.30 mmol) as a pale brown solid. Yield: 91%. $^1$H-NMR (400 MHz, DMSO-d$_6$): δ 0.47-0.58 (m, 4H), 1.32-1.40 (m, 1H), 4.33 (d, J=7.3 Hz, 2H), 8.39 (d, J=6.7 Hz, 1H), 8.64 (d, J=6.7 Hz, 1H), 8.73 (s, 1H), 9.33 (s, 1H), 13.18 (bs, 1H).

1-(cyclopropylmethyl)-1H-pyrrolo[3,2-b]pyridine-3-carboxylic acid 8k

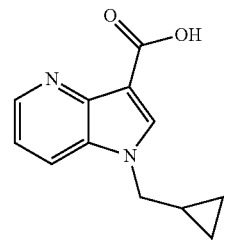 [SMILES: O=C(O)c1cn(CC2CC2)c2cccnc12]

General procedure (vi) was applied to 7k (0.34 mmol) and the final product 8k (0.30 mmol) was obtained as a pale brown solid. Yield: 88%. $^1$H-NMR (400 MHz, DMSO-d$_6$): δ 0.45-0.57 (m, 4H), 1.32-1.41 (m, 1H), 4.37 (d, J=6.4 Hz, 1H), 4.75 (bs, 1H), 7.82-7.87 (m, 1H), 8.66-8.71 (m, 1H), 8.94 (s, 1H), 9.02-9.08 (m, 1H).

Example 16—1-(cycloproylmethyl)-N-(3-fluoro-pyridin-4-yl)-1H-pyrrolo[2,3-c]pyridine-3-carboxamide

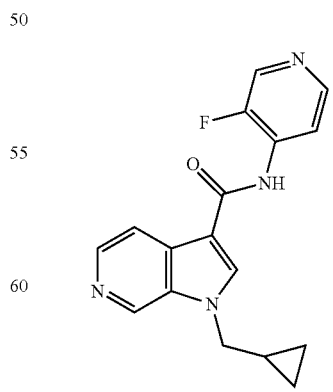

General procedure (ii) was applied to 8i (0.46 mmol) and 3-fluoropyrirne-4-amine (4) (0.92 mmol) was used in the second step. The crude was purified by preparative HPLC to give the title compound as a white solid (0.21 mmol). Yield: 46%. HPLC: 98%, $R_t$=8.48 min. $^1$H-NMR (400 MHz, DMSO-$d_6$): δ 0.47-0.51 (m, 2H), 0.59-0.64 (m, 2H), 1.32-1.42 (m, 1H), 4.23 (d, J=7.2 Hz, 2H), 8.05 (dd, J=1.1 Hz, 5.5 Hz, 1H), 8.09 (dd, J=5.4 Hz, 6.8 Hz, 1H), 8.31 (d, J=5.5 Hz, 1H), 8.36 (d, J=5.3 Hz, 1H), 8.57 (d, J=2.9 Hz, 1H), 8.70 (s, 1H), 9.05 (s, 1H), 10.01 (s, 1H). HRMS: [M+H]$^+$ found: 311.1305. $C_{17}H_{15}FN_4O$ requires 310.1230.

Example 17—1-(cyclopropylmethyl)-N-(3-fluoropyridin-4-yl)-1H-pyrrolo[3,2-c]pyridine-3-carboxamide

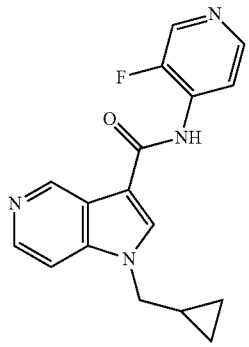 [SMILES: O=C(Nc1ccncc1F)c1cn(CC2CC2)c2ccncc12]

Example 18—1-(cyproylmethyl)-N-(3-fluoropyridin-4-yl)-1H-pyrrolo[3,2-b]pyridine-3-carboxamide

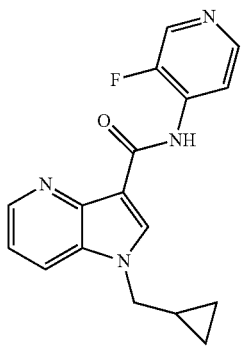 [SMILES: O=C(Nc1ccncc1F)c1cn(CC2CC2)c2cccnc12]

General procedure (ii) was applied to 8i (0.34 mmol) and 3-fluoropyrirne-4-amine (4) (0.51 mmol) was used in the second step. The crude was purified by preparative HPLC to give the title compound as a white solid (0.10 mmol). Yield: 29%. HPLC: 98%, $R_t$=10.21 min. $^1$H-NMR (400 MHz, DMSO-$d_6$): δ 0.44-0.48 (m, 2H), 0.53-0.58 (m, 2H), 4.22 (d, J=7.2 Hz, 2H), 7.40 (dd, J=4.7 Hz, 8.4 Hz, 1H), 8.27 (d, J=8.3 Hz, 1H), 8.37 (d, J=5.4 Hz, 1H), 8.54 (m, 1H), 8.59 (m, 3H), 11.55 (s, 1H). HRMS: [M+4]$^+$ found: 311.1303. $C_{17}H_{15}FN_4O$ requires 310.1230.

General Scheme for the Synthesis of Examples 19-22

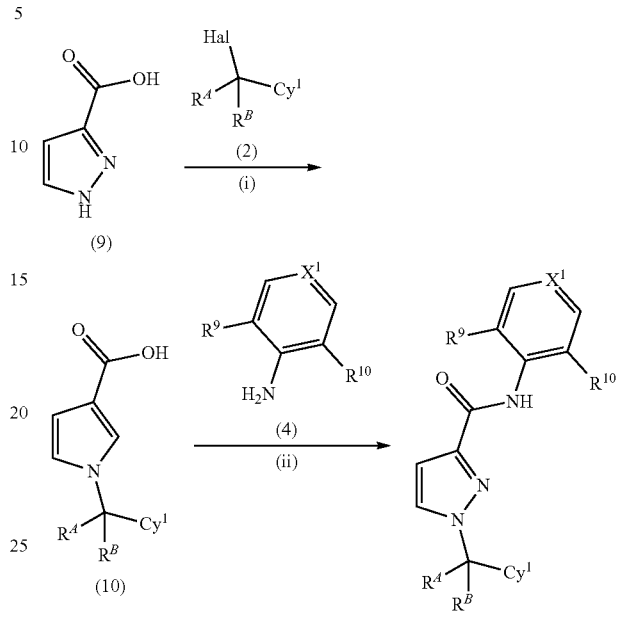

Example 19—1-(cyclopropylmethyl)-N-(3-methylpyridin-4-yl)-1H-pyrazole-3-carboxamide

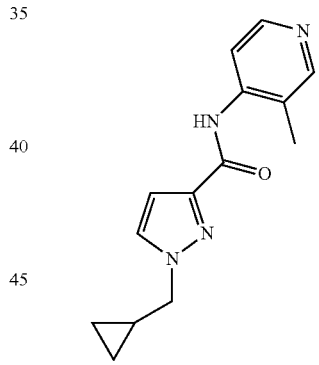

To a solution of 1H-pyrazole-3-carboxylic acid (9) (2.5 g, 22.3 mmol) in DMF (50 mL) was added NaH (60% in mineral oil, 2.0 g, 49.06 mmol) portion wise at 0° C. The resulting suspension was allowed to room temperature and stirred for 45 min. The (bromomethyl)cyclopropane (2) (2.6 mL, 26.76 mmol) was added to the reaction mixture at 0° C. The resulting mixture was allowed to room temperature and stirred for overnight. The reaction mixture was quenched with methanol (5.0 mL), acidified with 2N HCl and extracted with EtOAc (3×100 mL). The combined organic layers were washed with water (3×50 mL), brine (50 mL), dried ($Na_2SO_4$) and concentrated in vacuo to give crude product as a brown solid. Purification of the crude product by trituration in acetonitrile afforded 1-(cyclopropylmethyl)-1H-pyrazole-3-carboxylic acid (10) as an off-white solid (3.0 g, 81%). $^1$H NMR (400 MHz, DMSO-$d^6$) δ 12.56 (s, 1H), 7.85 (d, J=2.3 Hz, 1H), 6.68 (d, J=2.3 Hz, 1H), 4.02 (d, J=7.2 Hz, 2H), 1.25 (pt, J=7.6, 4.8 Hz, 1H), 0.58-0.49 (m, 2H), 0.37 (dt, J=6.2, 4.4 Hz, 2H).

To a solution of 1-(cyclopropylmethyl)-1H-pyrazole-3-carboxylic acid (10) (1.0 g, 6.0 mmol) in DCM (25 mL) and DMF (1 drop) was added oxalyl chloride (1.0 mL, 12.0 mmol) dropwise at 0° C. After stirring the reaction mixture at room temperature for 45 min, volatiles were concentrated and co-evaporated with DCM (3 times) in vacuo to give 1-(cyclopropylmethyl)-1H-pyrazole-3-carbonyl chloride (1.0 g, 90%) as a light brown solid.

A solution of 1-(cyclopropylmethyl)-1H-pyrazole-3-carbonyl chloride (250.0 mg, 1.35 mmol) in DCM (5.0 mL) was added to a solution of 3-methylpyridin-4-amine (4) (175.0 mg, 1.62 mmol) and triethylamine (380.0 μL, 2.70 mmol) in DCM (5 mL). The resulting mixture was stirred at room temperature for 24 h. The reaction mixture was diluted with DCM (50 mL), washed with water (2×10 mL), brine (10 mL) and concentrated in vacuo to give crude product. The crude product was purified by combi-flash column chromatography using EtOAc-Hexanes as a solvent mixture to afford 1-(cyclopropylmethyl)-N-(3-methylpyridin-4-yl)-1H-pyrazole-3-carboxamide (title compound) (280.0 mg, 80%) as a white solid. $^1$H NMR (400 MHz, DMSO-d$^6$) δ 9.39 (s, 1H), 8.40 (s, 1H), 8.36 (d, J=5.4 Hz, 1H), 7.98 (d, J=2.3 Hz, 1H), 7.91 (d, J=5.4 Hz, 1H), 6.82 (d, J=2.3 Hz, 1H), 4.10 (d, J=7.2 Hz, 2H), 2.28 (s, 3H), 1.39-1.24 (m, 1H), 0.63-0.54 (m, 2H), 0.41-0.45 (m, 2H). MS (ESI) m/z: [M+H]$^+$ Calcd for $C_{14}H_{17}N_4O$ 257.1397; Found 257.1400.

Example 20—1-(cyclopropylmethyl)-N-(3-fluoropyridin-4-yl)-1H-pyrazole-3-carboxamide

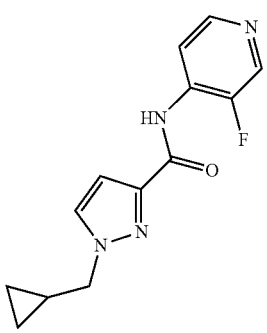 [SMILES: O=C(Nc1ccncc1F)c1ccn(CC2CC2)n1]

$^1$H NMR (400 MHz, DMSO-d$^6$) δ 9.68 (s, 1H), 8.58 (d, J=2.6 Hz, 1H), 8.38 (d, J=5.3 Hz, 1H), 8.11 (dd, J=6.7, 5.3 Hz, 1H), 7.99 (d, J=2.4 Hz, 1H), 6.86 (d, J=2.4 Hz, 1H), 4.11 (d, J=7.2 Hz, 2H), 1.37-1.27 (m, 1H), 0.62-0.52 (m, 2H), 0.40-0.44 (m, 2H); MS (ESI) m/z: [M+H]$^+$ Calcd for $C_{13}H_{14}FN_4O$ 261.1146; Found 261.1145.

Example 21—1-(cyclopropylmethyl)-N-(2,6-difluorophenyl)-1H-pyrazole-3-carboxamide

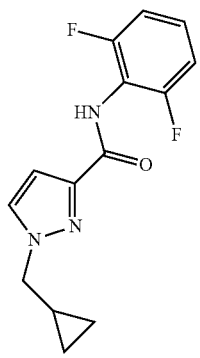 [SMILES: O=C(Nc1c(F)cccc1F)c1ccn(CC2CC2)n1]

$^1$H NMR (400 MHz, CDCl$_3$) δ 8.23 (s, 1H), 7.55 (d, J=2.2 Hz, 1H), 7.25-7.16 (m, 1H), 6.98 (t, J=8.1 Hz, 2H), 6.91 (d, J=2.3 Hz, 1H), 1.28-1.38 (m, 1H), 0.75-0.66 (m, 2H), 0.40-0.44 (m, 2H); MS (ESI) m/z: [M+H]$^+$ Calcd for $C_{14}H_{14}F_2N_3O$ 278.1099; Found 278.1094.

Example 22—1-(cyclopropylmethyl)-N-(3,5-difluoropyridin-4-yl)-1H-pyrazole-3-carboxamide

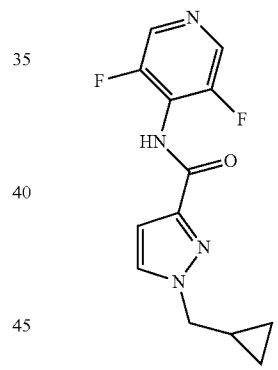

MS (ESI) m/z: [M+H]$^+$ Calcd for $C_{13}H_{13}F_2N_4O$ 279.1052; Found 279.1054.

General Scheme for the Synthesis of Examples 23 and 24

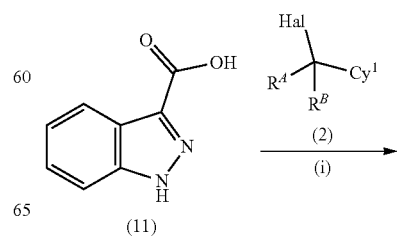

-continued

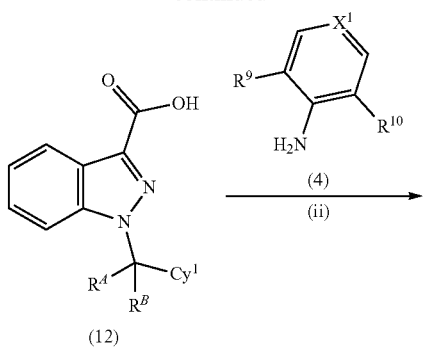

(12)

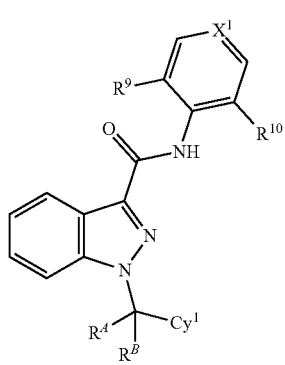

Example 23—1-(cyclopropylmethyl)-N-(3-fluoro-pyridin-4-yl)-1H-indazole-3-carboxamide

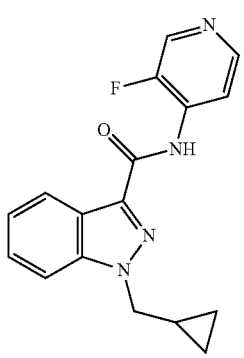 [SMILES: O=C(Nc1ccncc1F)c1nn(CC2CC2)c2ccccc12]

The title compound was obtained according to the methods and procedures similar to those of Example 19.

$^1$H NMR (400 MHz, DMSO-d$^6$) δ 9.92 (d, J=2.0 Hz, 1H), 8.61 (d, J=2.6 Hz, 1H), 8.41 (d, J=5.3 Hz, 1H), 8.25-8.16 (m, 2H), 7.91 (d, J=8.6 Hz, 1H), 7.53 (ddd, J=8.3, 6.9, 1.1 Hz, 1H), 7.37 (ddd, J=8.0, 6.9, 0.8 Hz, 1H), 4.48 (d, J=7.1 Hz, 2H), 1.46-1.33 (m, 1H), 0.61-0.44 (m, 4H); MS (ESI) m/z: [M+H]$^+$ Calcd for C$_{17}$H$_{16}$FN$_4$O 311.1303; Found 311.1307.

Example 24—1-(cyclopropylmethyl)-N-(2,6-difluorophenyl)-1H-indazole-3-carboxamide

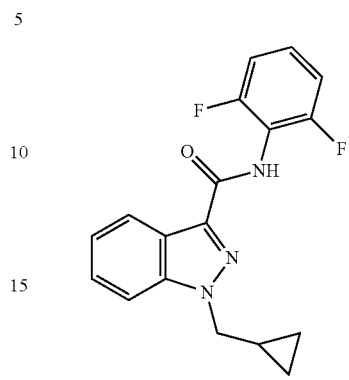

The title compound was obtained according to the methods and procedures similar to those of Example 19.

$^1$H NMR (400 MHz, DMSO-d$^6$) δ 10.03 (s, 1H), 8.15 (d, J=8.2 Hz, 1H), 7.87 (d, J=8.6 Hz, 1H), 7.52-7.46 (m, 1H), 7.38-7.45 (m, 1H), 7.34-7.29 (m, 1H), 7.21 (t, J=8.1 Hz, 2H), 4.46 (d, J=7.0 Hz, 2H), 1.36-1.44 (m, 1H), 0.61-0.43 (m, 4H); MS (ESI) m/z: [M+H]$^+$ Calcd for C$_{18}$H$_{16}$F$_2$N$_3$O 328.1256; Found 328.1263.

General Scheme for the Synthesis of Examples 25 and 26

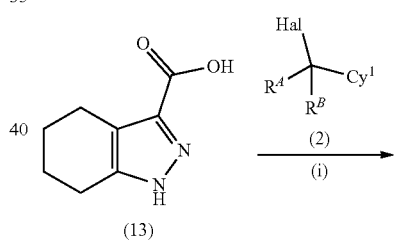

(13)

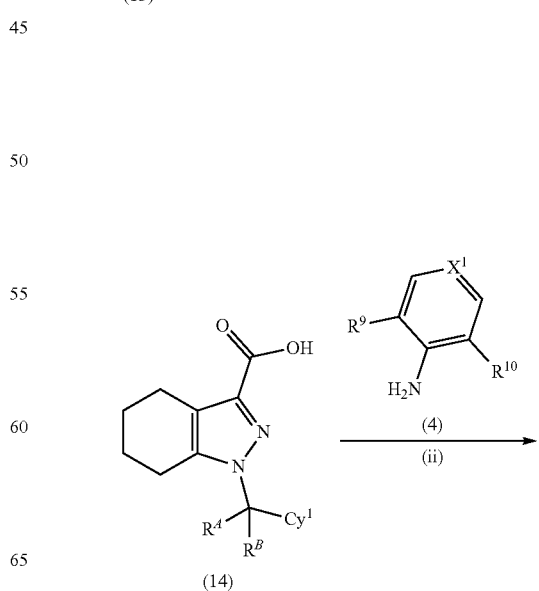

(14)

-continued

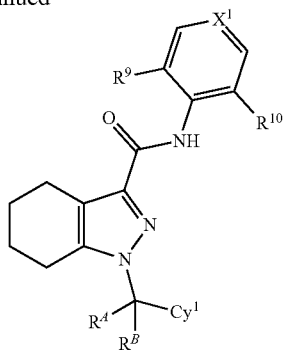

Example 25—1-(cyclopropylmethyl)-N-(3-fluoro-pyridin-4-yl)-4,5,6,7-tetrahydro-1H-indazole-3-carboxamide

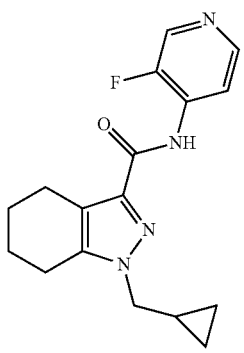 [SMILES: O=C(Nc1ccncc1F)c1nn(CC2CC2)c2c1CCCC2]

The title compound was obtained according to the methods and procedures similar to those of Example 19.

$^1$H NMR (400 MHz, DMSO-d$^6$)) δ 9.41 (s, 1H), 8.56 (d, J=2.6 Hz, 1H), 8.35 (d, J=5.3 Hz, 1H), 8.20 (dd, J=6.8, 5.4 Hz, 1H), 3.98 (d, J=7.0 Hz, 2H), 2.68 (dt, J=15.5, 6.2 Hz, 4H), 1.65-1.80 (m, 4H), 1.32-1.17 (m, 1H), 0.60-0.45 (m, 2H), 0.36-0.40 (m, 2H); MS (ESI) m/z: [M+H]$^+$ Calcd for $C_{17}H_{20}FN_4O$ 315.1616; Found 315.1618.

Example 26—1-(cyclopropylmethyl)-N-(2,6-difluorophenyl)-4,5,6,7-tetrahydro-1H-indazole-3-carboxamide

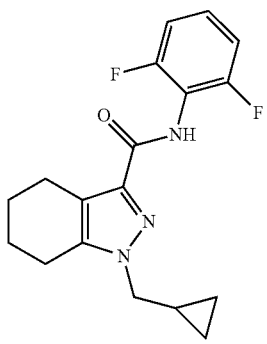 [SMILES: O=C(Nc1c(F)cccc1F)c1nn(CC2CC2)c2c1CCCC2]

The title compound was obtained according to the methods and procedures similar to those of Example 19.

$^1$H NMR (400 MHz, DMSO-d$^6$) δ 9.48 (s, 1H), 7.36 (tt, J=8.5, 6.3 Hz, 1H), 7.21-7.08 (m, 2H), 3.96 (d, J=6.9 Hz, 2H), 2.65 (q, J=5.6 Hz, 4H), 1.86-1.57 (m, 4H), 1.36-1.17 (m, 1H), 0.58-0.49 (m, 2H), 0.43-0.35 (m, 2H); MS (ESI) m/z: [M+H]$^+$ Calcd for $C_{18}H_{20}F_2N_3O$ 332.1569; Found 332.1575.

General Scheme for the Synthesis of Examples 27-30

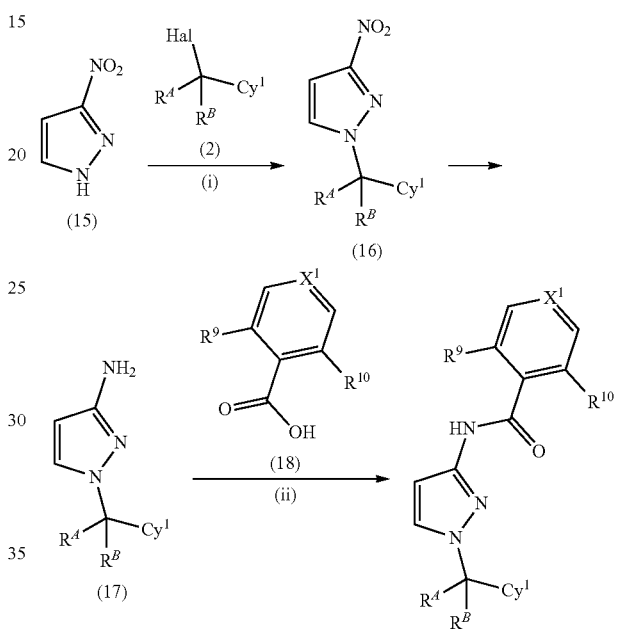

Example 27—N-(1-(cyclopropylmethyl)-1H-pyrazol-3-yl)-3,5-difluoroisonicotinamide

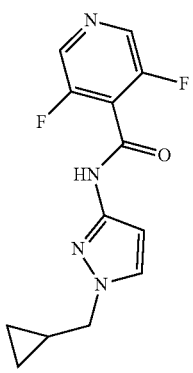 [SMILES: O=C(Nc1ccn(CC2CC2)n1)c1c(F)cncc1F]

A mixture of 3-nitro-1H-pyrazole (15) (9 g, mmol), (bromomethyl)cyclopropane (2) (1.2 eq), and potassium carbonate (g, mmol) and DMF (ml) was microwave irradiation at 120° C. for 40 minutes. The reaction mixture was diluted with ethyl acetate and washed with water, brine, dried (Na$_2$SO$_4$) and concentrated in vacuo, and the residue was purified with combi-flash silica gel column chromatography using EtOAc-Hexanes solvent system to give 1-(cyclopropylmethyl)-3-nitro-1H-pyrazole (16) as a light yellow oil. $^1$H NMR (400 MHz, CDCl$_3$) δ 7.57 (d, J=2.1 Hz, 1H), 6.90 (d, J=2.1 Hz, 1H), 4.06 (d, J=7.3 Hz, 2H), 1.40-1.29 (m, 1H), 0.78-0.66 (m, 2H), 0.44 (dd, J=5.9, 4.6 Hz, 2H).

A solution of 1-(cyclopropylmethyl)-3-nitro-1H-pyrazole (16) was dissolved in ethyl acetate (mL) and methanol (mL) was added 10% palladium on activated carbon. The reaction mixture was charged with hydrogen gas (1 atm) and stirred for 16 h at room temperature. The mixture was passed through a plug of celite and concentrated in vacuo to afford 1-(cyclopropylmethyl)-1H-pyrazol-3-amine (17) as light yellow oil. $^1$H NMR (400 MHz, CDCl$_3$) δ 7.22 (d, J=2.2 Hz, 1H), 5.58 (d, J=2.3 Hz, 1H), 3.76 (d, J=7.0 Hz, 2H), 3.39 (brs, 2H), 1.30-1.16 (m, 1H), 0.66-0.55 (m, 2H), 0.31 (dt, J=6.1, 4.8 Hz, 2H).

A solution of 3,5-difluoroisonicotinoyl chloride in DCM was added to a solution of 1-(cyclopropylmethyl)-1H-pyrazol-3-amine (17) and triethylamine in DCM. The resulting mixture was stirred at room temperature for 24 h. The reaction mixture was diluted with DCM (mL), washed with water, brine and concentrated in vacuo to give crude product. The crude product was purified by combi-flash column chromatography using EtOAC-Hexanes as a solvent mixture to afford N-(1-(cyclopropylmethyl)-1H-pyrazol-3-yl)-3,5-difluoroisonicotinamide (title compound) (mg, %) as a white solid. $^1$H NMR (400 MHz, DMSO-d$^6$) δ 11.52 (s, 1H), 8.67 (s, 2H), 7.73 (d, J=2.3 Hz, 1H), 6.58 (d, J=2.3 Hz, 1H), 3.90 (d, J=7.1 Hz, 2H), 1.32-1.09 (m, 1H), 0.62-0.46 (m, 2H), 0.41-0.26 (m, 2H). MS (ESI) m/z: [M+H]$^+$ Calcd for C$_{13}$H$_{13}$F$_2$N$_4$O 279.1052; Found 279.1062.

Example 28—N-(1-(cyclopropylmethyl)-1H-pyrazol-3-yl)-3-fluoroisonicotinamide

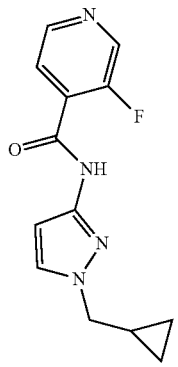 [SMILES: O=C(Nc1ccn(CC2CC2)n1)c1ccncc1F]

The title compound was obtained according to the methods and procedures similar to those of Example 27.

$^1$H NMR (400 MHz, CDCl$_3$) δ 8.88 (brs, 1H), 8.65 (d, J=2.7 Hz, 1H), 8.62 (dd, J=5.0, 1.4 Hz, 1H), 8.02 (dd, J=6.6, 5.0 Hz, 1H), 7.46 (d, J=2.3 Hz, 1H), 6.83 (d, J=2.3 Hz, 1H), 3.91 (d, J=7.1 Hz, 3H), 1.34-1.22 (m, 1H), 0.71-0.62 (m, 2H), 0.42-0.33 (m, 2H); MS (ESI) m/z: [M+H]$^+$ Calcd for C$_{13}$H$_{14}$FN$_4$O 261.1146; Found 261.1145.

Example 29—N-(1-(cyclopropylmethyl)-1H-pyrazol-3-yl)-2,6-difluorobenzamide

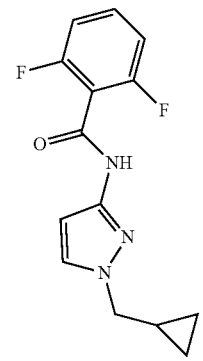 [SMILES: O=C(Nc1ccn(CC2CC2)n1)c1c(F)cccc1F]

The title compound was obtained according to the methods and procedures similar to those of Example 27.

$^1$H NMR (400 MHz, CDCl$_3$) δ 8.22 (s, 1H), 7.47-7.36 (m, 2H), 6.99 (t, J=8.3 Hz, 2H), 6.85 (d, J=2.3 Hz, 1H), 3.87 (d, J=7.0 Hz, 2H), 1.28-1.24 (m, 2H), 0.71-0.60 (m, 2H), 0.38-0.34 (m, 2H); MS (ESI) m/z: [M+H]$^+$ Calcd for C$_{14}$H$_{14}$F$_2$N$_3$O 278.1099; Found 278.1108.

Example 30—N-[1-(cyclopropylmethyl)-1H-pyrazol-3-yl]-3-methylpyridine-4-carboxamide

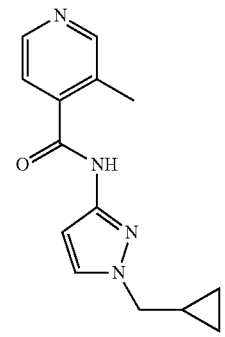 [SMILES: Cc1cnccc1C(=O)Nc1ccn(CC2CC2)n1]

The title compound was obtained according to the methods and procedures similar to those of Example 27.

MS (ESI) m/z: [M+H]$^+$ Calcd for C$_{14}$H$_{14}$F$_2$N$_3$O 257.1402; Found 257.1408.

Example 30A Exemplified Compounds 31-43

Compounds 31-43 were prepared according to the methods and procedures similar to those described in Examples 1-20, using readily available starting materials.

| No. | Structure | IUPAC name |
|---|---|---|
| 31 | | 1-(cyclopropylmethyl)-N-(3-fluoropyridin-4-yl)-1H-pyrazolo[3,4-b]pyridine-3-carboxamide |
| 32 | | 1-(cyploroylmethyl)-N-(3-fluoropyridin-4-yl)-1,4,5,6-tetrahydrocyclopenta[c]pyrazole-3-carboxamide |
| 33 | | 1-(cyclobutylmethyl)-N-(3-fluoropyridin-4-yl)-4,5,6,7-tetrahydro-1H-indazole-3-carboxamide |
| 34 | | 1-(cyclopropylmethyl)-N-(3-fluoropyridin-4-yl)-5-methyl-1H-indazole-3-carboxamide |

| No. | Structure | IUPAC name |
| --- | --- | --- |
| 35 | | 6-chloro-1-(cyclopropylmethyl)-N-(3-fluoropyridin-4-yl)-1H-indazole-3-carboxamide |
| 36 | | 1-(cyclopropylmethyl)-5-bromo-N-(3-fluoropyridin-4-yl)-1H-indazole-3-carboxamide |
| 37 | | 1-(cyclopropylmethyl)-5-fluoro-N-(3-fluoropyridin-4-yl)-1H-indazole-3-carboxamide |
| 38 | | 1-(cyclopropylmethyl)-6-fluoro-N-(3-fluoropyridin-4-yl)-1H-indazole-3-carboxamide |

-continued
| No. | Structure | IUPAC name |
|---|---|---|
| 39 | 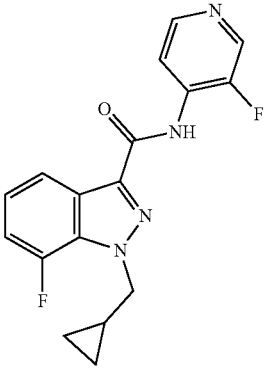 [SMILES: O=C(Nc1ccncc1F)c1nn(CC2CC2)c2c(F)cccc12] | 1-(cyclopropylmethyl)-7-fluoro-N-(3-fluoropyridin-4-yl)-1H-indazole-3-carboxamide |
| 40 | 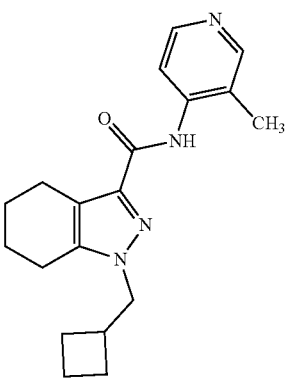 [SMILES: Cc1cnccc1NC(=O)c1nn(CC2CCC2)c2c1CCCC2] | 1-(cyclobutylmethyl)-N-(3-methylpyridin-4-yl)-4,5,6,7-tetrahydro-1H-indazole-3-carboxamide |
| 41 | 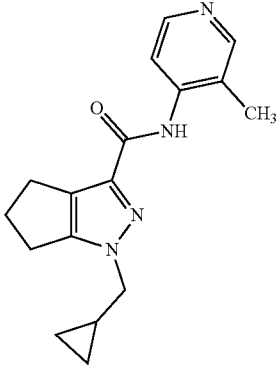 [SMILES: Cc1cnccc1NC(=O)c1nn(CC2CC2)c2c1CCC2] | 1-(cyproylmethyl)-N-(3-methylpyridin-4-yl)-1,4,5,6-tetrahydrocyclopenta[c]pyrazole-3-carboxamide |
| 42 | 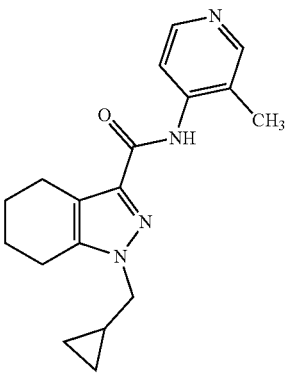 [SMILES: Cc1cnccc1NC(=O)c1nn(CC2CC2)c2c1CCCC2] | 1-(cyclopropylmethyl)-N-(3-methylpyridin-4-yl)-4,5,6,7-tetrahydro-1H-indazole-3-carboxamide |

| No. | Structure | IUPAC name |
|---|---|---|
| 43 | | 1-(cyclopropylmethyl)-N-(3-fluoropyridin-4-yl)-2-methyl-1H-indole-3-carboxamide |

Example 30B—$^1$H NMR and Mass Spec Data for Exemplified Compounds 31-43

| No. | $^1$H NMR and mass spec data |
|---|---|
| 31 | $^1$H-NMR (400 MHz, DMSO-d$_6$): 0.48-0.57 (m, 4H), 1.39-1.50 (m, 1H), 4.50 (d, J = 7.2 Hz, 2H), 7.47 (dd, J = 4.5 Hz, 8.2 Hz, 1H), 8.11 (dd, J = 5.3 Hz, 6.7 Hz, 1H), 8.42 (d, J = 5.3 Hz, 1H), 8.59 (dd, J = 1.5 Hz, 8.2 Hz, 1H), 8.63 (d, J = 2.6 Hz, 1H), 8.71 (dd, J = 1.5 Hz, 4.5 Hz, 1H), 10.14 (s, 1H). MS (ESI) m/z: [M + H]$^+$ found: 312.1265; C16H15FN5O requires 312.1261. |
| 32 | $^1$H-NMR (400 MHz, DMSO-d$_6$): 0.36-0.40 (m, 2H), 0.54-.059 (m, 2H), 1.22-1.29 (m, 1H), 2.51-2.57 (m, 2H), 2.73 (t, J = 7.1 Hz, 2H), 2.80 (t, J = 7.2 Hz, 2H), 3.99 (d, J = 7.1 Hz, 2 H), 8.17 (dd, J = 6.7 Hz, 5.3 Hz, 1H), 8.36 (d, J = 5.3 Hz, 1H), 8.56 (d, J = 2.6 Hz, 1H), 9.41 (bs, 1H). MS (ESI) m/z: [M + H]$^+$ found: 301.1469; C$_{16}$H$_{17}$FN$_4$O requires 301.1465. |
| 33 | $^1$H-NMR (400 MHz, DMSO-d$_6$): 1.66-1.89 (m, 8H), 1.97-2.02 (m, 2H), 2.64 (t, J = 6.1 Hz, 2H), 2.69 (t, J = 6.0 Hz, 2H), 2.78 (p, J = 7.5 Hz, 1H), 4.10 (d, J = 7.2 Hz, 2H), 8.20 (dd, J = 6.7 Hz, 5.3 Hz, 1H), 8.35 (d, J = 5.3 Hz, 1H), 8.56 (d, J = 2.6 Hz, 1H), 9.38 (bs, 1H). MS (ESI) m/z: [M + H]$^+$ found: 329.1769; C$_{18}$H$_{22}$FN$_4$O requires 329.1778. |
| 34 | $^1$H-NMR (400 MHz, DMSO-d$_6$): 0.45-0.56 (m, 4H), 1.32-1.42 (m, 1H), 2.47 (s, 3H), 4.45 (d, J = 7.1 Hz, 2H), 7.36 (dd, J = 8.7 Hz, 1.6 Hz, 1H), 7.79 (d, J = 8.7 Hz, 1H), 7.99 (s, 1H), 8.20 (m, 1H), 8.41 (d, J = 5.3 Hz, 1H), 8.61 (d, J = 2.3 Hz, 1H), 9.84 (s, 1H). MS (ESI) m/z: [M + H]$^+$ found: 325.1449; C$_{18}$H$_{18}$FN$_4$O requires 325.1465. |
| 35 | $^1$H-NMR (400 MHz, DMSO-d$_6$): 0.46-0.56 (m, 4H), 1.35-1.45 (m, 1H), 4.47 (d, J = 7.1 Hz, 2H), 7.39 (dd, J = 8.7 Hz, 1.7 Hz, 1H), 8.16 (m, 3H), 8.41 (d, J = 5.3 Hz, 1H), 8.61 (d, J = 2.3 Hz, 1H), 10.01 (s, 1H). MS (ESI) m/z: [M + H]$^+$ found: 345.0892; C$_{17}$H$_{15}$ClFN$_4$O requires 345.0918. |
| 36 | $^1$H-NMR (400 MHz, DMSO-d$_6$): 0.46-0.57 (m, 4H), 1.35-1.42 (m, 1H), 4.48 (d, J = 7.6 Hz, 2H), 7.45 (tdd, J = 9.1 Hz, 2.5 Hz, 1.0 Hz, 1H), 7.83 (dd, J = 8.8 Hz, 2.5 Hz, 1H), 7.99 (dd, J = 9.2 Hz, 4.2 Hz, 1H), 8.15 (dd, J = 6.8 Hz, 5.2 Hz, 1H), 8.41 (d, J = 5.2 Hz, 1H), 8.61 (s, 1H), 9.94 (s, 1H). MS (ESI) m/z: [M + H]$^+$ found: 389.0376; C$_{17}$H$_{15}$BrFN$_4$O requires 389.0413. |
| 37 | $^1$H-NMR (400 MHz, DMSO-d$_6$): 0.46-0.57 (m, 4H), 1.36-1.42 (m, 1H), 4.48 (d, J = 7.6 Hz, 2H), 7.45 (tdd, J = 9.10 Hz, 2.54 Hz, 1.01 Hz, 1H), 7.83 (dd, J = 8.85 Hz, 2.49 Hz, 1H), 7.99 (dd, J = 9.23 Hz, 4.16 Hz, 1H), 8.15 (dd, J = 6.78 Hz, 5.24 Hz, 1H), 8.41 (d, J = 5.25 Hz, 1H), 8.61 (s, 1H), 9.94 (s, 1H). MS (ESI) m/z: [M + H]$^+$ found: 329.1204; C$_{17}$H$_{15}$F$_2$N$_4$O requires 329.1214. |
| 38 | $^1$H-NMR (400 MHz, DMSO-d$_6$): 0.47-0.56 (m, 4H), 1.34-1.44 (m, 1H), 4.44 (d, J = 7.1 Hz, 2H), 7.26 (dt, J = 9.2 Hz, 2.2 Hz, 1H), 8.14 (dd, J = 6.7 Hz, 5.3 Hz, 1H), 8.20 (dd, J = 8.9 Hz, 5.3 Hz, 1H), 8.41 (d, J = 5.3 Hz, 1H), 8.61 (d, J = 2.5 Hz, 1H), 9.97 (s, 1H). MS (ESI) m/z: [M + H]$^+$ found: 329.1205; C$_{17}$H$_{15}$F$_2$N$_4$O requires 329.1214. |
| 39 | $^1$H-NMR (400 MHz, DMSO-d$_6$): 0.46-0.57 (m, 4H), 1.37-1.43 (m, 1H), 4.51 (d, J = 7.1 Hz, 2H), 7.32-7.42 (m, 2H), 8.03 (d, J = 7.9 Hz, 1H), 8.12 (dd, J = 6.8 Hz, 5.2 Hz, 1H), 8.42 (d, J = 5.3 Hz, 1H), 8.62 (d, J = 2.6 Hz, 1H), 10.06 (s, 1H). MS (ESI) m/z: [M + H]$^+$ found: 329.1201; C$_{17}$H$_{15}$F$_2$N$_4$O requires 329.1214. |
| 40 | $^1$H-NMR (400 MHz, DMSO-d$_6$): 1.65-1.90 (m, 8H), 1.97-2.04 (m, 2H), 2.27 (s, 3H), 2.63 (t, J = 5.7 Hz, 2H), 2.69 (t, J = 6.0 Hz, 2H), 2.79 (p, J = 7.5 Hz, 1H), 4.08 (d, J = 7.2 Hz, 2H), 8.03 (d, J = 5.5 Hz, 1H), 8.33 (d, J = 5.5 Hz, 1H), 8.37 (s, 1H), 9.14 (bs, 1H). MS (ESI) m/z: [M + H]$^+$ found: 325.2028; C$_{19}$H$_{25}$N$_4$O requires 325.2028. |

-continued

| No. | ¹H NMR and mass spec data |
|---|---|
| 41 | $^1$H-NMR (400 MHz, DMSO-$d_6$): 0.37-0.40 (m, 2H), 0.54-.059 (m, 2H), 1.22-1.29 (m, 1H), 2.27 (s, 3H), 2.51-2.57 (m, 2H), 2.73 (t, J = 7.1 Hz, 2H), 2.80 (t, J = 7.2 Hz, 2H), 3.97 (d, J = 7.1 Hz, 2 H), 7.99 (d, J = 5.5 Hz, 1H), 8.34 (d, J = 5.6 Hz, 1H), 8.38 (s, 1H), 9.16 (bs, 1H). MS (ESI) m/z: [M + H]$^+$ found: 297.1740; $C_{17}H_{21}N_4O$ requires 297.1715. |
| 42 | $^1$H-NMR (400 MHz, DMSO-$d_6$): 0.38-0.41 (m, 2H), 0.52-0.56 (m, 2H), 1.21-1.29 (m, 1H), 1.65-1.79 (m, 4H), 2.27 (s, 3H), 2.65-2.72 (m, 4H), 3.96 (d, J = 7.0 Hz, 2H), 8.02 (d, J = 5.5 Hz, 1H), 8.34 (d, J = 5.4 Hz, 1H), 8.37 (s, 1H), 9.19 (s, 1H). MS (ESI) m/z: [M + H]$^+$ found: 311.1896; $C_{18}H_{23}N_4O$ requires 311.1872. |
| 43 | $^1$H-NMR (400 MHz, DMSO-$d_6$): 0.41-0.51 (m, 4H), 1.18-1.23 (m, 1H), 2.72 (m, 3H), 4.18 (d, J = 6.8 Hz, 2H), 7.20 (m, 2H), 7.60 (m, 1H), 7.81 (m, 1H), 8.13 (dd, J = 6.8 Hz, 5.3 Hz, 1H), 8.34 (d, J = 5.3 Hz, 1H), 8.54 (d, J = 2.8 Hz, 1H), 9.72 (s, 1H). MS (ESI) m/z: [M + H]$^+$ found: 324.1503; $C_{19}H_{19}FN_3O$ requires 324.1512. |

Example 31—Calcium Influx Assay

Rat mast cells (RBL-2H3 cells) (ATCC) were seeded in 96-well plate at 4×10$^4$ cells per well in DMEM-supplemented with 2% FBS and allowed to adhere overnight. Culture medium was then replaced with 50 µl of Ca$^{2+}$-free Tyrode buffer to load Ca$^{2+}$-probe Fluo-4NW (Molecular Probe, Thermo Fisher, MA, USA) per manufacturer instruction. A testing compound at indicated concentrations was supplied during the probe loading from the beginning. Cells were incubated in the presence or absence of a testing compound for 60 minutes in the Ca$^{2+}$-free medium at 37° C. During the last 5 minutes of incubation, cells were treated with 1 µM thapsigargin (Tg, Sigma Aldrich) to deplete $[Ca^{2+}]_{ER}$, 20 mM CaCl$_2$ in normal saline solution was supplemented back to the $[Ca^{2+}]_{ER}$-depleted cells to have 2 mM as final concentration. Culture medium was removed 1 minute after Ca$^{2+}$ reloading, and changes in Fluo-4NW fluorescence (RFU) were recorded with the multi-mode plate reader (FilterMax F5, Molecular Devices/Thermo Fisher Scientific, MA, USA) at an excitation wavelength of 485 nm and an emission wavelength of 535 nm. The inhibitory activity of the tested compound was presented as % of control (DMSO).

TABLE

| Conc. (µM) | Example No. | | | | | | | |
|---|---|---|---|---|---|---|---|---|
| | 1 | 4 | 3 | 13 | 2 | 7 | 9 | 8 |
| | | | | % of control | | | | |
| 1 | 75 | 61 | 66 | 63 | 46 | 85 | 81 | 50 |
| 10 | 42 | 44 | 37 | 31 | 14 | 80 | 65 | 25 |

Example 32—Automated Patch-Clamp Assay

Whole-cell voltage clamp experiments were performed at room temperature, on a QPatch 16 automated electrophysiology platform (Sophion Biosciences) using disposable 16-channel planar patch chip plates (QPlates). Data were sampled at 5 KHz and a 70% series resistance compensation was used.

Cell Culture and Preparation: HEK293 NatClytin/pcDNA3STIM1/pBudORAI1 cells are cultured in Minimum Essential Medium Eagle with Earle's Salts (EMEM), supplemented with 10% fetal bovine serum, 1% penicillin-streptomycin, 2 mM Ultraglutamine-1. Medium is supplemented with 0.1 µg/mL Puromycin, 0.2 mg/mL G418 and 10 µg/mL Zeocin. Standard propagation conditions consist in 1:5-1:8 dilutions of confluent flasks, twice a week.

72 or 96 hours before experiment, 6 or 4.5 million cells, respectively were seeded onto T225. Just before the experiment cells were washed twice with D-PBS w/o Ca$^{2+}$/Mg$^{2+}$ and detached from the flask with trypsin-EDTA. Cells were then re-suspended in an apposite solution: 25 mL EX-CELL ACF CHO medium; 0.625 mL HEPES; 0.25 mL of 100× penicillin/streptomycin, 0.1 mL of soybean trypsin inhibitor 10 mg/mL and placed on the QPatch 16.

Solutions: The intracellular solution contains: 145 mM CsGlu, 8 mM NaCl, 1 mM MgCl$_2$, 10 mM BAPTA, 10 mM HEPES (pH 7.2 with CsOH);

Solutions: the seal is obtained in an extracellular solution containing calcium and magnesium: 145 mM NaCl, 5 mM KCl, 1 mM MgCl$_2$, 2 mM CaCl$_2$, 10 mM HEPES (pH 7.4 with NaOH); whereas the experiment is performed in a divalent free solution: 145 mM NaCl, 4 mM KCl, 10 mM Glc, 10 mM MES (pH 7.4 with NaOH).

Voltage protocol: cells are held at 0 mV and the CRAC current is evoked using the following voltage protocol: 50 ms step at 0 mV; 50 ms step at −100 mV; 500 ms ramp from −100 to +20 mV; 100 ms step at 0 mV; in absence (vehicle) and presence of increasing concentrations of the compound under investigation. After the whole cell configuration establishment, the current elicited upon application of the voltage protocol, was allowed to develop for 3 minutes in the presence of the vehicle (ext. solution+0.2% DMSO), then different concentrations of the compound under investigation were applied for 3 minutes each and finally 10 mM of CdCl$_2$ was applied to totally block ICRAC "0 current", and control the seal quality.

The percentage of inhibition is calculated as indicated below:

$$\% \text{ of inhibition} = 100 - 100 \times ((CP - 0 \text{ current})/(CT - 0 \text{ current}))$$

The percentage of inhibition elicited by each concentration of the compound under investigation was calculated and data fitting to obtain IC$_{50}$ values was performed with GraphPad Prism. The IC$_{50}$ of Example 2 was determined as 13.77

Example 33—NFAT Activation Assay

Jurkat cells (BPS Bioscience catalog No. 60621) were seeded at 40,000 cells per well into white clear-bottom 96-well microplate in 80 µl of growth medium without Geneticin. 10 µl of testing compounds (final 10 µM) were added to each well and preincubated with cells for half an hour. Then 10 µl of PMA and ionomycin mixture were added to each well to make the final concentration of 15 nM PMA and 0.5 µM ionomycin. Cells were incubated at 37° C. and 5% $CO_2$ incubator for 18 hours. After treatment, cells were lysed and the luciferase assay was performed using ONE-Step luciferase assay system by adding 100 µl of One-Step Luciferase reagent (BPS Bioscience catalog No. 60690) per well followed by rocking at room temperature for about 30 minutes. Luminescence was measured using a luminometer (BioTek Synergym™ 2 microplate reader). The percent luminescence in the presence of each compound was calculated according to the following equation: % Luminescence=$(L-L_b)/(L_t-L_b)$, where L=the luminescence intensity in the presence of the compound, $L_b$=the luminescence intensity in the absence of cells, and $L_t$=the luminescence intensity in the absence of the compound. The percent inhibition was calculated by: % inhibition=100−(% Luminescence).

TABLE

| Example No. | Activity 10 µM[1] |
|---|---|
| 1 | ++ |
| 3 | ++ |
| 4 | ++ |
| 5 | + |
| 6 | +++ |
| 7 | ++ |
| 8 | +++ |
| 9 | +++ |
| 10 | +++ |
| 11 | +++ |
| 12 | +/− |
| 13 | +++ |
| 14 | +/− |
| 15 | + |
| 16 | +/− |
| 17 | +/− |
| 18 | + |
| 19 | ++ |
| 20 | ++ |
| 21 | +/− |
| 22 | +/− |
| 23 | +++ |
| 25 | +++ |
| 26 | ++ |
| 27 | + |
| 28 | +/− |
| 30 | +/− |
| 31 | ++ |
| 32 | +++ |
| 33 | +++ |
| 34 | +++ |
| 35 | ++ |
| 36 | ++ |
| 37 | +++ |
| 38 | +++ |
| 39 | ++ |
| 40 | +++ |
| 41 | ++ |
| 42 | +++ |
| 43 | +++ |

[1]Note:
+/−: <25% inhibition;
+: 26-50% inhibition;
++: 51-75% inhibition;
+++: >75% inhibition.

Example 34—Interleukine-2 (IL-2) Assay

Human Jurkat T cells (ATCC) were plated in Dubelcco's Modified Eagle Medium (DMEM) with 1% FBS in a 96 well plate at a density of 1×10⁶ cells/well. Cells were treated with a testing compound at different concentrations and stimu-lated by PMA (10 nM) and TG (100 nM). The treated cells were incubated at 8 hours. The supernatants were collected and assayed for IL-2 levels by ELISA according to the manufacturer's protocols. The $IC_{50}$ of Example 2 was determined to be 3 µM.

Example 35—Degranulation and Cytokine Release from Rat Mast Cells $[Ca^{2+}]_{ER}$ in RBL (ATCC) rat mast cells were depleted by Tg in the presence of a test compound. Then 1000 of DMEM-2% FBS (containing 5 mM $Ca^{2+}$) was supplemented back in the presence of the corresponding concentration of MCS-01.

Thirty minutes after replenishing $Ca^{2+}$ the culture supernatant was collected for MC degranulation and cytokine release. Degranulation was measured as percent secreted β-hexosaminidase (β-Hex) according to the protocol of the assay kit (Sigma-Aldrich, MO, USA). At this time point TNF-α was also measured using ELISA kit (R&D Systems, MN, USA). The $IC_{50}$ of Example 2 was determined to be 1.2 µM in the degranulation assay.

The inhibitory activity of the tested compound in the TNF-α assay was presented as % of control (DMSO).

TABLE

| | Example No. | | |
|---|---|---|---|
| | 13 | 2 | 8 |
| Conc. (µM) | | % of control | |
| 1 | 67 | 57 | 79 |
| 10 | 53 | 30 | 51 |

Other Embodiments

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:
1. A compound of

Formula (I)

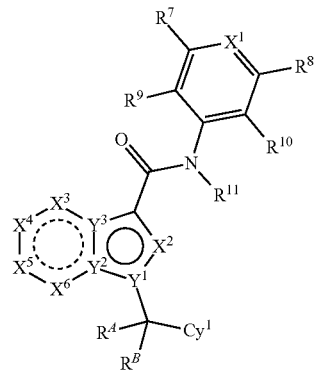

, or a pharmaceutically acceptable salt thereof, wherein:

represents that the ring is saturated, partially unsaturated, or aromatic;

represents that the ring is aromatic;
$X^1$ is selected from N and $CR^1$;
$X^2$ is selected from N and $CR^2$;
$X^3$ is selected from N, $NR^{N3}$, O, S, $CR^3$, and $C(R^3)_2$;
$X^4$ is selected from N, $NR^{N4}$, O, S, $CR^4$, and $C(R^4)_2$;
$X^5$ is selected from N, $NR^{N5}$, O, S, $CR^5$, and $C(R^5)_2$;
$X^6$ is selected from N, $NR^{N6}$, O, S, $CR^6$, and $C(R^6)_2$;
$Y^1$, $Y^2$, and $Y^3$ are each independently selected from C and N; provided that at least one of $Y^1$, $Y^2$, and $Y^3$ is N;
$Cy^1$ is selected from $C_{3-6}$ cycloalkyl; 4-7 membered heterocycloalkyl comprising at least 2 heteroatoms selected from O, S, and N; and 3-4 membered heterocycloalkyl comprising 1 heteroatom selected from O, S, and N; wherein said $C_{3-6}$ cycloalkyl, 4-7 membered heterocycloalkyl, and 3-4 membered heterocycloalkyl are each optionally substituted with 1, 2, 3, 4, or 5 substituents independently selected from $R^{Cy1}$,
$R^1$, $R^2$, $R^3$, $R^4$, $R^5$, $R^6$, $R^7$, and $R^8$ are each independently selected from H, $C_{1-6}$ alkyl, $C_{2-6}$ alkenyl, $C_{2-6}$ alkynyl, $C_{1-4}$ haloalkyl, halo, CN, $NO_2$, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}S(O)_2R^{b1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^2$, halo, CN, $NO_2$, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}S(O)_2R^{b1}$, $S(O)_2R^{b1}$, and $S(O)_2NR^{c1}R^{d1}$;
$R^{N3}$, $R^{N4}$, $R^{N5}$, and $R^{N6}$ are each independently selected from H, $C_{1-6}$ alkyl, $C_{2-6}$ alkenyl, $C_{2-6}$ alkynyl, $C_{1-6}$ haloalkyl, $C(O)R^{b2}$, $C(O)NR^{c2}R^{d2}$, $C(O)OR^{a2}$, $S(O)_2R^{b2}$, and $S(O)_2NR^{c2}R^{d2}$; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^2$, halo, CN, $NO_2$, $OR^{a2}$, $C(O)R^{b2}$, $C(O)NR^{c2}R^{d2}$, $C(O)OR^{a2}$, $NR^{c2}R^{d2}$, $NR^{c2}C(O)R^{b2}$, $NR^{c2}S(O)_2R^{b2}$, $S(O)_2R^{b2}$, and $S(O)_2NR^{c2}R^{d2}$;
$R^9$ and $R^{10}$ are each independently selected from H, $C_{1-3}$ alkyl, and halo, provided that at least one of $R^9$ and $R^{10}$ is $C_{1-3}$ alkyl or halo;
$R^{11}$ is selected from H and $C_{1-3}$ alkyl;
$R^A$ and $R^B$ are each independently selected from H and $C_{1-3}$ alkyl, wherein said $C_{1-3}$ alkyl is optionally substituted with 1, 2, or 3 substituents independently selected from $C_{1-3}$ alkoxy, $C_{1-4}$ haloalkyl, $C_{1-4}$ haloalkoxy, halo, CN, $NO_2$, OH, $NH_2$, $C_{1-3}$ alkylamino, and di($C_{1-3}$ alkyl)amino;
$R^{a1}$, $R^{a2}$, $R^{c1}$, $R^{c2}$, $R^{d1}$, and $R^{d2}$ are each independently selected from H, $C_{1-6}$ alkyl, $C_{2-6}$ alkenyl, $C_{2-6}$ alkynyl, $C_{1-4}$ haloalkyl, $C(O)R^{b3}$, $C(O)NR^{c3}R^{d3}$, $C(O)OR^{a3}$, $S(O)_2R^{b3}$, $S(O)_2NR^{c3}R^{d3}$, wherein said $C_{1-6}$ alkyl, $C_{2-6}$ alkenyl, and $C_{2-6}$ alkynyl are each optionally substituted with 1, 2, 3, 4, or 5 substituents independently selected from $Cy^3$, halo, CN, $NO_2$, $OR^{a3}$, $C(O)R^{b3}$, $C(O)NR^{c3}R^{d3}$, $C(O)OR^{a3}$, $NR^{c3}R^{d3}$, $NR^{c3}C(O)R^{b3}$, $NR^{c3}S(O)_2R^{b3}$, $NR^{c3}S(O)_2NR^{c3}R^{d3}$, $S(O)_2R^{b3}$ and $S(O)_2NR^{c3}R^{d3}$;
$R^{b1}$ and $R^{b2}$ are each independently selected from $C_{1-6}$ alkyl, $C_{2-6}$ alkenyl, $C_{2-6}$ alkynyl, and $C_{1-4}$ haloalkyl; wherein said $C_{1-6}$ alkyl, $C_{2-6}$ alkenyl, and $C_{2-6}$ alkynyl are each optionally substituted with 1, 2, 3, 4, or 5 substituents independently selected from $Cy^3$, halo, CN, $NO_2$, $OR^{a3}$, $C(O)R^{b3}$, $C(O)NR^{c3}R^{d3}$, $C(O)OR^{a3}$, $NR^{c3}R^{d3}$, $NR^{c3}S(O)_2R^{b3}$, $NR^{c3}S(O)_2NR^{c3}R^{d3}$, $S(O)_2R^{b3}$, and $S(O)_2NR^{c3}R^{d3}$;
each $Cy^2$ is independently selected from $C_{6-10}$ aryl, $C_{3-10}$ cycloalkyl, 5-10 membered heteroaryl, and 4-12 membered heterocycloalkyl, each of which is optionally substituted with 1, 2, 3, 4, or 5 substituents independently selected from $R^{Cy2}$;
each $Cy^3$ is independently selected from $C_{6-10}$ aryl, $C_{3-10}$ cycloalkyl, 5-10 membered heteroaryl, and 4-12 membered heterocycloalkyl, each of which is optionally substituted with 1, 2, 3, 4, or 5 substituents independently selected from $R^{Cy3}$,
$R^{a3}$, $R^{c3}$, and $R^{d3}$ are each independently selected from H, $C_{1-6}$ alkyl, $C_{1-4}$ haloalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene, $C(O)R^{b4}$, $C(O)NR^{c4}R^{d4}$, $C(O)OR^{a4}$, $S(O)_2R^{b4}$, and $S(O)_2NR^{c4}R^{d4}$; wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene are each optionally substituted with 1, 2, 3, 4, or 5 substituents independently selected from $C_{1-6}$ alkyl, $C_{1-4}$ haloalkyl, $C_{1-4}$ hydroxyalkyl, $C_{1-6}$ cyanoalkyl, halo, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}S(O)_2R^{b4}$, $S(O)_2R^{b4}$, and $S(O)_2NR^{c4}R^{d4}$;
$R^{b3}$ is selected from $C_{1-6}$ alkyl, $C_{2-6}$ alkenyl, $C_{2-6}$ alkynyl, $C_{1-4}$ haloalkyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene are each optionally substituted with 1, 2, 3, 4, or 5 substituents independently selected from $C_{1-6}$ alkyl, $C_{1-4}$ haloalkyl, $C_{1-4}$ hydroxyalkyl, $C_{1-6}$ cyanoalkyl, halo, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}C(O)OR^{a4}$, $NR^{c4}S(O)_2R^{b4}$, $NR^{c4}S(O)_2NR^{c4}R^{d4}$, $S(O)_2R^{b4}$, and $S(O)_2NR^{c4}R^{d4}$;
$R^{Cy1}$, $R^{Cy2}$, and $R^{Cy3}$ are each independently selected from halo, $C_{1-4}$ alkyl, $C_{1-4}$ haloalkyl, $C_{2-6}$ alkenyl, $C_{2-6}$ alkynyl, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}C(O)OR^{a4}$, $NR^{c4}S(O)_2R^{b4}$, $NR^{c4}S(O)_2NR^{c4}R^{d4}$, $S(O)_2R^{b4}$, and $S(O)_2NR^{c4}R^{d4}$, wherein said $C_{1-4}$ alkyl, $C_{2-6}$ alkenyl, and $C_{2-6}$ alkynyl are each optionally substituted by 1, 2, 3, 4, or 5 substituents independently selected from halo, CN, $NO_2$, $OR^{a4}$, $C(O)R^{b4}$, $C(O)NR^{c4}R^{d4}$, $C(O)OR^{a4}$, $NR^{c4}R^{d4}$, $NR^{c4}C(O)R^{b4}$, $NR^{c4}C(O)OR^{a4}$, $NR^{c4}S(O)_2R^{b4}$, $NR^{c4}S(O)_2NR^{c4}R^{d4}$, $S(O)_2R^{b4}$, and $S(O)_2NR^{c4}R^{d4}$, $R^{a4}$, $R^{c4}$, and $R^{d4}$ are each independently selected from H, $C_{1-6}$ alkyl, $C_{1-4}$ haloalkyl, $C_{1-4}$ hydroxyalkyl, $C_{1-4}$ cyanoalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene and $R^g$, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene are each optionally substituted with 1, 2, 3, 4, or 5 substituents independently selected from $R^g$;

each $R^{b4}$ is independently selected from $C_{1-6}$ alkyl, $C_{1-4}$ haloalkyl, $C_{1-4}$ hydroxyalkyl, $C_{1-4}$ cyanoalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene and $R^g$, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene is optionally substituted with 1, 2, 3, 4, or 5 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$;

or any $R^{c3}$ and $R^{d3}$ together with the N atom to which they are attached form a 4-, 5-, 6-, or 7-membered heterocycloalkyl group optionally substituted with 1, 2, or 3 substituents independently selected from $R^g$;

or any $R^{c4}$ and $R^{d4}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO-$C_{1-3}$ alkylene, $C_{6-10}$ aryl, $C_{6-10}$ aryloxy, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

provided that the compound of Formula (I) is not:

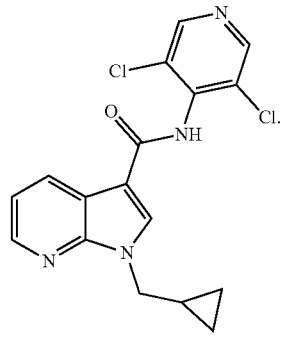 [SMILES: O=C(Nc1c(Cl)cncc1Cl)c1cn(CC2CC2)c2ncccc12]

2. The compound of claim 1, wherein the compound of Formula (I) has formula:

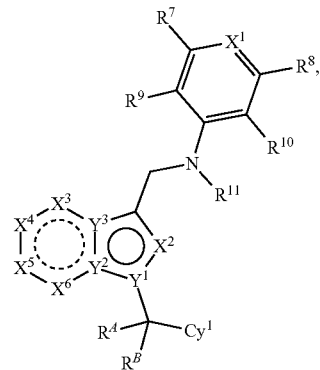

or a pharmaceutically acceptable salt thereof.

3. The compound of claim 1, wherein the compound of Formula (I) has formula:

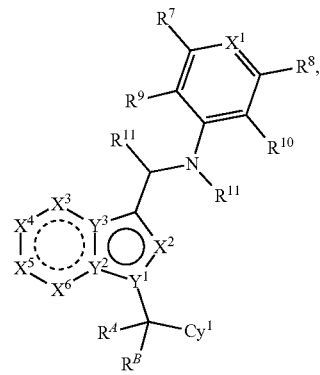

or a pharmaceutically acceptable salt thereof.

4. The compound of claim 1, wherein the compound of Formula (I) has formula:

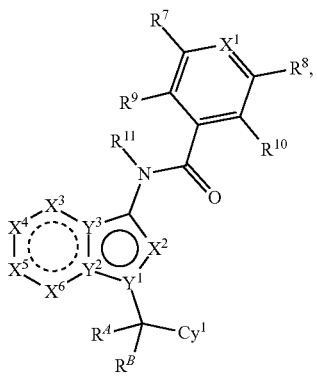

or a pharmaceutically acceptable salt thereof.

5. The compound of claim 1, wherein the compound of Formula (I) has formula:

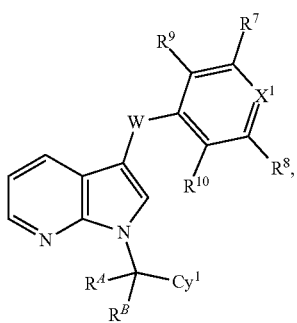

or a pharmaceutically acceptable salt thereof.

6. The compound of claim 1, wherein the compound of Formula (I) has formula:

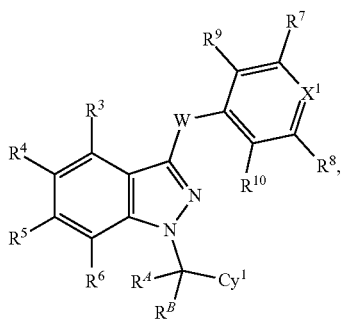

or a pharmaceutically acceptable salt thereof.

7. The compound of claim 1, wherein the compound of Formula (I) has formula:

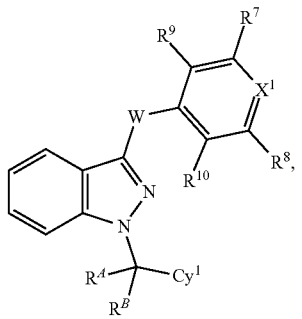

or a pharmaceutically acceptable salt thereof.

8. The compound of claim 1, wherein the compound of Formula (I) has formula:

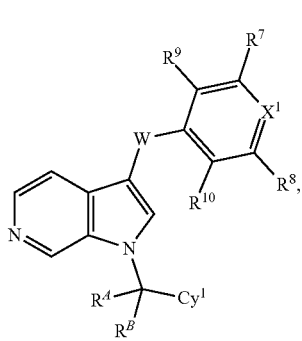

or a pharmaceutically acceptable salt thereof.

9. The compound of claim 1, wherein the compound of Formula (I) has formula:

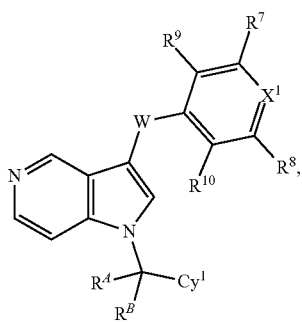

or a pharmaceutically acceptable salt thereof.

10. The compound of claim 1, wherein the compound of Formula (I) has formula:

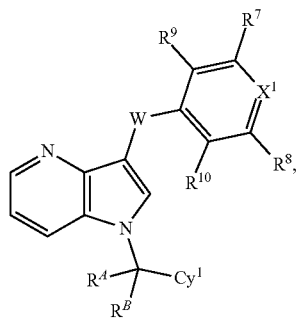

or a pharmaceutically acceptable salt thereof.

11. The compound of claim 1, wherein the compound of Formula (I) has formula:

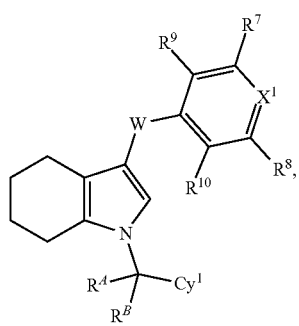

or a pharmaceutically acceptable salt thereof.

12. The compound of claim 1, wherein the compound of Formula (I) has formula:

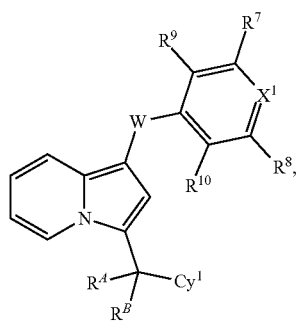

or a pharmaceutically acceptable salt thereof.

13. The compound of claim 1, wherein the compound of Formula (I) has formula:

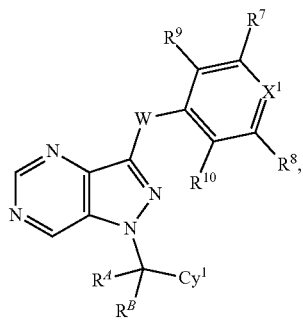

or a pharmaceutically acceptable salt thereof.

14. The compound of claim 1, wherein the compound of Formula (I) has formula:

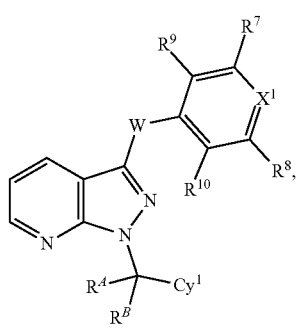

or a pharmaceutically acceptable salt thereof.

15. The compound of claim 1, wherein the compound of Formula (I) has formula:

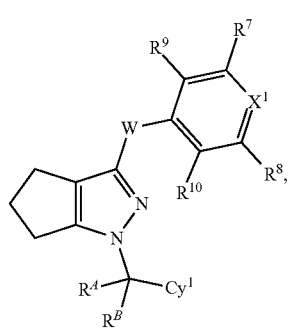

or a pharmaceutically acceptable salt thereof.

16. A compound of Formula (II):

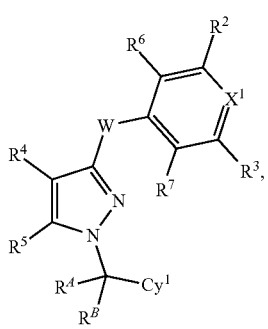

or a pharmaceutically acceptable salt thereof, wherein:
W is selected from —C(=O)NR$^8$—, —NR$^8$C(=O)—, —CH$_2$NR$^8$—, and —NR$^8$CH$_2$—;
X$^1$ is selected from N and CR$^1$;
R$^1$, R$^2$, R$^3$, R$^4$, and R$^5$ are each independently selected from H, C$_{1-6}$ alkyl, C$_{2-6}$ alkenyl, C$_{2-6}$ alkynyl, C$_{1-4}$ haloalkyl, halo, CN, NO$_2$, ORa1, C(O)R$^{b1}$, C(O)NR$^{a1}$R$^{d1}$, C(O)OR$^{a1}$, NR$^{a1}$R$^{d1}$, NR$^{a1}$C(O)R$^{b1}$, NR$^{a1}$S(O)$_2$R$^{b1}$, S(O)$_2$R$^{b1}$, and S(O)$_2$NR$^{c1}$R$^{d1}$; wherein said C$_{1-6}$ alkyl, C$_{2-6}$ alkenyl, and C$_{2-6}$ alkynyl are each optionally substituted with 1, 2, 3, 4, or 5 substituents independently selected from Cy$^2$, halo, CN, NO$_2$, OR$^{a1}$, C(O)R$^{b1}$, C(O)NR$^{a1}$R$^{d1}$, C(O)OR$^{a1}$, NR$^{a1}$R$^{d1}$, NR$^{a1}$C(O)R$^{b1}$, NR$^{a1}$S(O)$_2$R$^{b1}$, S(O)$_2$R$^{b1}$, and S(O)$_2$NR$^{a1}$R$^{d1}$,
R$^6$ and R$^7$ are each independently selected from H, C$_{1-3}$ alkyl, and halo, provided that at least one of R$^6$ and R$^7$ is C$_{1-3}$ alkyl or halo;
R$^8$ is selected from H and C$_{1-3}$ alkyl;
Cy$^1$ is selected from C$_{3-6}$ cycloalkyl and 4-7 membered heterocycloalkyl; wherein said C$_{3-6}$ cycloalkyl and 4-7 membered heterocycloalkyl are each optionally substituted with 1, 2, 3, 4, or 5 substituents independently selected from R$^{Cy1}$;
R$^{a1}$, R$^{c1}$, and R$^{d1}$ are each independently selected from H, C$_{1-6}$ alkyl, C$_{2-6}$ alkenyl, C$_{2-6}$ alkynyl, C$_{1-4}$ haloalkyl, C(O)R$^{b3}$, C(O)NR$^{a3}$R$^{d3}$, C(O)OR$^{a3}$, S(O)$_2$R$^{b3}$, S(O)$_2$NR$^{a3}$R$^{d3}$; wherein said C$_{1-6}$ alkyl, C$_{2-6}$ alkenyl, and C$_{2-6}$ alkynyl are each optionally substituted with 1, 2, 3, 4, or 5 substituents independently selected from Cy$^3$, halo, CN, NO$_2$, OR$^{a3}$, C(O)R$^{b3}$, C(O)NR$^{a3}$R$^{d3}$, C(O)OR$^{a3}$, NR$^{a3}$R$^{d3}$, NR$^{a3}$C(O)R$^{b3}$, NR$^{a3}$S(O)$_2$R$^{b3}$, NR$^{a3}$S(O)$_2$NR$^{a3}$R$^{d3}$, S(O)$_2$R$^{b3}$ and S(O)$_2$NR$^{c3}$R$^{d3}$;
each R$^{b1}$ is independently selected from C$_{1-6}$ alkyl, C$_{2-6}$ alkenyl, C$_{2-6}$ alkynyl, and C$_{1-4}$ haloalkyl; wherein said C$_{1-6}$ alkyl, C$_{2-6}$ alkenyl, and C$_{2-6}$ alkynyl are each optionally substituted with 1, 2, 3, 4, or 5 substituents independently selected from Cy$^3$, halo, CN, NO$_2$, OR$^{a3}$, C(O)R$^{b3}$, C(O)NR$^{a3}$R$^{d3}$, C(O)OR$^{a3}$, NR$^{a3}$R$^{d3}$, NR$^{a3}$S(O)$_2$R$^{b3}$, NR$^{a3}$S(O)$_2$NR$^{a3}$R$^{d3}$, S(O)$_2$R$^{b3}$, and S(O)$_2$NR$^{a3}$R$^{d3}$;
each Cy$^2$ is independently selected from C$_{6-10}$ aryl, C$_{3-10}$ cycloalkyl, 5-10 membered heteroaryl, and 4-12 membered heterocycloalkyl, each of which is optionally substituted with 1, 2, 3, 4, or 5 substituents independently selected from R$^{Cy2}$;
each Cy$^3$ is independently selected from C$_{6-10}$ aryl, C$_{3-10}$ cycloalkyl, 5-10 membered heteroaryl, and 4-12 membered heterocycloalkyl, each of which is optionally substituted with 1, 2, 3, 4, or 5 substituents independently selected from R$^{Cy3}$;
R$^{a3}$, R$^{c3}$, and R$^{d3}$ are each independently selected from H, C$_{1-6}$ alkyl, C$_{1-4}$ haloalkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, (4-12 membered heterocycloalkyl)-C$_{1-4}$ alkylene, C(O)R$^{b4}$, C(O)NR$^{a4}$R$^{d4}$, C(O)OR$^{a4}$, S(O)$_2$R$^{b4}$, and S(O)$_2$NR$^{a4}$R$^{d4}$, wherein said C$_{1-6}$ alkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene are each optionally substituted with 1, 2, 3, 4, or 5 substituents independently selected from C$_{1-6}$ alkyl, C$_{1-4}$ haloalkyl, C$_{1-4}$ hydroxyalkyl, C$_{1-6}$ cyanoalkyl, halo, CN, NO$_2$, OR$^{a4}$, C(O)R$^{b4}$, C(O)NR$^{a4}$R$^{d4}$, C(O)OR$^{a4}$, NR$^{a4}$R$^{d4}$, NR$^{a4}$C(O)R$^{b4}$, NR$^{c4}$S(O)$_2$R$^{b4}$, S(O)$_2$R$^{b4}$, and S(O)$_2$NR$^{c4}$R$^{d4}$;
R$^{b3}$ is selected from C$_{1-6}$ alkyl, C$_{2-6}$ alkenyl, C$_{2-6}$ alkynyl, C$_{1-4}$ haloalkyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene, wherein said C$_{1-6}$ alkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene are each optionally substituted with 1, 2, 3, 4, or 5 substituents independently selected from C$_{1-6}$ alkyl, C$_{1-4}$ haloalkyl, C$_{1-4}$ hydroxyalkyl, C$_{1-6}$ cyanoalkyl, halo, CN, NO$_2$, OR$^{a4}$, C(O)R$^{b4}$, C(O)NR$^{a4}$R$^{d4}$, C(O)OR$^{a4}$, NR$^{a4}$R$^{d4}$, NR$_{a4}$C(O)R$^{b4}$, NR$^{a4}$C(O)OR$^{a4}$, NR$^{a4}$S(O)$_2$R$^{b4}$, NR$^{c4}$S(O)$_2$NR$^{a4}$R$^{d4}$, S(O)$_2$R$^{b4}$, and S(O)$_2$NR$^{c4}$R$^{d4}$;
R$^{Cy1}$, R$^{Cy2}$, and R$^{Cy3}$ are each independently selected from halo, C$_{1-4}$ alkyl, C$_{1-4}$ haloalkyl, C$_{2-6}$ alkenyl, C$_{2-6}$ alkynyl, CN, NO$_2$, OR$^{a4}$, C(O)R$^{b4}$, C(O)NR$^{a4}$R$^{d4}$, C(O)OR$^{a4}$, NR$^{a4}$R$^{d4}$ NR$^{a4}$C(O)R$^{b4}$, NR$^{a4}$C(O)OR$^{a4}$, NR$^{a4}$S(O)$_2$R$^{b4}$, NR$^{a4}$S(O)$_2$NR$^{a4}$R$^{d4}$, S(O)$_2$R$^{b4}$, and S(O)$_2$NR$^{a4}$R$^{d4}$, wherein said C$_{1-4}$ alkyl, C$_{2-6}$ alkenyl, and C$_{2-6}$ alkynyl are each optionally substituted by 1, 2, 3, 4, or 5 substituents independently selected from halo, CN, NO$_2$, OR$^{a4}$, C(O)R$^{b4}$, C(O)NR$^{a4}$R$^{d4}$, C(O)OR$^{a4}$, NR$^{a4}$R$^{d4}$, NR$^{a4}$C(O)R$^{b4}$, NR$^{a4}$C(O)OR$^{a4}$, NR$^{c4}$S(O)$_2$R$^{b4}$, NR$^{a4}$S(O)$_2$NR$^{a4}$R$^{d4}$, S(O)$_2$R$^{b4}$, and S(O)$_2$NR$^{a4}$R$^{d4}$;
R$^{a4}$, R$^{c4}$, and R$^{d4}$ are each independently selected from H, C$_{1-6}$ alkyl, C$_{1-4}$ haloalkyl, C$_{1-4}$ hydroxyalkyl, C$_{1-4}$ cyanoalkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, (4-12 membered heterocycloalkyl)-C$_{1-4}$ alkylene and R$^g$, wherein said C$_{1-6}$ alkyl, C$_{2-6}$ alkenyl, C$_{2-6}$ alkynyl, C$_{6-10}$ aryl, C$_{3-10}$ cycloalkyl, 5-10 membered heteroaryl, 4-12 membered heterocycloalkyl, C$_{6-10}$ aryl-C$_{1-4}$ alkylene, C$_{3-10}$ cycloalkyl-C$_{1-4}$ alkylene, (5-10 membered heteroaryl)-C$_{1-4}$ alkylene, and (4-12 membered heterocycloalkyl)-C$_{1-4}$ alkylene are each optionally substituted with 1, 2, 3, 4, or 5 substituents independently selected from R$^g$;

each $R^{b4}$ is independently selected from $C_{1-6}$ alkyl, $C_{1-4}$ haloalkyl, $C_{1-4}$ hydroxyalkyl, $C_{1-4}$ cyanoalkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene and $R^g$, wherein said $C_{1-6}$ alkyl, $C_{2-6}$ alkenyl, $C_{2-6}$ alkynyl, $C_{6-10}$ aryl, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, and (4-12 membered heterocycloalkyl)-$C_{1-4}$ alkylene is optionally substituted with 1, 2, 3, 4, or 5 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$;

or any $R^{c3}$ and $R^{d3}$ together with the N atom to which they are attached form a 4-, 5-, 6-, or 7-membered heterocycloalkyl group optionally substituted with 1, 2, or 3 substituents independently selected from $R^g$;

or any $R^{c4}$ and $R^{d4}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO-$C_{1-3}$ alkylene, $C_{6-10}$ aryl, $C_{6-10}$ aryloxy, $C_{3-10}$ cycloalkyl, 5-10 membered heteroaryl, 4-12 membered heterocycloalkyl, $C_{6-10}$ aryl-$C_{1-4}$ alkylene, $C_{3-10}$ cycloalkyl-$C_{1-4}$ alkylene, (5-10 membered heteroaryl)-$C_{1-4}$ alkylene, (4-12 membered heterocycloalkyl)-$C_{1-4}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

provided that the compound of Formula (II) is not any one of the compounds selected from:

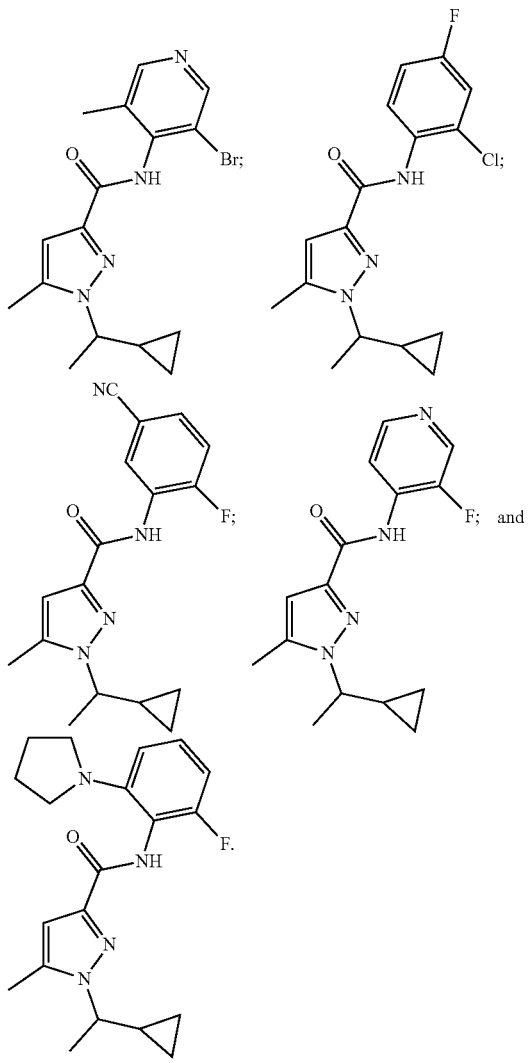

17. A compound selected from any one of the compounds listed in Table A, Table B, and Table C, or a pharmaceutically acceptable salt thereof.

18. A pharmaceutical composition comprising a compound of claim 1, or a pharmaceutically acceptable salt thereof, and a pharmaceutically acceptable carrier.

19. A method of treating or preventing a disease or condition selected from: an autoimmune disease, an inflammatory disease, a cardiovascular disease, and a cancer, the method comprising administering to a subject in need thereof a therapeutically effective amount of a compound of claim 1, or a pharmaceutically acceptable salt thereof.

* * * * *